United States Patent
Sato et al.

(10) Patent No.: US 10,428,231 B2
(45) Date of Patent: Oct. 1, 2019

(54) GEL PARTICLES, INK COMPOSITION AND PRODUCTION METHOD THEREOF, PHOTOSENSITIVE COMPOSITION, AND IMAGE FORMING METHOD

(71) Applicant: FUJIFILM CORPORATION, Minato-ku, Tokyo (JP)

(72) Inventors: Noriaki Sato, Kanagawa (JP); Shota Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 183 days.

(21) Appl. No.: 15/450,050

(22) Filed: Mar. 6, 2017

(65) Prior Publication Data
US 2017/0174913 A1 Jun. 22, 2017

Related U.S. Application Data

(63) Continuation of application No. PCT/JP2015/074794, filed on Aug. 31, 2015.

(30) Foreign Application Priority Data

Sep. 29, 2014 (JP) ................................ 2014-199145
Feb. 25, 2015 (JP) ................................ 2015-035774
Mar. 24, 2015 (JP) ................................ 2015-061719

(51) Int. Cl.

| | | |
|---|---|---|
| *C09D 11/00* | (2014.01) | |
| *C09D 11/023* | (2014.01) | |
| *C09D 11/101* | (2014.01) | |
| *C09D 11/30* | (2014.01) | |
| *B41J 2/045* | (2006.01) | |
| *B41J 11/00* | (2006.01) | |
| *B41M 5/00* | (2006.01) | |
| *B41M 7/00* | (2006.01) | |
| *C09D 11/102* | (2014.01) | |
| *C08G 18/67* | (2006.01) | |
| *C08G 18/73* | (2006.01) | |
| *C08G 18/75* | (2006.01) | |
| *C08G 18/76* | (2006.01) | |
| *C08G 18/79* | (2006.01) | |
| *C08G 18/80* | (2006.01) | |
| *C08G 18/81* | (2006.01) | |
| *C08F 290/06* | (2006.01) | |
| *C08G 18/08* | (2006.01) | |
| *C08G 18/22* | (2006.01) | |
| *C08G 18/28* | (2006.01) | |
| *C08G 18/32* | (2006.01) | |
| *C08G 18/38* | (2006.01) | |

(52) U.S. Cl.
CPC ......... *C09D 11/023* (2013.01); *B41J 2/04581* (2013.01); *B41J 11/002* (2013.01); *B41M 5/0023* (2013.01); *B41M 7/0081* (2013.01); *C08F 290/067* (2013.01); *C08G 18/0823* (2013.01); *C08G 18/227* (2013.01); *C08G 18/283* (2013.01); *C08G 18/3206* (2013.01); *C08G 18/3215* (2013.01); *C08G 18/3281* (2013.01); *C08G 18/3876* (2013.01); *C08G 18/673* (2013.01); *C08G 18/6795* (2013.01); *C08G 18/73* (2013.01); *C08G 18/755* (2013.01); *C08G 18/758* (2013.01); *C08G 18/7642* (2013.01); *C08G 18/792* (2013.01); *C08G 18/8025* (2013.01); *C08G 18/8048* (2013.01); *C08G 18/8054* (2013.01); *C08G 18/8175* (2013.01); *C09D 11/101* (2013.01); *C09D 11/102* (2013.01); *C09D 11/30* (2013.01); *B41J 2202/03* (2013.01); *C08F 290/062* (2013.01); *C08G 2220/00* (2013.01)

(58) Field of Classification Search
CPC ....... C09D 11/101; C09D 11/30; C09D 11/00; C09D 4/00; C08F 290/067; C08F 299/06; C08F 2/46; C08F 2/48; B41M 7/0081; B41M 5/3372; B41M 5/465
See application file for complete search history.

(56) References Cited

U.S. PATENT DOCUMENTS

| | | |
|---|---|---|
| 5,368,973 A | 11/1994 | Hasegawa |
| 6,747,088 B1 | 6/2004 | Reinhold et al. |
| 2004/0198868 A1 | 10/2004 | Tielemans et al. |
| 2006/0100307 A1 | 5/2006 | Uerz et al. |
| 2008/0145563 A1 | 6/2008 | Heischkel et al. |
| 2011/0237700 A1 | 9/2011 | Miyabayashi |
| 2017/0166766 A1* | 6/2017 | Sato ........................... B41J 2/01 |
| 2017/0174916 A1* | 6/2017 | Sato ......................... C09D 11/38 |

FOREIGN PATENT DOCUMENTS

| | | |
|---|---|---|
| CN | 1535304 A | 10/2004 |
| EP | 0484127 A2 | 5/1992 |
| EP | 1819785 A1 | 8/2007 |
| EP | 3202809 A1 | 8/2017 |
| JP | H03-280055 A | 12/1991 |
| JP | H04-166943 A | 6/1992 |
| JP | H04-170475 A | 6/1992 |
| JP | H08-259888 A | 10/1996 |

(Continued)

OTHER PUBLICATIONS

Computer-generated translation of JP 08-259888, published on Oct. 1996 (Year: 1996).*

(Continued)

*Primary Examiner* — Huan H Tran
(74) *Attorney, Agent, or Firm* — Solaris Intellectual Property Group, PLLC

(57) ABSTRACT

There are provided gel particles which have a polymerizable group, and a three-dimensional crosslinked structure including at least one bond selected from a urethane bond and a urea bond, and enclose a photopolymerization initiator, an ink composition including the gel particles and a production method thereof, a photosensitive composition, and an image forming method.

17 Claims, No Drawings

(56) References Cited

FOREIGN PATENT DOCUMENTS

| JP | H10-338731 | A | 12/1998 |
| JP | 2003-510432 | A | 3/2003 |
| JP | 2004-246256 | A | 9/2004 |
| JP | 2008-519868 | A | 6/2008 |
| JP | 2008-538219 | A | 10/2008 |
| JP | 2009-515018 | A | 4/2009 |
| JP | 4253432 | B2 | 4/2009 |
| JP | 2011-213114 | A | 10/2011 |
| JP | 2011201973 | A | 10/2011 |
| JP | 2013-194111 | A | 9/2013 |
| JP | 2013-199602 | A | 10/2013 |

OTHER PUBLICATIONS

International Search Report issued in International Application No. PCT/JP2015/074794 dated Dec. 1, 2015.
Written Opinion of the ISA issued in International Application No. PCT/JP2015/074794 dated Dec. 1, 2015.
Extended European Search Report dated Sep. 6, 2017, issued in corresponding EP Patent Application No. 15846871.0.
English language translation of the following: Office action dated Feb. 13, 2018 from the JPO in a Japanese patent application No. 2016-551664 corresponding to the instant patent application. This office action translation is submitted now in order to supplement the understanding of the cited references being disclosed in the instant Information Disclosure Statement.
Office Action dated Mar. 21, 2019, issued by the EPO in corresponding EP Patent Application No. EP15846871.0.
English language translation of the following: Office action dated Apr. 2, 2019 from the SIPO in a Chinese patent application No. 201580049399.5 corresponding to the instant patent application.

* cited by examiner

GEL PARTICLES, INK COMPOSITION AND PRODUCTION METHOD THEREOF, PHOTOSENSITIVE COMPOSITION, AND IMAGE FORMING METHOD

CROSS-REFERENCE TO RELATED APPLICATIONS

This application is a continuation application of International Application No. PCT/JP2015/074794, filed Aug. 31, 2015, the disclosure of which is incorporated herein by reference in its entirety. Further, this application claims priority from Japanese Patent Application No. 2014-199145, filed Sep. 29, 2014, Japanese Patent Application No. 2015-035774, filed Feb. 25, 2015, and Japanese Patent Application No. 2015-061719, filed Mar. 24, 2015, the disclosures of which are incorporated herein by reference in their entirety.

BACKGROUND OF THE INVENTION

1. Field of the Invention

The present disclosure relates to gel particles, an ink composition and a production method thereof, a photosensitive composition, and an image forming method.

2. Description of the Related Art

As image forming methods in which an image is formed on a recording medium such as paper based on an image data signal, there are electrophotographic systems, sublimation type thermal transfer systems, fusion type thermal transfer systems, and ink jet systems. For example, an ink jet system is executable using an inexpensive apparatus, and since ink is discharged onto only a necessary image portion to directly form an image on a recording medium, in the ink jet system, it is possible to efficiently use the ink, and running costs are low. Furthermore, the system makes little noise, and is excellent as an image forming method.

With an ink jet system, it is possible to form an image on not only plain paper but also a non-absorbing recording medium such as a plastic sheet or a metal plate. However, since an ink composition applied to a non-absorbing recording medium is not absorbed into the recording medium, to increase the speed of recording and to improve image quality, it is desirable that a polymerization reaction proceeds with high sensitivity and a cured film can be formed.

As one of the ink jet systems, there is an image forming method using an ink for ink jet recording which is curable by irradiation with active energy rays. According to this method, by irradiating ink droplets with active energy rays immediately after ink discharging or after a certain period of time and by curing the ink droplets, it is possible to form an image at an improved recording speed.

By achieving higher sensitivity of a curable ink by irradiation with active energy rays such as ultraviolet rays, curability with respect to the active energy rays becomes good, and this contributes to productivity improvement of the ink jet recording.

In connection with the above, in JP2013-199602A, as an ink composition for ink jet which has excellent discharge stability while maintaining the curability by ultraviolet irradiation in the presence of water and a solvent, an ink composition for ink jet including water, a coloring material, a resin emulsion formed of a compound having a radical polymerizable group, an inorganic particle dispersion, and a photoradical initiator is disclosed.

In addition, in JP4253432B, as a lithographic printing original plate which has good on-board developability and good abrasion resistance with high sensitivity although this is not an ink composition for ink jet recording, an original plate formed of at least one component selected from fine particles containing a compound having a radical polymerizable group and microcapsules enclosing a compound having a radical polymerizable group, a hydrophilic resin which has not been crosslinked, a thermal radical generating agent, and a polymethine dye as a cyanine dye is disclosed.

In JP2011-213114A, as a coloring photosensitive composition which does not easily fade after being colored with high coloring by an infrared laser exposure, and has good storage stability, a coloring photosensitive composition which contains a microgel enclosing a polymer having a glass transition temperature of 50° C. or higher, a photoinitiator, and an infrared absorbing dye and a binder polymer is disclosed.

In addition, in JP2009-515018A, as a slurry to form a coating film, which has high storage stability in the absence of actinic rays, is less likely to exhibit precipitation or aggregation, has high gloss, and has high stability with respect to chemicals, condensed water, and a mechanical action, an aqueous powder dispersion which contains a radically crosslinkable binder having an olefin-based unsaturated double bond is disclosed.

SUMMARY OF THE INVENTION

However, since a resin emulsion is used in the ink composition shown in JP2013-199602A, sensitivity and redispersibility with respect to active energy rays are not sufficient. In addition, the compositions shown in JP4253432B, JP2011-213114A, and JP2009-515018A have low sensitivity with respect to active energy rays, and an insufficient film strength.

An embodiment of the present invention has been made in consideration of the above-described circumstances, and provides gel particles from which a film (for example, an image) which has excellent dispersibility and redispersibility in a case where solidification occurs, is cured with high sensitivity, and has an excellent film strength is obtained, an ink composition and a production method thereof, a photosensitive composition, and an image forming method of obtaining an image which is cured with high sensitivity and has an excellent film strength.

Moreover, the redispersibility means properties in which, when water included in an ink composition evaporates, and as a result, gel particles are precipitated and solidify, by supplying a new ink composition to the solidified product, the gel particles are dispersed again in the ink composition.

In specific means for accomplishing for the problems described above, the following aspects are included.

<1> Gel particles which have a polymerizable group, and a three-dimensional crosslinked structure including at least one bond selected from a urethane bond and a urea bond, and enclose a photopolymerization initiator.

<2> The gel particles according to <1>, in which the photopolymerization initiator includes at least one of a carbonyl compound and an acylphosphine oxide compound.

<3> The gel particles according to <1> or <2>, which have a hydrophilic group on the surfaces.

<4> The gel particles according to <3>, in which the hydrophilic group is at least one type selected from a group having a polyether structure, a carboxylic acid group, and a salt of a carboxylic acid group.

<5> The gel particles according to any one of <1> to <4>, which further enclose a polymerizable monomer.

<6> The gel particles according to any one of <1> to <5>, which further enclose a sensitizer.

<7> An ink composition containing the gel particles according to any one of <1> to <6> and water.

<8> The ink composition according to <7>, further containing a polymerizable compound in the outer portion of the gel particles.

<9> The ink composition according to <8>, further containing a photopolymerization initiator in the outer portion of the gel particles.

<10> The ink composition according to any one of <7> to <9>, in which the total solid content amount of gel particles is 50% by mass or greater with respect to the total solid content of the ink composition.

<11> A production method of the ink composition according to any one of <7> to <10>, including an emulsifying step of obtaining an emulsion by mixing any one oil phase component selected from an oil phase component including a photopolymerization initiator, a tri- or higher functional isocyanate compound, a polymerizable monomer, and an organic solvent, an oil phase component including a photopolymerization initiator, a tri- or higher functional isocyanate compound having a polymerizable group, and an organic solvent, and an oil phase component including a photopolymerization initiator, a tri- or higher functional isocyanate compound having a polymerizable group, a polymerizable monomer, and an organic solvent, with an aqueous phase component including water, and by emulsifying the resultant product, and a gelling step of gelling by heating the above emulsion.

<12> The production method of an ink composition according to <11>, in which the tri- or higher functional isocyanate compound is an isocyanate compound derived from at least one type selected from isophorone diisocyanate, hexamethylene diisocyanate, trimethyl hexamethylene diisocyanate, 1,3-bis(isocyanatomethyl)cyclohexane, m-xylylene diisocyanate, and dicyclohexylmethane-4,4'-diisocyanate.

<13> A photosensitive composition, containing the gel particles according to any one of <1> to <6> and water.

<14> An image forming method, including an ink applying step of applying the ink composition according to any one of <7> to <10> to a recording medium and an irradiation step of irradiating the ink composition applied to the recording medium with active energy rays.

According to an embodiment of the present invention, there are provided gel particles from which a film (for example, an image) which has excellent dispersibility and redispersibility in a case where solidification occurs, is cured with high sensitivity, and has an excellent film strength is obtained, an ink composition and a production method thereof, a photosensitive composition, and an image forming method of obtaining an image which is cured with high sensitivity and has an excellent film strength.

DESCRIPTION OF THE PREFERRED EMBODIMENTS

Hereinafter, an ink composition of an embodiment of the present invention will be described in detail.

In the present specification, the numerical range described using "to" means a range that includes values described before and after "to" as the minimum and maximum values respectively.

In the specification, "(meth)acrylate" refers to at least one of "acrylate" and "methacrylate".

In the specification, the term "light" is a concept including active energy rays such as γ-rays, β-rays, an electron beam, ultraviolet rays, visible rays, and infrared rays.

In the specification, ultraviolet rays are referred to as "Ultra Violet (UV) light" in some cases.

In the specification, the light generated from a Light Emitting Diode (LED) light source is referred to as "LED light" in some cases.

<Ink Composition>

The ink composition contains gel particles which have a polymerizable group, and a three-dimensional crosslinked structure including at least one bond selected from a urethane bond and a urea bond, and enclose a photopolymerization initiator, and water.

The ink composition can be suitably used in ink jet recording.

In the "ink composition", an ink containing a colorant and a colorless ink (a clear ink) not containing a colorant are included.

Details of the action mechanism in an embodiment of the present invention are not clear, but it is thought to be as follows.

In the ink composition, by the gel particles enclosing a photopolymerization initiator having a polymerizable group, the polymerizable group present on the surface or in the inside of the gel particles is bonded to the polymerizable group of adjacent particles to form a crosslinked structure due to the action of an activated species generated from the photopolymerization initiator by irradiation with active energy rays. It is thought that an image which is cured with high sensitivity and has an excellent film strength is obtained since both a photopolymerization initiator and a polymerizable group are present in the gel particles. It is thought that, by the gel particles having a three-dimensional crosslinked structure, a film which is excellent in a film strength such as water resistance or solvent resistance is formed.

By the gel particles enclosing a photopolymerization initiator, it is possible to use a photopolymerization initiator having low dispersibility or low solubility (for example, a photopolymerization initiator having a solubility in water of 1.0% by mass or less at 25° C.) with respect to water without a need to consider water-dispersibility of the photopolymerization initiator itself. Therefore, for example, since dispersibility or solubility in water is low whereas sensitivity is high, it is possible to use a ketone-based or an acylphosphine-based photopolymerization initiator which has been difficult to be used in an aqueous ink composition in the related art. Accordingly, it is thought that, in the ink composition of an embodiment of the present invention, an ink composition having both redispersibility and high sensitivity, compared to the ink compositions in the related art, can be realized.

By the gel particles enclosing a photopolymerization initiator, the range of choice in photopolymerization initiators to be used is widened, and thus, the range of choice in light sources capable of being used is also widened. Therefore, the ink composition can improve curing sensitivity compared to that in the related art.

For example, an acylphosphine oxide compound is an photopolymerization initiator having excellent curing sensitivity with respect to irradiation with active energy rays.

However, since the acylphosphine oxide compound has low solubility with respect to water, in the related art, the acylphosphine oxide compound is difficult to be contained in an aqueous composition.

In the ink composition of an embodiment of the present invention, by the gel particles enclosing a photopolymerization initiator, it is possible to select a photopolymerization initiator such as an acylphosphine oxide compound which has excellent sensitivity with respect to light, but has low solubility in water, as a photopolymerization initiator.

In a case where the photopolymerization initiator is an acylphosphine oxide compound, sensitivity with respect to light, in particular, sensitivity with respect to LED light, is improved.

As the wavelength of the LED light, 355 nm, 365 nm, 385 nm, 395 nm, or 405 nm is preferable.

(Enclosing)

In the specification, for example, "a photopolymerization initiator is enclosed in gel particles" means that a photopolymerization initiator is included in the inside of the gel particles. "The inside of the gel particles" described here means the pores of a three-dimensional crosslinked structure.

In the ink composition of an embodiment of the present invention, the enclosing ratio (% by mass) of the photopolymerization initiator is preferably 10% by mass or greater, more preferably 50% by mass or greater, still more preferably 70% by mass or greater, still further more preferably 80% by mass or greater, still further more preferably 90% by mass or greater, still further more preferably 95% by mass or greater, still further more preferably 97% by mass or greater, and particularly preferably 99% by mass or greater, from the viewpoint of the curing sensitivity of a film.

In a case where two or more types of photopolymerization initiators are included in the ink composition, the enclosing ratio of at least one type of photopolymerization initiator is preferably within the above range.

Here, the enclosing ratio (% by mass) of the photopolymerization initiator means the amount of the photopolymerization initiator enclosed in the gel particles with respect to the total amount of the photopolymerization initiator in an ink composition in the case of preparing an ink composition, and indicates the value determined in the following manner.

—Measurement Method of Enclosing Ratio (% by mass) of Photopolymerization Initiator—

The following operation is performed under the conditions of a liquid temperature of 25° C.

In a case where the ink composition does not contain a pigment, the following operation is performed using the ink composition as it is, and in a case where the ink composition contains a pigment, first, the pigment is removed from the ink composition by centrifugal separation, and then, the operation is performed on the ink composition from which the pigment has been removed.

First, an ink composition which is an object for measuring the enclosing ratio (% by mass) of the photopolymerization initiator is prepared, and from the prepared ink composition, two samples of the same mass (hereinafter, referred to as a "sample 1" and a "sample 2") are collected.

100 times by mass tetrahydrofuran (THF) of the total solid content in the sample 1 is added to the sample 1, and the resultant product is mixed, whereby a diluted solution is prepared. Centrifugal separation is performed on the obtained diluted solution under the conditions of 80,000 rpm (round per minute, hereinafter, the same is applied) for 40 minutes. The supernatant generated by centrifugal separation (hereinafter, referred to as a "supernatant 1") is collected. By the above operation, it is thought that the entirety of photopolymerization initiator included in the sample 1 is extracted into the supernatant 1. The mass of the photopolymerization initiator included in the collected supernatant 1 is measured by using a liquid chromatography (for example, a liquid chromatography apparatus manufactured by Waters). The obtained mass of the photopolymerization initiator is used as the "total amount of photopolymerization initiator".

In addition, centrifugal separation is performed on the sample 2 under the same conditions as in the centrifugal separation performed on the diluted solution described above. The supernatant generated by centrifugal separation (hereinafter, referred to as a "supernatant 2") is collected. By the above operation, it is thought that the photopolymerization initiator not enclosed (that is, free) in the gel particles in the sample 2 is extracted into the supernatant 2. The mass of the photopolymerization initiator included in the collected supernatant 2 is measured by using a liquid chromatography (for example, a liquid chromatography apparatus manufactured by Waters). The obtained mass of the photopolymerization initiator is used as the "free amount of photopolymerization initiator".

On the basis of the "total amount of photopolymerization initiator" and the "free amount of photopolymerization initiator", the enclosing ratio (% by mass) of the photopolymerization initiator is determined according to the following equation.

Enclosing ratio (% by mass) of the photopolymerization initiator=((total amount of photopolymerization initiator−free amount of photopolymerization initiator)/total amount of photopolymerization initiator)×100

In a case where the ink composition includes two or more types of photopolymerization initiators, using the total amount of two or more types of photopolymerization initiators as "the total amount of photopolymerization initiators" and the total free amount of two or more types of photopolymerization initiators as "the free amount of photopolymerization initiators", the enclosing ratio of the entirety of two or more types of photopolymerization initiator may be determined, or using the amount of any one photopolymerization initiator as "total amount of photopolymerization initiators" and the free amount of any one of the above photopolymerization initiators as "the free amount of photopolymerization initiators", the enclosing ratio of any one of the above photopolymerization initiators may be determined.

Whether or not the components other than the photopolymerization initiator are enclosed in the gel particles can be confirmed by the same method as the method of determining whether or not the photopolymerization initiator is enclosed in the gel particles.

Here, for compounds having a molecular weight of 1,000 or greater, the masses of the compounds included in the supernatant 1 and the supernatant 2 are measured by gel permeation chromatography (GPC), and using the masses as a "total amount of compound" and a "free amount of compound" respectively, the enclosing ratio (% by mass) of the compound is determined.

In the measurement performed by gel permeation chromatography (GPC), it is possible to use HLC (registered trademark)-8020GPC (manufactured by TOSOH CORPORATION) as a measuring apparatus, three TSKgel (registered trademark) Super Multipore HZ-Hs (4.6 mm ID×15 cm, manufactured by TOSOH CORPORATION) as a column, and tetrahydrofuran (THF) as an eluent. In addition, the measurement can be performed using a differential refractive index (RI) detector under the conditions of a sample concentration of 0.45% by mass, a flow rate of 0.35 ml/min, an amount of sample injected of 10 µl, and a measurement temperature of 40° C.

A calibration curve can created from eight samples of "standard sample TSK standard, polystyrene": "F-40", "F-20", "F-4", "F-1", "A-5000", "A-2500", "A-1000", and "n-propylbenzene" manufactured by TOSOH CORPORATION.

(Three-Dimensional Crosslinked Structure)

The "three-dimensional crosslinked structure" indicates a three dimensional network structure formed by crosslinking. In the ink composition of an embodiment of the present invention, three-dimensional crosslinked structure is formed in particles, and due to this, gel particles are formed.

That is, in the specification, "particles have a three-dimensional crosslinked structure" and "particles are gel particles" are synonymous.

It is confirmed in the following manner that the ink composition includes gel particles having a three-dimensional crosslinked structure. The following operation is performed under the conditions of a liquid temperature of 25° C.

In a case where the ink composition does not contain a pigment, the following operation is performed using the ink composition as it is, and in a case where the ink composition contains a pigment, first, the pigment is removed from the ink composition by centrifugal separation, and then, the operation is performed on the ink composition from which the pigment has been removed.

A sample is collected from the ink composition. 100 times by mass tetrahydrofuran (THF) of the total solid content in the sample is added to the collected sample, and the resultant product is mixed, whereby a diluted solution is prepared. Centrifugal separation is performed on the obtained diluted solution under the conditions of 80000 rpm for 40 minutes. After centrifugal separation, the presence or absence of residue is visually checked. In a case where the residue is observed, a redispersion is prepared by redispersing the residue in water, and the particle size distribution of the obtained redispersion is measured by a light scattering method using a wet type particle size distribution measuring apparatus (LA-910, manufactured by Horiba, Ltd.).

In a case where the particle size distribution can be confirmed by the above operation, it is determined that the ink composition includes gel particles having the three-dimensional crosslinked structure.

(Polymerizable Group Having Gel Particles)

In the specification, "the gel particles have a polymerizable group" means that gel particles have at least one of a polymerizable group which is included in the three-dimensional crosslinked structure and a polymerizable group which is not included in the three-dimensional crosslinked structure.

That is, in the gel particles, the polymerizable group may be present as a part of the three-dimensional crosslinked structure or may be present as a portion other than the three-dimensional crosslinked structure. "The polymerizable group is present as a portion other than the three-dimensional crosslinked structure" indicates that a monomer having a polymerizable group (hereinafter, also referred to as a "polymerizable monomer") is included in the gel particles separately from the three-dimensional crosslinked structure.

In any of the above cases, the polymerizable group is preferably present on the surface portion (contact portion with the water) of the gel particles.

"The gel particles have a polymerizable group" can be confirmed, for example, by Fourier transform infrared spectroscopy (FT-IR) analysis.

Details of the polymerizable group which the gel particles have and the monomer having a polymerizable group (polymerizable monomer) will be described below.

[Gel Particles]

The ink composition contains gel particles which have a polymerizable group, and a three-dimensional crosslinked structure including at least one bond selected from a urethane bond and a urea bond, and enclose a photopolymerization initiator.

The photopolymerization initiator enclosed in the gel particles includes those present without bonding to the three-dimensional crosslinked structure in the pores of the three-dimensional crosslinked structure of the gel particles.

Moreover, in the specification, "the gel particles" also include a photopolymerization initiator and the like which are present in the pores of the three-dimensional crosslinked structure.

In a case where the ink composition includes the above particles, a film which has excellent dispersibility and redispersibility in a case where solidification occurs, is cured with high sensitivity, and has an excellent film strength (water resistance and solvent resistance) is obtained.

In a case where the gel particles have a polymerizable group, it is possible for the gel particles adjacent to be crosslinked with each other and to form a film.

In a case where the gel particles have a three-dimensional crosslinked structure including at least one bond selected from a urethane bond and a urea bond, an image having an excellent film strength is obtained. In addition, an image having a high mechanical strength is obtained.

By the gel particles enclosing a photopolymerization initiator, the gel particles are cured with high sensitivity and has high crosslinkability.

Applications of the gel particles are not particularly limited, and the gel particles can also be used in applications other than the ink composition, for example, a coating agent, an adhesive, and a paint.

Three-dimensional crosslinked structure can be formed by a reaction of a tri- or higher functional isocyanate compound or a difunctional isocyanate compound with water or a compound having two or more active hydrogen groups. As a raw material used when producing the gel particles, at least one type of compound having three or more reactive groups (isocyanate groups or active hydrogen groups) is included, and thus, a crosslinking reaction proceeds three-dimensionally, and due to this, a three dimensional network structure is formed.

Three-dimensional crosslinked structure in the gel particles is preferably a product formed by a reaction of a tri- or higher functional isocyanate compound with water.

(Tri- or Higher Functional Isocyanate Compound)

The tri- or higher functional isocyanate compound is a compound having three or more isocyanate groups in the molecule, and a compound synthesized by the method described below or known compounds can be used. Examples of the tri- or higher functional isocyanate compound include a tri- or higher functional aromatic isocyanate compound and a tri- or higher functional aliphatic isocyanate compound.

Examples of the known compounds include the compounds described in "Polyurethane Resin Handbook" (edited by Keiji Iwata, published by Nikkan kogyo Shimbun, Ltd. (1987)).

The tri- or higher functional isocyanate compound is preferably a compound having three or more isocyanate groups in a molecule represented by the following General Formula (1).

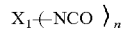

General Formula (1)

In General Formula (1), $X_1$ represents an n-valent organic group.

In General Formula (1), n is 3 or greater. n is preferably 3 to 10, more preferably 3 to 8, and still more preferably 3 to 6.

The tri- or higher functional isocyanate compound is preferably a compound derived from a difunctional isocyanate compound (a compound having two isocyanate groups in the molecule). The tri- or higher functional isocyanate compound is more preferably an isocyanate compound derived from at least one type selected from isophorone diisocyanate, hexamethylene diisocyanate, trimethyl hexamethylene diisocyanate, 1,3-bis(isocyanatomethyl)cyclohexane, m-xylylene diisocyanate, or dicyclohexylmethane-4,4'-diisocyanate.

Moreover, "derived" means including a structure originated from the raw material by using the compound described above as the raw material.

In addition, as the tri- or higher functional isocyanate compound, for example, a tri- or higher funtionalized isocyanate compound (adduct type) as an adduct (addition product) of a di- or higher functional isocyanate compound (a compound having two or more isocyanate groups in the molecule) and a compound having three or more active hydrogen groups in the molecule, such as a tri- or higher functional polyol, polyamine, or polythiol, a trimer (biuret type or isocyanurate type) of a di- or higher functional isocyanate compound, and a compound having three or more isocyanate groups in the molecule, such as a formalin condensate of benzene isocyanate are also preferable.

These tri- or higher functional isocyanate compounds may be mixtures including a plurality of compounds, a compound represented by the following General Formula (2) or (3) is preferably the main component of these mixtures, and other components may be included therein.

—Adduct Type—

The adduct type tri- or higher functional isocyanate compound is preferably a compound represented by the following General Formula (2) or (3).

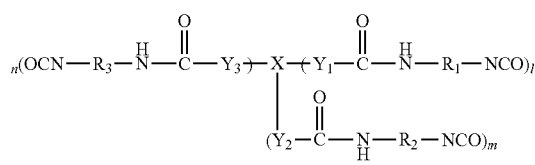

General Formula (2)

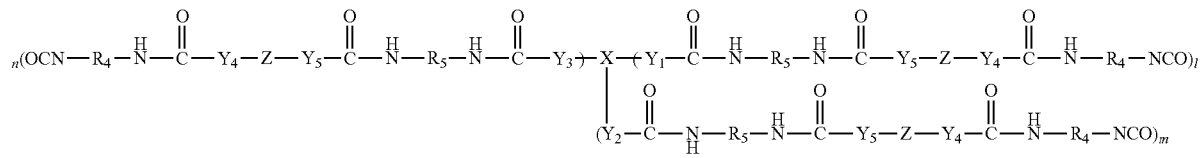

General Formula (3)

In General Formulas (2) and (3), X represents a (1+m+n) valent organic group, each of l, m, and n is 0 or greater, and 1+m+n is 3 or greater. 1+m+n is preferably 3 to 10, more preferably 3 to 8, and still more preferably 3 to 6.

In General Formulas (2) and (3), each of $Y_1$, $Y_2$, $Y_3$, $Y_4$, and $Y_5$ independently represents O, S, or NH, is preferably O or S, and more preferably O.

In General Formulas (2) and (3), Z represents a divalent organic group.

In General Formulas (2) and (3), each of $R_1$, $R_2$, $R_3$, $R_4$, and $R_5$ independently represents a divalent organic group. Each of the organic groups represented by $R_1$, $R_2$, $R_3$, $R_4$, or $R_5$ is independently preferably an alkylene group which may have a substituent having 1 to 20 carbon atoms, a cycloalkylene group which may have a substituent having 1 to 20 carbon atoms, or an arylene group which may have a substituent having 1 to 20 carbon atoms. Each of $R_1$, $R_2$, $R_3$, $R_4$, and $R_5$ is independently more preferably a group selected from groups represented by each of (3-1) to (3-11), (4-1), (4-2), and (5-1) to (5-7) described below. Moreover, * represents a linking site.

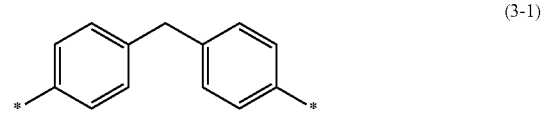
(3-1)

(3-2)

(3-3)

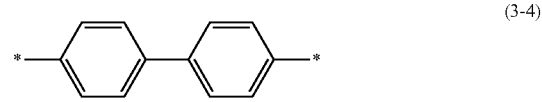
(3-4)

-continued

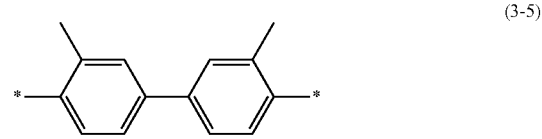
(3-5)

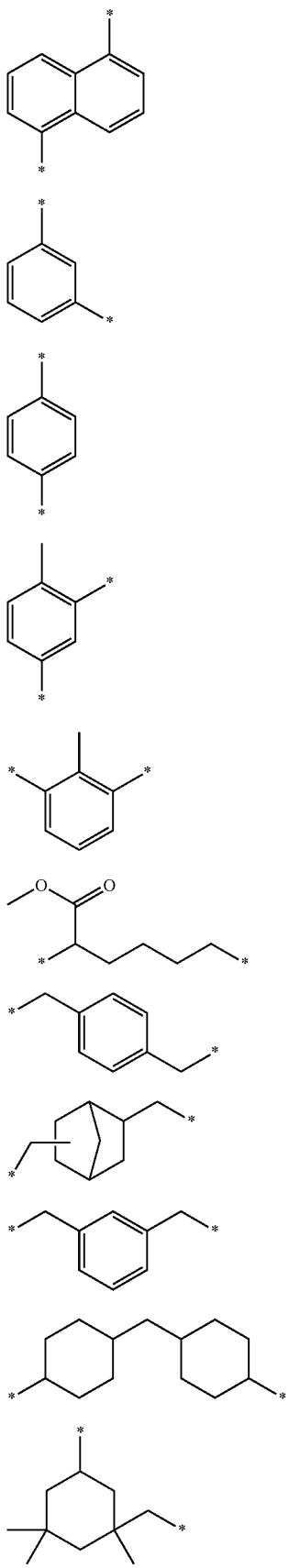

(3-6)
(3-7)
(3-8)
(3-9)
(3-10)
(3-11)
(4-1)
(4-2)
(5-1)
(5-2)
(5-3)

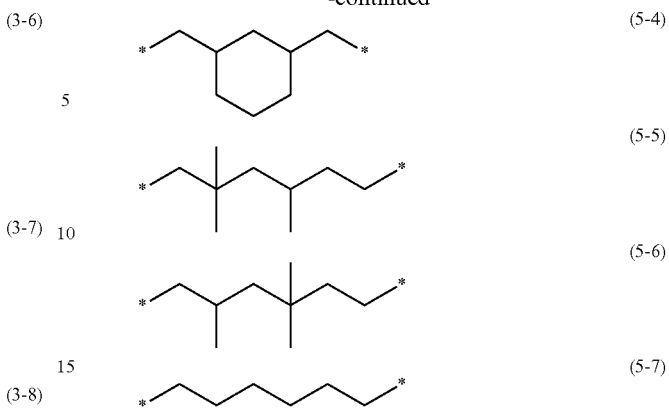

(5-4)
(5-5)
(5-6)
(5-7)

In General Formulas (2) and (3), each of $R_1$, $R_2$, $R_3$, $R_4$, and $R_5$ is independently more preferably any one of a group (5-3) derived from isophorone diisocyanate (IPDI), a group (5-7) derived from hexamethylene diisocyanate (HDI), a group (5-5) derived from trimethyl hexamethylene diisocyanate (TMHDI), a group (5-4) derived from 1,3-bis(isocyanatomethyl)cyclohexane, a group (5-1) derived from m-xylylene diisocyanate (XDI), and a group (5-2) derived from dicyclohexylmethane-4,4'-diisocyanate (* represents a linking site).

Synthesis of an adduct type tri- or higher functional isocyanate compound can be performed by reacting a compound having three or more active hydrogen groups in the molecule described below with a di- or higher functional isocyanate compound described below. Moreover, the active hydrogen group means a hydroxyl group, a primary amino group, a secondary amino group, and a mercapto group.

The adduct type tri- or higher functional isocyanate compound can be obtained by, for example, by heating (50° C. to 100° C.) a mixture of a compound having three or more active hydrogen groups in the molecule and a di- or higher functional isocyanate compound in an organic solvent while stirring or by stirring a mixture of a compound having three or more active hydrogen groups in the molecule and a di- or higher functional isocyanate compound in an organic solvent at a low temperature (0° C. to 70° C.) while adding a catalyst such as tin(II) octylate (synthesis scheme 1 described below).

In general, as the molar number (the number of molecules) of the di- or higher functional isocyanate compound reacted with the compound having three or more active hydrogen groups in the molecule, 0.6 or more times molar number (the number of molecules) di- or higher functional isocyanate compound of the molar number (the number of equivalents of the active hydrogen group) of the active hydrogen groups in the compound having three or more active hydrogen groups in the molecule is used. The molar number of the di- or higher functional isocyanate compound is preferably a 0.6 times to 5 times molar number of the active hydrogen group described above, more preferably 0.6 times to 3 times, and still more preferably 0.8 times to 2 times.

synthesis scheme 1

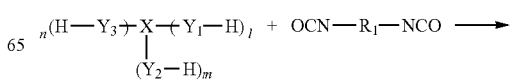

$$_n(\text{OCN}-\text{R}_1-\overset{\text{H}}{\text{N}}-\overset{\text{O}}{\overset{\|}{\text{C}}}-\text{Y}_3\!\!\!+\!\!\text{X}\!\!+\!\!\text{Y}_1-\overset{\text{O}}{\overset{\|}{\text{C}}}-\overset{\text{H}}{\text{N}}-\text{R}_1-\text{NCO})_l$$
$$(\text{Y}_2-\overset{\text{O}}{\overset{\|}{\text{C}}}-\overset{}{\underset{\text{H}}{\text{N}}}-\text{R}_1-\text{NCO})_m$$

In addition, the adduct type tri- or higher functional isocyanate compound can also be obtained by synthesizing an adduct (a prepolymer) of a compound having two active hydrogen groups in the molecule and a di- or higher functional isocyanate compound and by reacting this prepolymer with a compound having three or more active hydrogen groups in the molecule (synthesis scheme 2 described below).

synthesis scheme 2

$$_n(\text{H}-\text{Y}_5\!\!+\!\!\text{Z}\!\!+\!\!\text{Y}_4-\text{H})_l + \text{OCN}-\text{R}_1-\text{NCO} \longrightarrow \text{OCN}-\text{R}_1-\overset{\text{H}}{\text{N}}-\overset{\text{O}}{\overset{\|}{\text{C}}}-\text{Y}_5-\text{Z}-\text{Y}_4-\overset{\text{O}}{\overset{\|}{\text{C}}}-\overset{\text{H}}{\text{N}}-\text{R}_1-\text{NCO}$$
prepolymer $$_n(\text{H}-\text{Y}_3\!\!+\!\!\text{X}\!\!+\!\!\text{Y}_1-\text{H})_l + \text{OCN}-\text{R}_1-\overset{\text{H}}{\text{N}}-\overset{\text{O}}{\overset{\|}{\text{C}}}-\text{Y}_5-\text{Z}-\text{Y}_4-\overset{\text{O}}{\overset{\|}{\text{C}}}-\overset{\text{H}}{\text{N}}-\text{R}_1-\text{NCO} \longrightarrow$$
$$(\text{Y}_2-\text{H})_m \qquad\qquad \text{prepolymer}$$

$$_n(\text{OCN}-\text{R}_1-\overset{\text{H}}{\text{N}}-\overset{\text{O}}{\overset{\|}{\text{C}}}-\text{Y}_4-\text{Z}-\text{Y}_5-\overset{\text{O}}{\overset{\|}{\text{C}}}-\overset{\text{H}}{\text{N}}-\text{R}_1-\overset{\text{H}}{\text{N}}-\overset{\text{O}}{\overset{\|}{\text{C}}}-\text{Y}_3\!\!+\!\!\text{X}\!\!+\!\!\text{Y}_1-\overset{\text{O}}{\overset{\|}{\text{C}}}-\overset{\text{H}}{\text{N}}-\text{R}_1-\overset{\text{H}}{\text{N}}-\overset{\text{O}}{\overset{\|}{\text{C}}}-\text{Y}_5-\text{Z}-\text{Y}_4-\overset{\text{O}}{\overset{\|}{\text{C}}}-\overset{\text{H}}{\text{N}}-\text{R}_1-\text{NCO})_l$$
$$(\text{Y}_2-\overset{\text{O}}{\overset{\|}{\text{C}}}-\overset{}{\underset{\text{H}}{\text{N}}}-\text{R}_1-\overset{\text{H}}{\text{N}}-\overset{\text{O}}{\overset{\|}{\text{C}}}-\text{Y}_5-\text{Z}-\text{Y}_4-\overset{\text{O}}{\overset{\|}{\text{C}}}-\overset{\text{H}}{\text{N}}-\text{R}_1-\text{NCO})_m$$

Examples of the di- or higher functional isocyanate compound include a di- or higher functional aromatic isocyanate compound and a di- or higher functional aliphatic isocyanate compound.

Specific examples of the di- or higher functional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyldiisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenyl hexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethyl hexamethylene diisocyanate (TMHDI), lysine diisocyanate, and 1,3-bis(2-isocyanato-2-propyl)benzene.

Among these di- or higher functional isocyanate compounds, a compound having a structure shown in each of (8-1) to (8-24) described below is preferable.

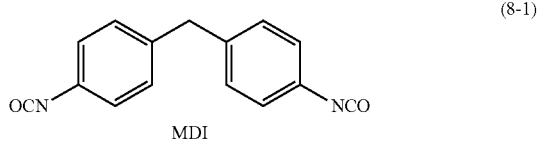
(8-1)
MDI

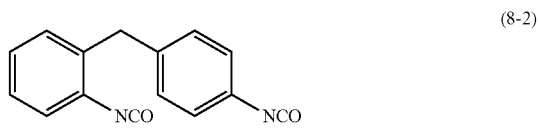
(8-2)

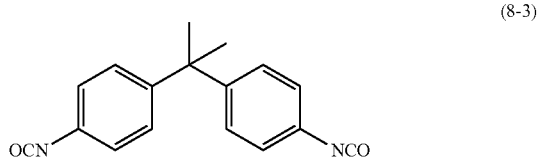
(8-3)

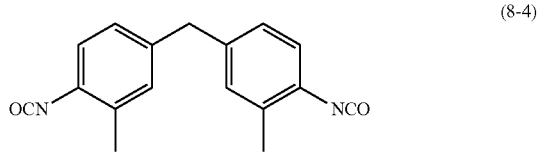
(8-4)

(8-5)

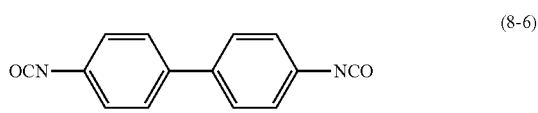
(8-6)

-continued

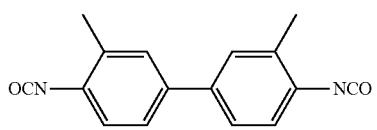
(8-7)

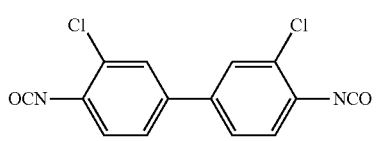
(8-8)

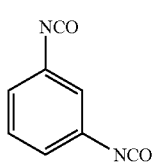
(8-9)

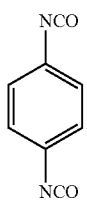
(8-10)

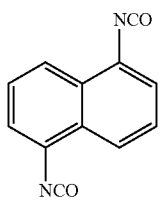
(8-11)

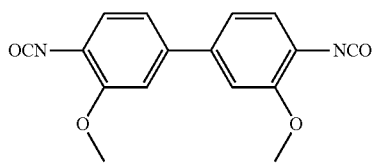
(8-12)

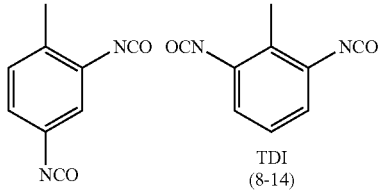

TDI
(8-13)

TDI
(8-14)

one or a mixture thereof

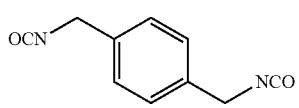
(8-15)

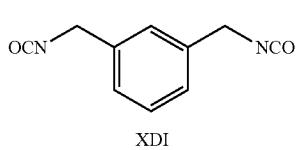
(8-16)

XDI

-continued (8-17)

HMDI (8-18)

NBDI (8-19)

(8-20)

IPDI (8-21)

HXDI (8-22)    (8-23)

one or a mixture thereof
TMHDI (8-24)

HDI

Among these di- or higher functional isocyanate compounds, isophorone diisocyanate (IPDI), hexamethylene diisocyanate (HDI), trimethyl hexamethylene diisocyanate (TMHDI), 1,3-bis(isocyanatomethyl)cyclohexane (HXDI), m-xylylene diisocyanate (XDI), or dicyclohexylmethane-4,4'-diisocyanate is preferable.

In addition, as the di- or higher functional isocyanate compound, difunctional isocyanate compounds derived from the above-described compounds can also be used. Examples thereof include DURANATE (registered trademark) D101, D201, and A101 (manufactured by Asahi Kasei Corporation).

The compound having three or more active hydrogen groups in the molecule is a compound having three or more of at least one type of group selected from a hydroxyl group, a primary amino group, a secondary amino group, and a mercapto group, in the molecule, and examples thereof include a compound having a structure represented by each of (9-1) to (9-13) described below. Moreover, in the following structures, n represents an integer selected from 1 to 100.

(9-1)
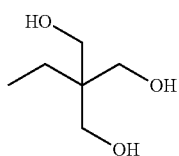
(9-2)
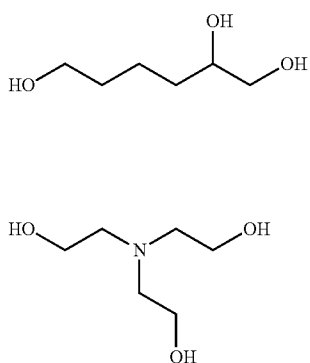
(9-3)
(9-4)
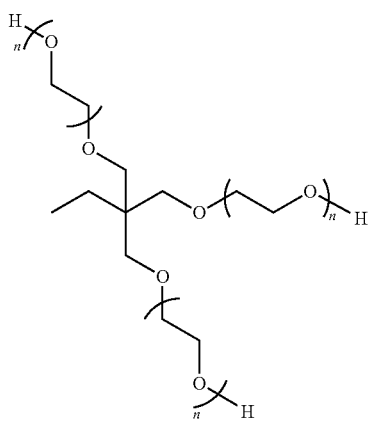
(9-5)
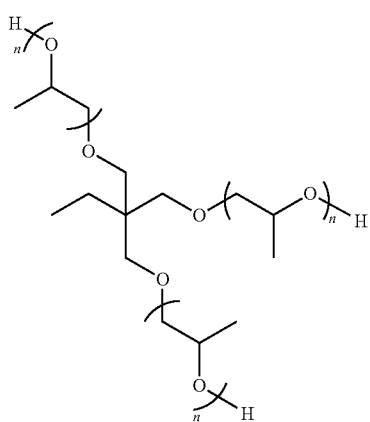
-continued
(9-6)
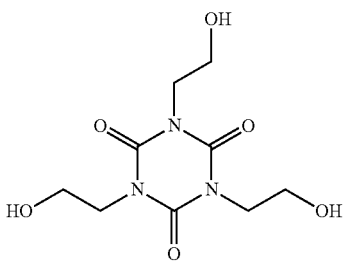
(9-7)
(9-8)
(9-9)
(9-10)

(9-11)

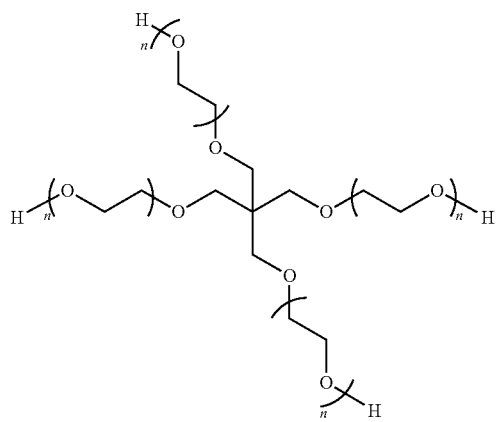

(9-12)

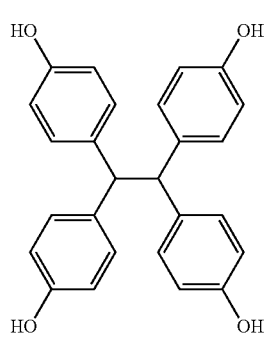

(9-13)

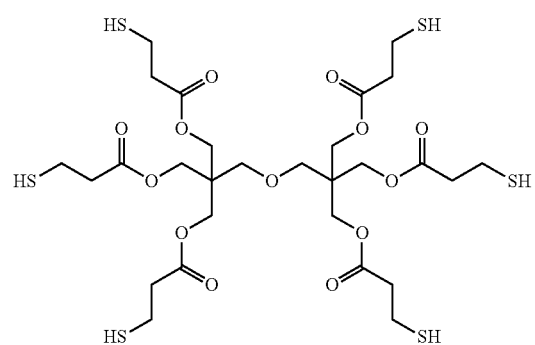

As the adduct type tri- or higher functional isocyanate compound, a compound obtained by reacting a compound having two or more active hydrogen groups in the molecule with a di- or higher functional isocyanate compound in combination shown in the following Table 1 is preferably used.

TABLE 1

| Com- | Polyisocyanate structure | | Composition | |
|---|---|---|---|---|
| | | | Compound having two or more active | Difunctional isocyanate compound |
| pound No. | Compound having two or more active hydrogen groups | Difunctional isocyanate compound | hydrogen groups (molar equivalent) | (molar equivalent) |
| NCO 101 | ![structure] | 2,4-Tolylene diisocyanate (TDI) | 1 | 4 |
| NCO 102 | | m-Xylylene diisocyanate (XDI) | 1 | 4 |
| NCO 103 | | Hexamethylene diisocyanate (HDI) | 1 | 4 |
| NCO 104 | | 1,3-Bis(isocyanatomethyl) cyclohexane (HXDI) | 1 | 4 |
| NCO 105 | | Isophorone diisocyanate (IPDI) | 1 | 4 |
| NCO 106 | ![structure] | Hexamethylene diisocyanate (HDI) | 1 | 4 |
| NCO 107 | 1,3,5-trihydroxybenzene | Isophorone diisocyanate (IPDI) | 1 | 4 |

TABLE 1-continued

| Compound No. | Polyisocyanate structure — Compound having two or more active hydrogen groups | Difunctional isocyanate compound | Composition — Compound having two or more active hydrogen groups (molar equivalent) | Composition — Difunctional isocyanate compound (molar equivalent) |
|---|---|---|---|---|
| NCO 108 | pentaerythritol ethylene oxide | 1,3-Bis(isocyanatomethyl)cyclohexane (HXDI) | 1 | 5 |
| NCO 109 | pentaerythritol ethylene oxide | Isophorone diisocyanate (IPDI) | 1 | 5 |
| NCO 110 | dipentaerythritol hexakis(3-mercaptopropionate) | Hexamethylene diisocyanate (HDI) | 1 | 7 |
| NCO 111 | dipentaerythritol hexakis(3-mercaptopropionate) | Isophorone diisocyanate (IPDI) | 1 | 7 |
| NCO 112 | triethanolamine | Hexamethylene diisocyanate (HDI) | 1 | 4 |
| NCO 113 | triethanolamine | Isophorone diisocyanate (IPDI) | 1 | 4 |

As the adduct type tri- or higher functional isocyanate compound, among the compounds shown in Table 1, NCO 102 to NCO 105, NCO 107, NCO 108, NCO 111, and NCO 113 are more preferable.

As the adduct type tri- or higher functional isocyanate compound, commercially available products may be used, and examples thereof include D-102, D-103, D-103H, D-103M2, P49-75S, D-110, D-120N, D-140N, and D-160N (manufactured by Mitsui Chemicals, Inc.), Desmodur (registered trademark) L75 and UL57SP (manufactured by Sumika Bayer Urethane Co., Ltd.), CORONATE (registered trademark) HL, HX, and L (manufactured by Nippon Polyurethane Industry Co., Ltd.), and P301-75E (manufactured by Asahi Kasei Corporation).

Among these adduct type tri- or higher functional isocyanate compounds, D-110, D-120N, D-140N, and D-160N (manufactured by Mitsui Chemicals, Inc.) are more preferable.

—Biuret Type or Isocyanurate Type—

The biuret type or isocyanurate type tri- or higher functional isocyanate compound is preferably a compound represented by the following General Formula (4) or (5).

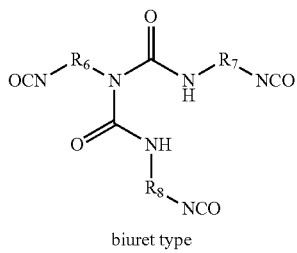

General Formula (4)

biuret type

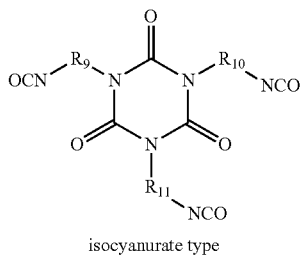

General Formula (5)

isocyanurate type

In General Formulas (4) and (5), each of $R_6$, $R_7$, $R_8$, $R_9$, $R_{10}$, and $R_{11}$ independently represents a divalent organic group. Each of the organic groups represented by $R_6$, $R_7$, $R_8$, $R_9$, $R_{10}$, and $R_{11}$ is independently preferably an alkylene group which may have a substituent having 1 to 20 carbon atoms, a cycloalkylene group which may have a substituent having 1 to 20 carbon atoms, or an arylene group which may have a substituent having 1 to 20 carbon atoms. Each of $R_6$, $R_7$, $R_8$, $R_9$, $R_{10}$, and $R_{11}$ is independently preferably a group selected from groups represented by each of (3-1) to (3-11), (4-1), (4-2), and (5-1) to (5-7) described above. Moreover, * represents a linking site.

In General Formulas (4) and (5), each of $R_6$, $R_7$, $R_8$, $R_9$, $R_{10}$, and $R_{11}$ is independently more preferably a group (5-3) derived from isophorone diisocyanate (IPDI), a group (5-7) derived from hexamethylene diisocyanate (HDI), a group (5-5) derived from trimethyl hexamethylene diisocyanate (TMHDI), a group (5-4) derived from 1,3-bis(isocyanatomethyl)cyclohexane, a group (5-1) derived from m-xylylene diisocyanate (XDI), or a group (5-2) derived from dicyclohexylmethane-4,4'-diisocyanate (* represents a linking site).

As the biuret type tri- or higher functional isocyanate compound, commercially available products may be used, and examples thereof include D-165N and NP1100 (manufactured by Mitsui Chemicals, Inc.), Desmodur (registered trademark) N3200 (manufactured by Sumika Bayer Urethane Co., Ltd.), and DURANATE (registered trademark) 24A-100 (manufactured by Asahi Kasei Corporation).

In addition, as the isocyanurate type tri- or higher functional isocyanate compound, commercially available products may be used, and examples thereof include D-127, D-170N, D-170HN, D-172N, and D-177N (manufactured by Mitsui Chemicals, Inc.), SUMIDUR N3300, Desmodur (registered trademark) N3600, N3900, and Z4470BA (manufactured by Sumika Bayer Urethane Co., Ltd.), CORONATE (registered trademark) HX and HK (manufactured by Nippon Polyurethane Industry Co., Ltd.), and DURANATE (registered trademark) TPA-100, TKA-100, TSA-100, TSS-100, TLA-100, and TSE-100 (manufactured by Asahi Kasei Corporation).

Among these biuret type and isocyanurate type tri- or higher functional isocyanate compounds, DURANATE (registered trademark) 24A-100 (manufactured by Asahi Kasei Corporation), D-127 (manufactured by Mitsui Chemicals, Inc.), or TKA-100 and TSE-100 (manufactured by Asahi Kasei Corporation) is more preferable.

(Compound Having Water or Two or More Active Hydrogen Groups)

The gel particles are preferably produced by reacting the tri- or higher functional isocyanate compound described above with water or a compound having two or more active hydrogen groups.

As a compound reacted with the tri- or higher functional isocyanate compound, water is generally used. By a reaction of the tri- or higher functional isocyanate compound with water, a three-dimensional crosslinked structure having a urea bond is formed.

In addition, as a compound reacted with the tri- or higher functional isocyanate compound, other than water, a compound having two or more active hydrogen groups is exemplified, and as the compound having two or more active hydrogen groups, a multifunctional alcohol, a multifunctional phenol, a multifunctional amine having a hydrogen atom on the nitrogen atom, and a multifunctional thiol can also be used.

Specific examples of the multifunctional alcohol include propylene glycol, glycerin, trimethylolpropane, and 4,4',4"-trihydroxytriphenylmethane.

Specific examples of the multifunctional amine include diethylenetriamine and tetraethylenepentamine.

Specific examples of the multifunctional thiol include 1,3-propanedithiol and 1,2-ethanedithiol.

Specific examples of the multifunctional phenol include bisphenol A.

These compounds may be used alone or in combination of two or more types thereof.

Moreover, in the compound having two or more active hydrogen groups, the above-described compound having three or more active hydrogen groups in the molecule is also included.

(Polymerizable Group of Gel Particles)

The gel particles have a polymerizable group.

The gel particles may have a polymerizable group by introducing the polymerizable group into a three-dimensional crosslinked structure, or may have a polymerizable group by a polymerizable monomer being included in the inside of the gel particles (the pores of the three-dimensional crosslinked structure). In addition, both may coexist.

In a case where a polymerizable monomer is not included in the inside of the gel particles, the gel particles have a polymerizable group in the three-dimensional crosslinked structure.

The gel particles preferably have a polymerizable group on the surface or on the surface of the gel particles and in the vicinity of the surface from the viewpoint of sensitivity and crosslinkability.

In a case where the gel particles have a polymerizable group, by irradiation with active energy rays, the gel particles adjacent to each other can be bonded to each other to form a crosslinked structure, and thus, it is possible to form an image having high crosslinkability and an excellent film strength.

Examples of the method for introducing a polymerizable group into the gel particles include a method in which, when forming a three-dimensional crosslinked structure having at least one type of bond selected from a urethane bond and a urea bond, the tri- or higher functional isocyanate compound described above, water or the above-described compound having two or more active hydrogen groups, and a polymerizable compound as a polymerizable group introduced monomer are reacted, a method in which, when producing the tri- or higher functional isocyanate compound described above, the di- or higher functional isocyanate compound described above and a polymerizable compound as a polymerizable group introduced monomer are reacted, and an isocyanate compound into which a polymerizable group is introduced in advance and water or the above-described compound having two or more active hydrogen groups are reacted, and a method in which, when producing the gel particles, an isocyanate compound as a polymerizable group introduced monomer is dissolved in an oil phase component together with the components configuring the gel particles, an aqueous phase component is added to the oil phase component, and the resultant product is mixed and emulsified.

Examples of the polymerizable compound used for introducing a polymerizable group into the gel particles include a compound having at least one active hydrogen group and an ethylenically unsaturated bond at at least one terminal thereof.

The compound having at least one active hydrogen group and an ethylenically unsaturated bond at at least one terminal thereof can be represented by the following Structural Formula (a).

$$L^1 Lc_m Z_n \qquad (a)$$

In Structural Formula (a), $L^1$ represents a m+n valent linking group, each of m and n is independently an integer selected from 1 to 100, Lc represents a monovalent ethylenically unsaturated group, and Z represents an active hydrogen group.

$L^1$ is preferably a di- or higher valent aliphatic group, a di- or higher valent aromatic group, a di- or higher valent heterocyclic group, —O—, —S—, —NH—, —N<, —CO—, —SO—, —SO$_2$—, or a combination thereof.

Each of m and n is independently preferably 1 to 50, more preferably 2 to 20, still more preferably 3 to 10, and particularly preferably 3 to 5.

Examples of the monovalent ethylenically unsaturated group represented by Lc include an allyl group, a vinyl group, an acryloyl group, and a methacryloyl group.

Z is preferably OH, SH, NH, or NH$_2$, more preferably OH or NH$_2$, and still more preferably OH.

Examples of the compound having at least one active hydrogen group and an ethylenically unsaturated bond at at least one terminal thereof are shown below, but the present invention is not limited to the structures. Moreover, n in the compounds (11-3) and (12-2) represents, for example, an integer selected from 1 to 90.

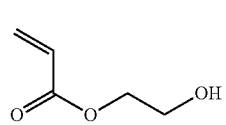
(11-1)

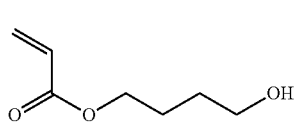
(11-2)

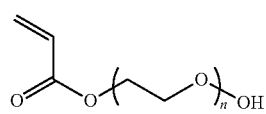
(11-3)

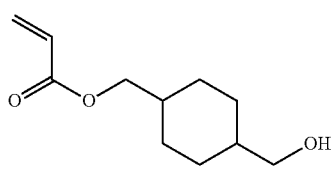
(11-4)

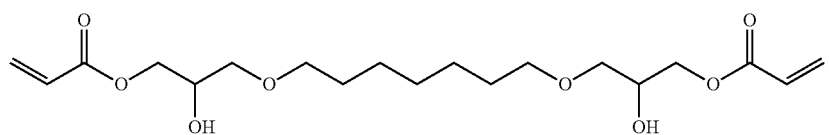
(11-5)

DA-212

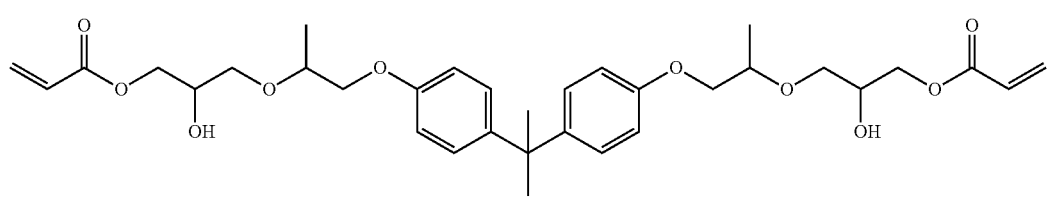
(11-6)

DA-250

-continued

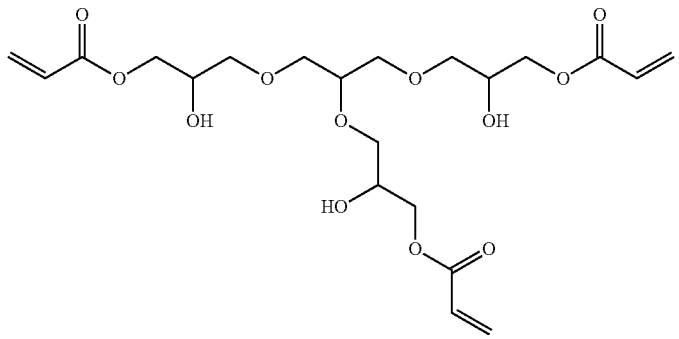

DA-314

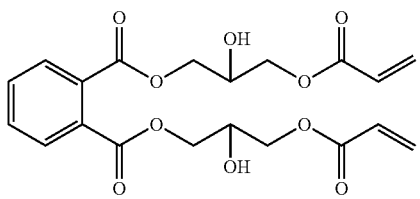

DA-721

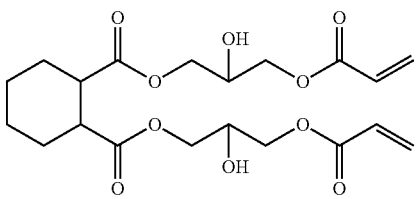

DA-722

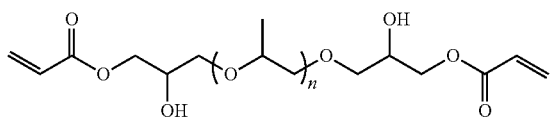

DA-911M
n = 1

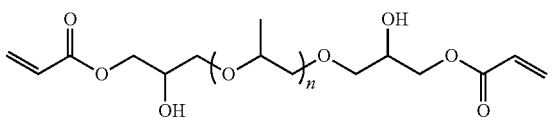

DA-920
n = 3

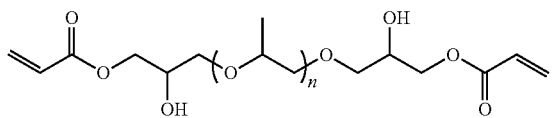

DA-931
n = 11

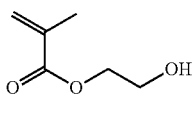

(12-1)

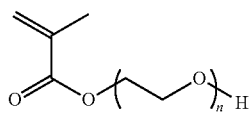

(12-2)

(13-1)

As the compound having at least one active hydrogen group and an ethylenically unsaturated bond at at least one terminal thereof, commercially available products may be used, and examples thereof include acrylates such as hydroxyethyl acrylate (manufactured by Osaka Organic Chemical Industry Ltd.), 4-hydroxybutyl acrylate and 1,4-cyclohexanedimethanol monoacrylate (manufactured by Nippon Kasei Chemical Co., Ltd.), BLEMMER (registered trademark) AE-90U (n=2), AE-200 (n=4.5), AE-400 (n=10), AP-150 (n=3), AP-400 (n=6), AP-550 (n=9), and AP-800 (n=13) (manufactured by NOF Corporation), and DENACOL (registered trademark) ACRYLATE DA-212, DA-250, DA-314, DA-721, DA-722, DA-911M, DA-920, and DA-931 (manufactured by Nagase ChemteX Corporation), methacrylates such as 2-hydroxyethyl methacrylate (manufactured by Kyoeisha Chemical Co., Ltd.), BLEMMER (registered trademark) PE-90 (n=2), PE-200 (n=4.5), PE-350 (n=8), PP-1000 (N=4 to 6), PP-500 (n=9), and PP-800 (n=13) (manufactured by NOF Corporation), and acrylamide (manufactured by KJ Chemicals Corporation).

Among these compounds having at least one active hydrogen group and an ethylenically unsaturated bond at at least one terminal thereof, hydroxyethyl acrylate (manufactured by Osaka Organic Chemical Industry Ltd.), AE-400 (n=10) and AP-400 (n=6) (manufactured by NOF Corporation), DENACOL (registered trademark) ACRYLATE DA-212 (manufactured by Nagase ChemteX Corporation), or PP-500 (n=9) (manufactured by NOF Corporation) is preferable.

For example, as shown in the following synthesis scheme 3, the introduction of the polymerizable group into gel particles can be performed by producing an isocyanate compound into which a polymerizable group has been introduced by reacting an isocyanate group of the tri- or higher functional isocyanate compound with the active hydrogen group of the compound having at least one active hydrogen group and an ethylenically unsaturated bond at at least one terminal thereof and by reacting the produced isocyanate compound into which a polymerizable group has been introduced with the above-described compound having two or more active hydrogen groups.

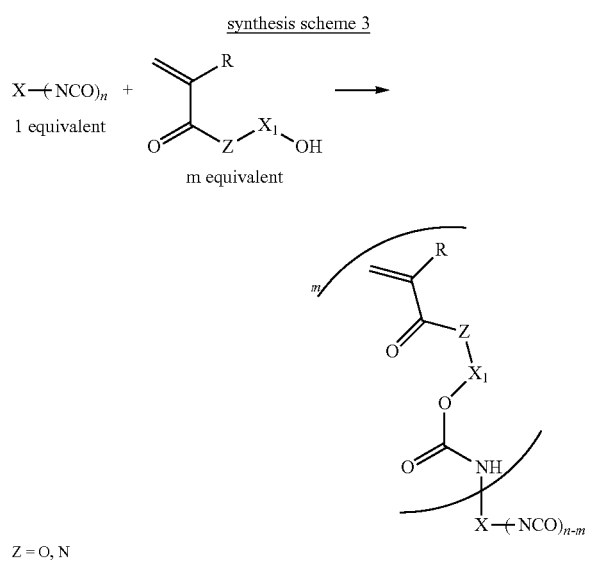

synthesis scheme 3

$Z = O, N$

In the case of using an isocyanate compound into which a polymerizable group has been introduced in production of the gel particles, a compound obtained by reacting a compound having at least one active hydrogen group and an ethylenically unsaturated bond at at least one terminal thereof (in Table 2, referred to as a polymerizable group introduced monomer) with a tri- or higher functional isocyanate compound (in Table 2, referred to as a polyisocyanate) in combination shown in the following Table 2 is preferably used.

These compounds having at least one active hydrogen group and an ethylenically unsaturated bond at at least one terminal thereof may be one type alone, or may be a combination of two or more types thereof.

The isocyanate group of a tri- or higher functional isocyanate compound (in Table 2, referred to as a polyisocyanate) and the active hydrogen group of a compound having one active hydrogen group and an ethylenically unsaturated bond at at least one terminal thereof (in Table 2, referred to as a polymerizable group introduced monomer) is reacted preferably in the amount in which the molar number of the active hydrogen group in the compound having at least one active hydrogen group and an ethylenically unsaturated bond at at least one terminal thereof becomes 0.01 times to 0.3 times molar number of the isocyanate group of the tri- or higher functional isocyanate compound, more preferably in the amount in which the molar number of the active hydrogen group becomes 0.02 times to 0.25 times molar number of the isocyanate group, and still more preferably in the amount in which the molar number of the active hydrogen group becomes 0.03 times to 0.2 times molar number of the isocyanate group.

In the compound obtained by a reaction of an di- or higher functional isocyanate compound including a tri- or higher functional isocyanate compound with a compound having one active hydrogen group and an ethylenically unsaturated bond at at least one terminal thereof, the average number of functional groups of the isocyanate group in the compound becomes 3 or less in some cases, but in a case where at least one tri- or higher functional isocyanate compound is included in the raw materials, it is possible to form a three-dimensional crosslinked structure when producing the gel particles.

(Photopolymerization Initiator)

The gel particles enclose at least one type of a photopolymerization initiator.

By the gel particles enclosing a photopolymerization initiator, the sensitivity with respect to active energy rays is increased, and an image having an excellent film strength is obtained. In addition, by the gel particles enclosing a photopolymerization initiator, a photopolymerization initiator which has been difficult to be used in the related art since dispersibility or solubility in water is low whereas sensitivity is high can be used. Therefore, in a case where the gel particles are applied to the ink composition, an ink composition having high sensitivity can be achieved compared to the ink composition in the related art. In addition, by the gel particles enclosing a photopolymerization initiator, the range of choice in photopolymerization initiators to be used

TABLE 2

| | Polyisocyanate structure | | Composition Amount of active hydrogen group of polymerizable |
|---|---|---|---|
| Compound No. | Polyisocyanate | Polymerizable group introduced monomer | group introduced monomer with respect to NCO group of polyisocyanate (mol %) |
| NCO 201 | NCO 104 | Hydroxybutyl acrylate | 15 |
| NCO 202 | NCO 104 | BLEMMER AP-400 | 15 |
| NCO 203 | NCO 104 | BLEMMER AE-400 | 15 |
| NCO 204 | NCO 104 | BLEMMER PP-500 | 15 |
| NCO 205 | NCO 104 | DA212 | 15 |
| NCO 206 | NCO 104 | DA920 | 15 |
| NCO 207 | DURANATE 24A-100 | BLEMMER AP-400 | 15 |
| NCO 208 | D-127 | BLEMMER AP-400 | 15 |
| NCO 209 | SUMIDUR N3300 | BLEMMER AP-400 | 15 |
| NCO 210 | DURANATE TKA-100 | BLEMMER AP-400 | 15 |
| NCO 211 | DURANATE TSE-100 | BLEMMER AP-400 | 15 | is widened, and thus, the range of choice in light sources capable of being used is also widened. Therefore, curing sensitivity can be improved compared to that in the related art.

As the photopolymerization initiator included in the inside of the gel particles (hereinafter, also referred an enclosed photopolymerization initiator), a known photopolymerization initiator can be suitably selected and used depending on the intended use such an ink composition.

The enclosed photopolymerization initiator is a compound which generates a radical which is a polymerization initiating species by absorbing active energy rays. Examples of the active energy rays include γ-rays, β-rays, an electron beam, ultraviolet rays, visible rays, and infrared rays.

As the enclosed photopolymerization initiator, known compounds can be used, and examples of a preferable enclosed photopolymerization initiator capable of being used in an embodiment of the present invention include (a) carbonyl compounds such as aromatic ketones, (b) acylphosphine oxide compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon-halogen bond, and (m) alkyl amine compounds.

As these enclosed photopolymerization initiators, the compounds of the above-described (a) to (m) may be used alone or in combination of two or more types thereof.

Preferable examples of (a) carbonyl compounds, (b) acylphosphine oxide compounds, and (e) thio compounds include compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117.

More preferable examples thereof include an α-thiobenzophenone compound described in JP1972-6416B (JP-S47-6416B), a benzoin ether compound described in JP1972-3981B (JP-S47-3981B), an α-substituted benzoin compound described in JP1972-22326B (JP-S47-22326B), a benzoin derivative described in JP1972-23664B (JP-S47-23664B), an aroylphosphonic acid ester described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JP-S62-81345A), α-amino benzophenones described in JP1989-34242B (JP-H1-34242B), U.S. Pat. No. 4,318,791A, and EP0284561A1, p-di(dimethylaminobenzoyl)benzene described in JP1990-211452A (JP-H2-211452A), a thio substituted aromatic ketone described in JP1986-194062A (JP-S61-194062A), an acylphosphine sulfide described in JP1990-9597B (JP-H2-9597B), an acylphosphine described in JP1990-9596B (JP-H2-9596B), thioxanthones described in JP1988-61950B (JP-S63-61950B), and coumarins described in JP1984-42864B (JP-S59-42864B).

In addition, the polymerization initiators described in JP2008-105379A and JP2009-114290A are also preferable.

Among these enclosed photopolymerization initiators, (a) carbonyl compounds and (b) acylphosphine oxide compounds are more preferable, and specific examples thereof include bis(2,4,6-trimethylbenzoyl)-phenylphosphine oxide (for example, IRGACURE (registered trademark) 819 manufactured by BASF Corp.), 2-(dimethylamine)-1-(4-morpholinophenyl)-2-benzyl-1-butanone (for example, IRGACURE (registered trademark) 369 manufactured by BASF Corp.), 2-methyl-1-(4-methylthiophenyl)-2-morpholinopropan-1-one (for example, IRGACURE (registered trademark) 907 manufactured by BASF Corp.), 1-hydroxycyclohexyl-phenyl-ketone (for example, IRGACURE (registered trademark) 184 manufactured by BASF Corp.), and 2,4,6-trimethylbenzoyl-diphenyl-phosphine oxide (for example, DAROCUR (registered trademark) TPO and LUCIRIN (registered trademark) TPO (both manufactured by BASF Corp.)).

Among these, as the enclosed photopolymerization initiator, (b) acylphosphine oxide compounds are still more preferable, and at least one selected from LUCIRIN (registered trademark) TPO which is a monoacylphosphine oxide compound and IRGACURE (registered trademark) 819 which is a bisacylphosphine oxide compound is particularly preferable from the viewpoint of sensitivity improvement and compatibility to LED light.

The enclosed photopolymerization initiator can be included in the inside of the gel particles by dissolving the enclosed photopolymerization initiator together with the components configuring the gel particles in an oil phase component, by adding an aqueous phase component to the oil phase component and mixing these components, and by emulsifying the resultant product, when producing the gel particles.

The content of the enclosed photopolymerization initiator is preferably 0.1% by mass to 25% by mass, more preferably 0.5% by mass to 20% by mass, and still more preferably 1% by mass to 15% by mass, with respect to the total solid content of the gel particles.

(Polymerizable Monomer)

The gel particles preferably further enclose a polymerizable monomer.

An aspect in which the gel particles enclose a polymerizable monomer is advantageous from the viewpoint of improving the curing sensitivity of a film and the hardness of a film.

Moreover, in a case where the gel particles do not have a polymerizable group in the three-dimensional crosslinked structure, the gel particles enclose a polymerizable monomer, and the polymerizable group in the polymerizable monomer functions as a polymerizable group which the gel particles have.

The polymerizable monomer which the gel particles enclose (hereinafter, also referred to as an enclosed polymerizable monomer) can be selected from polymerizable monomers having a radically polymerizable ethylenically unsaturated bond.

Examples of the polymerizable monomer having radically polymerizable ethylenically unsaturated bond capable of being used as the enclosed polymerizable monomer include radically polymerizable monomers such as a compound having an ethylenically unsaturated group, acrylonitrile, styrene, and a variety of unsaturated polyesters, unsaturated polyethers, unsaturated polyamides, and unsaturated urethanes.

As the enclosed polymerizable monomer, a compound having an ethylenically unsaturated group is preferable.

The enclosed polymerizable monomers may be used alone or in combination of two or more types thereof.

Specific examples of the enclosed polymerizable monomer include acrylate monomers such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate, bis(4-acryloxypolyethoxyphenyl)propane, polyethylene glycol diacrylate, polypropylene glycol diacrylate, dipentaerythritol tetraacrylate, trimethylolpropane triacrylate (for example, A-TMPT manufactured by Shin-Nakamura Chemical Co., Ltd.), pentaerythritol triacrylate (for example, A-TMM-3L manufactured by Shin-Nakamura Chemical Co., Ltd.), ditrimethylolpropane tetraacrylate (for example, AD-TMP manufactured by Shin-Nakamura Chemical Co., Ltd.), dipentaerythritol pentaacrylate (for example, SR-399E manufactured by Sartomer Co., Ltd.), dipentaerythritol hexaacrylate (for example, A-DPH manufactured by Shin-Nakamura Chemical Co., Ltd.), oligoester acrylate, N-methylolacrylamide, diacetone acrylamide, epoxyacrylate, isobornyl acrylate, dicyclopentenyl acrylate, dicyclopentenyloxyethyl acrylate, dicyclopentanyl acrylate, neopentyl glycol propyleneoxide adduct diacrylate (NPGPODA), cyclic trimethylolpropane formal acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, and 4-t-butylcyclohexyl acrylate; methacrylate monomers such as methyl methacrylate, n-butyl methacrylate, allyl methacrylate, glycidyl methacrylate, benzyl methacrylate, dimethylaminomethyl methacrylate, polyethylene glycol dimethacrylate, polypropylene glycol dimethacrylate, and 2,2-bis(4-methacryloxypolyethoxyphenyl)propane; and allyl glycidyl ether, diallyl phthalate, triallyl trimellitate, and N-vinyl caprolactam.

Among these enclosed polymerizable monomers, as the multifunctional polymerizable monomer, trimethylolpropane triacrylate, pentaerythritol triacrylate, ditrimethylolpropane tetraacrylate, dipentaerythritol pentaacrylate, dipentaerythritol hexaacrylate, or neopentyl glycol propyleneoxide adduct diacrylate is preferable, and dipentaerythritol pentaacrylate is more preferable. In addition, as the monofunctional polymerizable monomer, cyclic trimethylolpropane formal acrylate, isobornyl acrylate, tetrahydrofurfuryl acrylate, 2-(2-ethoxyethoxy)ethyl acrylate, 2-phenoxyethyl acrylate, or N-vinyl caprolactam is preferable.

In addition, the enclosed polymerizable monomer is preferably a multifunctional polymerizable monomer, more preferably a tri- or higher functional polymerizable monomer, and still more preferably a tetra- or higher functional polymerizable monomer from the viewpoint of crosslinkability and a film strength. The multifunctional enclosed polymerizable monomer is preferably a methacrylate monomer and an acrylate monomer, and more preferably an acrylate monomer.

The enclosed polymerizable monomer is still more preferably a tri- or higher functional acrylate monomer, and particularly preferably a tetra- or higher functional acrylate monomer.

In addition, by using the monofunctional enclosed polymerizable monomer described above as the enclosed polymerizable monomer, adhesion of a film to the recording medium is improved. Furthermore, by using two or more types of monofunctional enclosed polymerizable monomers described above in combination, adhesion of a film is further improved.

In addition, using two or more types of monofunctional enclosed polymerizable monomers and a multifunctional enclosed polymerizable monomer in combination, as the enclosed polymerizable monomer, in addition to the effects of improving the adhesion of a film, the effects of further improving the hardness of a film are also obtained.

In addition to the enclosed polymerizable monomers exemplified above, it is possible to use commercially available products described in "Crosslinking Agent Handbook", edited by Shinzo Yamashita, (1981, Taiseisha Ltd.); "UV-EB Curing Handbook (Raw Materials Edition)" edited by Kiyoshi Kato, (1985, Polymer Publication Society); "Application and Market of UV-EB Curing Technology" edited by RadTech Japan, p. 79 (1989, CMC Publishing Co., Ltd.); or "Polyester Resin Handbook" written by Eiichiro Takiyama, (1988, Nikkan kogyo Shimbun, Ltd.); or radically polymerizable or crosslinkable monomers known in the related art.

In addition, as the enclosed polymerizable monomer, for example, photocurable polymerizable monomers used in the photopolymerizable compositions described in each of JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A are known, and these are also applied to the gel particles.

In addition, as the enclosed polymerizable monomer, commercially available products may be used, and examples thereof include ethoxylated or propoxylated acrylates such as AH-600, AT-600, UA-306H, UA-306T, UA-3061, UA-510H, UF-8001G and DAUA-167 (manufactured by Kyoeisha Chemical Co., Ltd.), and SR444, SR454, SR492, SR499, CD501, SR502, SR9020, CD9021, SR9035, and SR494 (manufactured by Sartomer Co., Ltd.), and isocyanuric monomers such as A-9300 and A-9300-1CL (manufactured by Shin-Nakamura Chemical Co., Ltd.).

Additionally, as the polymerizable monomer, commercially available products such as NPGPODA (neopentyl glycol propyleneoxide adduct diacrylate, manufactured by Sartomer Co., Ltd.), SR399E (dipentaerythritol pentaacrylate, manufactured by Sartomer Co., Ltd.), ATMM-3L (pentaerythritol triacrylate, manufactured by Shin-Nakamura Chemical Co., Ltd.), A-DHP (dipentaerythritol hexaacrylate, manufactured by Shin-Nakamura Chemical Co., Ltd.), Aronix (registered trademark) M-156 (manufactured by Toagosei Co., Ltd.), V-CAP (manufactured by BASF Corp.), Viscoat #192 (manufactured by Osaka Organic Chemical Industry Ltd.), and SR-531, SR-285, and SR256 (manufactured by Sartomer Co., Ltd) can be suitably used.

The enclosed polymerizable monomer can be included in the inside of the gel particles by dissolving the enclosed polymerizable monomer together with the components configuring the gel particles in an oil phase component, by adding an aqueous phase component to the oil phase component and mixing these components, and by emulsifying the resultant product, when producing the gel particles.

The molecular weight of the enclosed polymerizable monomer is preferably 100 to 100000, more preferably 100 to 30000, still more preferably 100 to 10000, still further more preferably 100 to 1000, still further more preferably 100 to 900, still further more preferably 100 to 800, and particularly preferably 150 to 750, as a weight average molecular weight. The lower limit of the weight average molecular weight of the enclosed polymerizable monomer may be 200, or may be 250.

Moreover, the weight average molecular weight can be measured by gel permeation chromatography (GPC). The measurement method is as described above.

The content of the enclosed polymerizable monomer in the total solid content of the gel particles is preferably 0.1% by mass to 75% by mass, more preferably 0.5% by mass to 60% by mass, and still more preferably 1% by mass to 50% by mass. In a case where the content is within the above range, an image having good crosslinkability and film strength is obtained.

(Hydrophilic Group on Surface of Gel Particles)

The gel particles preferably include hydrophilic groups on the surface.

In a case where the gel particles have hydrophilic groups on the surfaces, the dispersibility in an aqueous medium is further improved. Therefore, in a case where the gel particles are used in an ink composition, it is possible to further improve the dispersibility of the ink composition.

In addition, in a case where the gel particles have hydrophilic groups on the surfaces, the hydrophilicity of the gel particles is improved, and the redispersibility is excellent.

In the gel particles, the hydrophilic group may be present as a part of the three-dimensional crosslinked structure or may be present as a portion other than the three-dimensional crosslinked structure.

Here, "the hydrophilic group is present as a part of the three-dimensional crosslinked structure" indicates that the hydrophilic group is covalently bonded to a portion other than the hydrophilic group in the three-dimensional crosslinked structure.

In addition "the hydrophilic group is present as a portion other than the three-dimensional crosslinked structure" indicates that an organic compound having a hydrophilic group is included in the gel particles separately from the three-dimensional crosslinked structure.

Examples of the hydrophilic group which is present on the surface portion of the gel particles include a carboxylic acid group, a salt of a carboxylic acid group, a phosphonic acid group, a salt of a phosphonic acid group, a phosphate group, a salt of a phosphate group, a sulfonic acid group, a salt of a sulfonic acid group, a sulfate group, a salt of a sulfate group, a group having a polyether structure, and a group having a betaine structure. Moreover, "the hydrophilic group" in the specification is distinguished from the above-described active hydrogen group (a hydroxy group, a primary amino group, a secondary amino group, and a mercapto group). Each of the salt of a carboxylic acid group, the salt of a sulfonic acid group, the salt of a sulfate group, the phosphonic acid group, and the salt of a phosphate group described above may be a salt formed by neutralization in a production step of the gel particles. In a case where the gel particles have hydrophilic groups on the surfaces thereof, the gel particles may have one type of hydrophilic group or two or more types of hydrophilic groups.

The hydrophilic group introduced on the surfaces of the gel particles is preferably at least one type selected from a group having a polyether structure, a carboxylic acid group, and a salt of a carboxylic acid group.

The introduction of a hydrophilic group on the surfaces of the gel particles can be performed by reacting the tri- or higher functional isocyanate compound described above and the above-described compound having two or more active hydrogen groups with a compound having a hydrophilic group. In addition, when producing the tri- or higher functional isocyanate compound described above, the tri- or higher functional isocyanate compound can also be produced by reacting the di- or higher functional isocyanate compound with a compound having a hydrophilic group and by reacting an isocyanate compound into which a hydrophilic group is introduced in advance with the above-described compound having two or more active hydrogen groups.

Examples of the compound having a hydrophilic group used for introducing a hydrophilic group on the surfaces of the gel particles include the compound having a hydrophilic group described above.

As the compound having a hydrophilic group, a compound having a polyether structure, a compound having a carboxylic acid group, or a compound having a salt of a carboxylic acid group is preferable.

Examples of the compound having a polyether structure include a compound having a polyoxyalkylene chain. Specific examples thereof include polyethylene oxide, polypropylene oxide, polytetramethylene oxide, polystyrene oxide, polycyclohexylene oxide, a polyethylene oxide-polypropylene oxide-block copolymer, and a polyethylene oxide-polypropylene oxide random copolymer.

Among these compounds having a polyoxyalkylene chain, polyethylene oxide, polypropylene oxide, or a polyethylene oxide-polypropylene oxide block copolymer is preferable, and polyethylene oxide is more preferable.

In addition, as the compound having a polyether structure, monoethers of polyethylene oxide (as a monoether, monomethyl ether and monoethyl ether are exemplified) or monoesters of polyethylene oxide (as a monoester, monoacetic acid ester and mono(meth)acrylic acid ester are exemplified) is also preferable.

Specific examples of the compound having a carboxylic acid group or other ionic hydrophilic groups include the following. The compound having a carboxylic acid group or other ionic hydrophilic groups may be partially neutralized using an inorganic base such as sodium hydroxide or an organic base such as triethylamine.

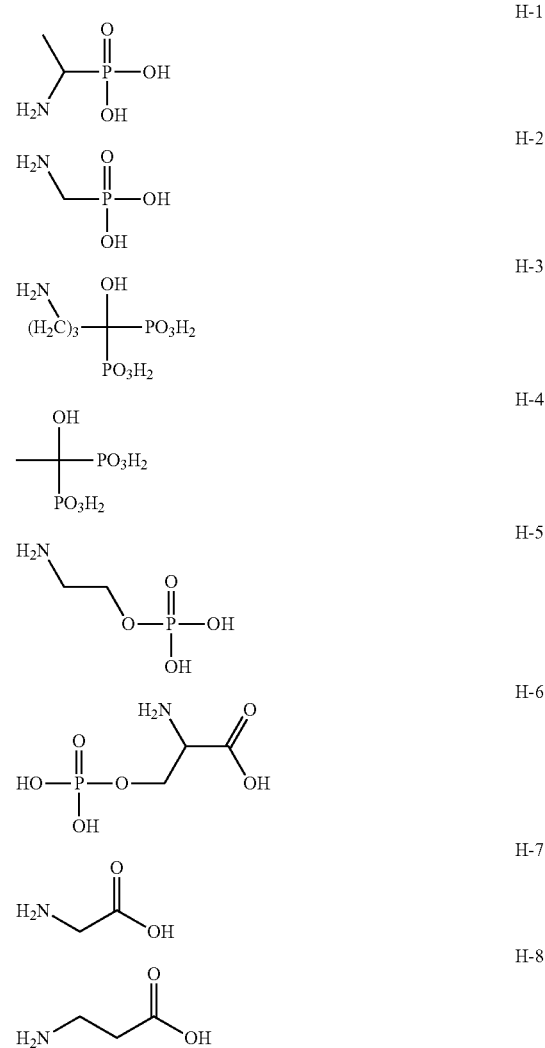

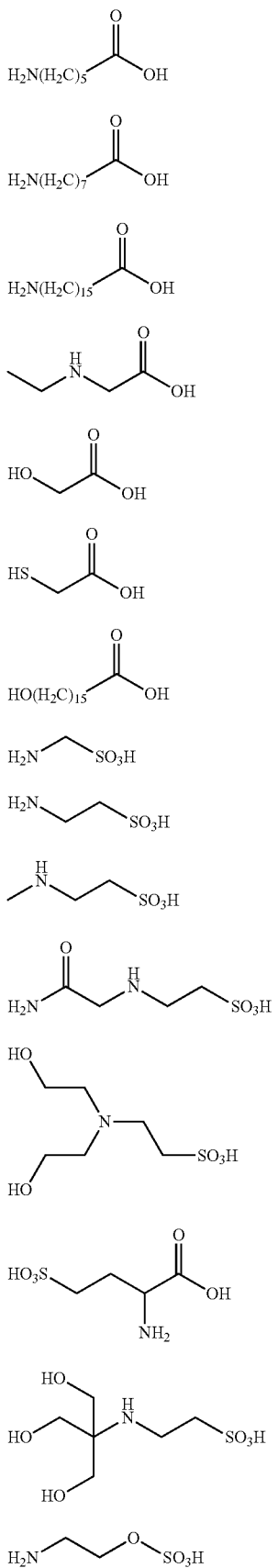
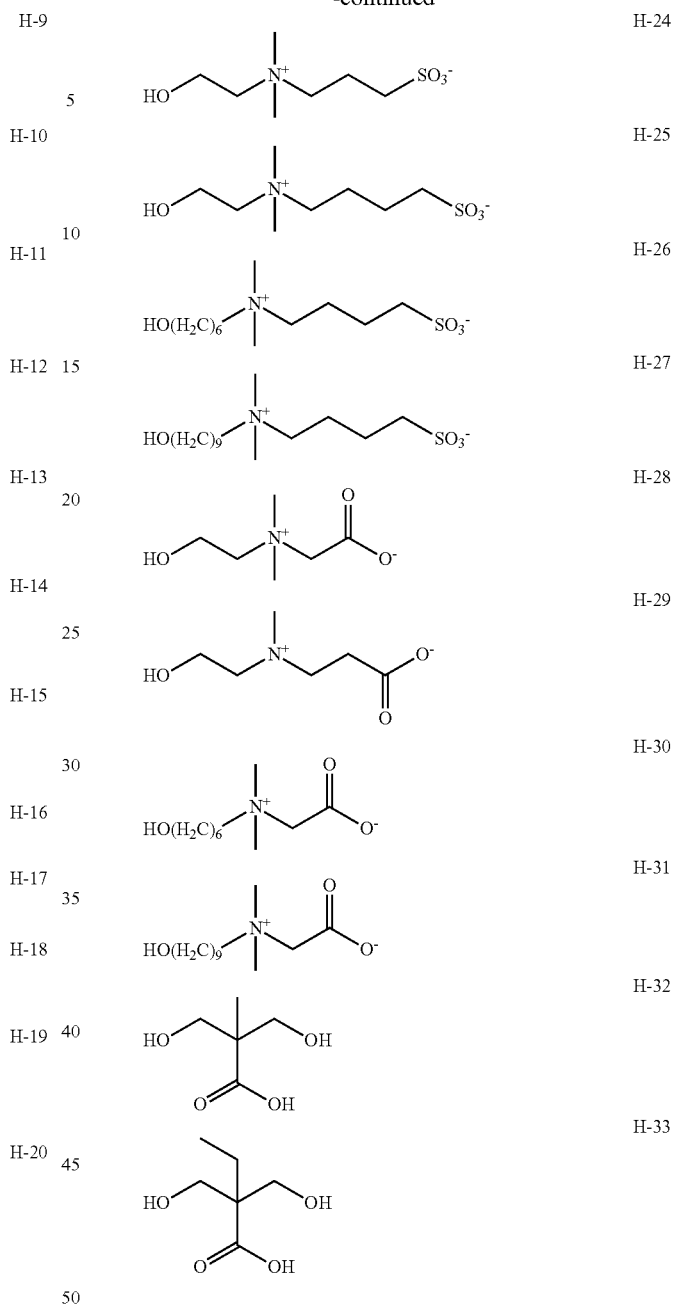

In a case where an isocyanate compound into which a hydrophilic group has been introduced is used in introduction of a hydrophilic group on the surfaces of the gel particles, a reaction product of a compound having a hydrophilic group with isophorone diisocyanate (IPDI), hexamethylene diisocyanate (HDI), trimethyl hexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI) is preferably used.

In a case where, as a hydrophilic group, a group having a polyether structure is introduced on the surfaces of the gel particles, an adduct of trimethylol propane (TMP), m-xylylene diisocyanate (XDI), and polyethylene glycol monomethyl ether (EO) (for example, Takenate (registered trademark) D-116N, manufactured by Mitsui Chemicals, Inc.) is preferably used.

In a case where, as a hydrophilic group, a carboxylic acid group or a salt of a carboxylic acid group is introduced on the surfaces of the gel particles, a reaction product of 2,2-bis(hydroxymethyl)propionic acid (DMPA) or a salt of 2,2-bis(hydroxymethyl)propionic acid (DMPA) with isophorone diisocyanate (IPDI) (an isocyanate compound including a carboxylic acid group or a salt of a carboxylic acid group) is preferably used. As the salt of a carboxylic acid group, a sodium salt, a potassium salt, a triethylamine salt, or a dimethylethanolamine salt is preferable, and a sodium salt or a triethylamine salt is more preferable.

The amount added of compound having a hydrophilic group used for introducing a hydrophilic group on the surfaces of the gel particles is preferably 0.1% by mass to 50% by mass, more preferably 0.1% by mass to 45% by mass, still more preferably 0.1% by mass to 40% by mass, still more preferably 1% by mass to 35% by mass, and still more preferably 3% by mass to 30% by mass, with respect to the mass of the gel particles.

~Physical Properties of Gel Particles~

The volume average particle diameter of the gel particles is preferably 0.01 μm to 10.0 μm, more preferably 0.01 μm to 5 μm, and still more preferably 0.05 μm to 1 μm from the viewpoint of dispersibility.

The volume average particle diameter of the gel particles can be measured by a light scattering method. Moreover, as the volume average particle diameter in the specification, the value measured by using a wet type particle size distribution measuring apparatus LA-910 (manufactured by Horiba, Ltd.) is used.

From the viewpoint of dispersibility and crosslinkability, the gel particles are preferably contained in 1% by mass to 50% by mass, more preferably 3% by mass to 40% by mass, and still more preferably 5% by mass to 30% by mass in terms of the solid content of the gel particles, with respect to the total mass of the ink composition.

Moreover, the content of the gel particles is a value in which solid components such as a photopolymerization initiator which is present in the inside of the gel particles (the pores of the three-dimensional crosslinked structure) are also included.

The total solid content amount of gel particles is preferably 50% by mass or greater, more preferably 60% by mass or greater, still more preferably 70% by mass or greater, still more preferably 80% by mass or greater, and particularly preferably 85% by mass or greater, with respect to the total solid content of the ink composition. The upper limit of the total solid content amount of gel particles may be 100% by mass with respect to the total solid content of the ink composition, and in a case where the ink composition includes solid components other than the gel particles, the upper limit is preferably 99% by mass or less, and more preferably 95% by mass or less.

[Water]

The ink composition contains water, but the amount of water is not particularly limited. Among these, the water content is preferably 10% by mass to 99% by mass, more preferably 20% by mass to 95% by mass, still more preferably 30% by mass to 90%, and still further more preferably 50% by mass to 90% by mass.

[Colorant]

The ink composition may contain at least one type of colorant.

The colorant which can be used in an embodiment of the present invention is not particularly limited, and a colorant can be arbitrarily selected from known coloring materials such as pigments, water-soluble dyes, disperse dyes and used. Among these, the colorant preferably include a pigment from the viewpoint of excellent weather resistance and rich color reproduction.

—Pigment—

The pigment is not particularly limited and can be suitably selected depending on the intended purpose, and examples thereof include known organic pigments and inorganic pigments, and also include resin particles dyed with a dye, commercial available pigment dispersions, and surface-treated pigments (for example, those obtained by dispersing a pigment in water, a liquid organic compound, or an insoluble resin as a dispersion medium, and those obtained by treating the pigment surface with a resin or a pigment derivative).

Examples of the organic pigment and the inorganic pigment include a yellow pigment, a red pigment, a magenta pigment, a blue pigment, a cyan pigment, a green pigment, an orange pigment, a violet pigment, a brown pigment, a black pigment, and a white pigment.

As the yellow pigment, monoazo pigments such as C. I. Pigment Yellow 1, 2, 3, 4, 5, 10, 65, 73, 74, 75, 97, 98, 111, 116, 130, 167, and 205, monoazo lake pigments such as C. I. Pigment Yellow 61, 62, 100, 168, 169, 183, 191, 206, 209, and 212, disazo pigments such as C. I. Pigment Yellow 12, 13, 14, 16, 17, 55, 63, 77, 81, 83, 106, 124, 126, 127, 152, 155, 170, 172, 174, 176, 214, and 219, anthraquinone pigments such as C. I. Pigment Yellow 24, 99, 108, 193, and 199, monoazopyrazolone pigments such as C. I. Pigment Yellow 60, condensed azo pigments such as C. I. Pigment Yellow 93, 95, 128, and 166, isoindoline pigments such as C. I. Pigment Yellow 109, 110, 139, 173, and 185, benzimidazolone pigments such as C. I. Pigment Yellow 120, 151, 154, 175, 180, 181, and 194, azomethine metal complex pigments such as C. I. Pigment Yellow 117, 129, 150, and 153, quinophthalone pigments such as C. I. Pigment Yellow 138, and quinoxaline pigments such as C. I. Pigment Yellow 213 are preferable.

As the red pigment or the magenta pigment, monoazo lake pigments such as C. I. Pigment Red 193, disazo pigments such as C. I. Pigment Red 38, naphthol AS pigments such as C. I. Pigment Red 2, 5, 8, 9, 10, 11, 12, 14, 15, 16, 17, 18, 22, 23, 31, 32, 112, 114, 146, 147, 150, 170, 184, 187, 188, 210, 213, 238, 245, 253, 256, 258, 266, 268, and 269, β-naphthol pigments such as C. I. Pigment Red 3, 4, and 6, β-naphthol lake pigments such as C. I. Pigment Red 49, 53, and 68, naphthol AS lake pigments such as C. I. Pigment Red 237, 239, and 247, pyrazolone pigments such as C. I. Pigment Red 41, BONA lake pigments such as C. I. Pigment Red 48, 52, 57, 58, 63, 64:1, and 200, xanthene lake pigments such as C. I. Pigment Red 81:1,169, and 172, thioindigo pigments such as C. I. Pigment Red 88, 181, and 279, perylene pigments such as C. I. Pigment Red 123, 149, 178, 179, 190, and 224, condensed azo pigments such as C. I. Pigment Red 144, 166, 214, 220, 221, 242, and 262, anthraquinone pigments such as C. I. Pigment Red 168, 177, 182, 226, and 263, anthraquinone lake pigments such as C. I. Pigment Red 83, benzimidazolone pigments such as C. I. Pigment Red 171, 175, 176, 185, and 208, quinacridone pigments such as C. I. Pigment Red 122, 202 (including a mixture with C. I. Pigment Violet 19), 207, and 209, diketopyrrolopyrrole pigments such as C. I. Pigment Red 254, 255, 264, 270, and 272, and azomethine metal complex pigments such as C. I. Pigment Red 257 and 271 are preferable.

As the blue pigment or the cyan pigment, naphthol AS pigments such as C. I. Pigment Blue 25 and 26, phthalocyanine pigments such as C. I. Pigment Blue 15, 15:1, 15:2, 15:3, 15:4, 15:6, 16, 17:1, 75, and 79, dyed lake pigments such as C. I. Pigment Blue 1, 24:1, 56, 61, and 62, anthraquinone-based pigments such as C. I. Pigment Blue 60, indigo pigments such as C. I. Pigment Blue 63, and dioxazine pigments such as C. I. Pigment Blue 80 are preferable.

As the green pigment, dyed lake pigments such as C. I. Pigment Green 1 and 4, phthalocyanine pigments such as C. I. Pigment Green 7 and 36, and azomethine metal complex pigments such as C. I. Pigment Green 8 are preferable.

As the orange pigment, monoazo pigments such as C. I. Pigment Orange 1, β-naphthol pigments such as C. I. Pigment Orange 2, 3, and 5, naphthol AS pigments such as C. I. Pigment Orange 4, 24, 38, and 74, pyrazolone pigments such as C. I. Pigment Orange 13 and 34, benzimidazolone pigments such as C. I. Pigment Orange 36, 60, 62, 64, and 72, disazo pigments such as C. I. Pigment Orange 15 and 16, β-naphthol lake pigments such as C. I. Pigment Orange 17 and 46, naphthalene sulfonic acid lake pigments such as C. I. Pigment Orange 19, perinone pigments such as C. I. Pigment Orange 43, quinacridone pigments such as C. I. Pigment Orange 48 and 49, anthraquinone-based pigments such as C. I. Pigment Orange 51, isoindolinone pigments such as C. I. Pigment Orange 61, isoindoline pigments such as C. I. Pigment Orange 66, azomethine metal complex pigments such as C. I. Pigment Orange 68, and diketopyrrolopyrrole pigments such as C. I. Pigment Orange 71, 73, and 81 are preferable.

As the brown pigment, BONA lake pigments such as C. I. Pigment Brown 5, condensed azo pigments such as C. I. Pigment Brown 23, 41, and 42, and benzimidazolone pigments such as C. I. Pigment Brown 25 and 32 are preferable.

As the violet pigment, dyed lake pigments such as C. I. Pigment Violet 1, 2, 3, and 27, naphthol AS pigments such as C. I. Pigment Violet 13, 17, 25, and 50, anthraquinone lake pigments such as C. I. Pigment Violet 5:1, quinacridone pigments such as C. I. Pigment Violet 19, dioxazine pigments such as C. I. Pigment Violet 23 and 37, perylene pigments such as C. I. Pigment Violet 29, benzimidazolone pigments such as C. I. Pigment Violet 32, and thioindigo pigments such as C. I. Pigment Violet 38 are preferable.

As the black pigment, indajin pigments such as C. I. Pigment Black 1, carbon black which is C. I. Pigment Black 7, graphite which is C. I. Pigment Black 10, magnetite which is C. I. Pigment Black 11, anthraquinone pigments such as C. I. Pigment Black 20, and perylene pigments such as C. I. Pigment Black 31 and 32 are preferable.

As the white pigment, zinc oxide which is C. I. Pigment White 4, titanium oxide is which is C. I. Pigment White 6, zinc sulfide which is C. I. Pigment White 7, zirconium oxide (zirconium white) which is C. I. Pigment White 12, calcium carbonate which is C. I. Pigment White 18, aluminum oxide-silicon oxide (kaolin clay) which is C. I. Pigment White 19, barium sulfate which is C. I. Pigment White 21 or 22, aluminum hydroxide (alumina white) which is C. I. Pigment White 23, silicon oxide which is C. I. Pigment White 27, and calcium silicate which is C. I. Pigment White 28 are preferable.

The inorganic particles used in the white pigment may be a simple substance, or may be composite particles with an oxide such as silicon, aluminum, zirconium, or titanium, an organometallic compound, or an organic compound.

Among these, titanium oxide is suitably used.

It is preferable that a pigment, a dispersing agent, and a medium are selected and the dispersion conditions and filter conditions are set, such that the volume average particle diameter of the pigment particles becomes 0.005 μm to 0.5 μm, more preferably 0.01 μm to 0.45 μm, and still more preferably 0.015 μm to 0.4 μm.

Moreover, the volume average particle diameter and the particle size distribution of the pigment particles are obtained by measuring the volume average particle diameter by a dynamic light scattering method using a commercially available particle size measuring apparatus such as a wet type particle size distribution measuring apparatus LA-910 (manufactured by Horiba, Ltd.).

—Water-Soluble Dye—

Examples of the water-soluble dye which can be used in an embodiment of the present invention include an acidic dye or a direct dye. The acidic dye or the direct dye has a structure having an acidic group as a solubilizing group. Examples of the acidic group include a sulfonic acid group and a salt thereof, a carboxylic acid group and a salt thereof, and a phosphate group and a salt thereof. The number of acidic groups may be one or plural, and the acidic groups may be used in combination. Examples of the chemical structure of the chromophore contained in the water-soluble dye include an azo-base structure, a phthalocyanine-base structure, a triphenylmethane-base structure, a xanthene-base structure, a pyrazolone-base structure, a nitro-base structure, a stilbene-base structure, a quinoline-base structure, a methine-base structure, a thiazole-base structure, a quinoneimine-base structure, an indigoid-base structure, a rhodamine-base structure, an anthraquinone-base structure, and an anthraquinone-base structure.

Although the content of the colorant in the ink composition can be suitably selected, the content is preferably 0.1% by mass to 30% by mass, and more preferably 0.5% by mass to 20% by mass, with respect to the total mass of the ink composition.

—Dispersing Agent—

In a case where a pigment is used as a colorant, when preparing pigment particles, a pigment dispersing agent may be used as necessary, and examples of the pigment dispersing agent which can be used include activators such as a higher fatty acid salt, an alkyl sulfate, an alkyl ester sulfate, an alkyl sulfonate, a sulfosuccinate, a naphthalene sulfonate, an alkyl phosphate, a polyoxyalkylene alkyl ether phosphate, a polyoxyalkylene alkyl phenyl ether, polyoxyethylene polyoxypropylene glycol, a glycerol ester, a sorbitan ester, a polyoxyethylene fatty acid amide, and an amine oxide, and a block copolymer consisting of two or more monomers selected from styrene, a styrene derivative, a vinyl naphthalene derivative, acrylic acid, an acrylic acid derivative, maleic acid, a maleic acid derivatives, itaconic acid, an itaconic acid derivative, fumaric acid, and a fumaric acid derivative, and a random copolymer and a salt thereof.

As the dispersing method of the pigment, it is possible to use various dispersion apparatuses such as a ball mill, a sand mill, an attritor, a roll mill, an agitator, a Henschel mixer, a colloid mill, an ultrasonic homogenizer, a pearl mill, a wet jet mill, and a paint shaker. In addition, for the purpose of removing the coarse fraction of the pigment dispersion, a centrifuge apparatus or a filter is also preferably used.

[Other Additives]

Components other than the components described above can be added to the ink composition, as necessary. Other components will be described below.

(Sensitizer)

A sensitizer is preferably added to the ink composition to promote decomposition of the photopolymerization initiator by active energy ray irradiation. The sensitizer becomes electronically excited state by absorbing specific active energy rays. The sensitizer in the electronically excited state cause an action such as electron transfer, energy transfer, generation of heat, or the like by coming into contact with a photopolymerization initiator, and as a result, a chemical change in the photopolymerization initiator, that is, decomposition, or generation of radicals, an acid, or a base is promoted. As the sensitizer, a sensitizing dye can also be used.

Examples of a known sensitizer which can be used in combination include benzophenone, thioxanthone, in particular, isopropyl thioxanthone, anthraquinone, a 3-acyl coumarin derivative, terphenyl, a styryl ketone, 3-(aroylmethylene) thiazoline, camphor quinone, eosin, rhodamine, and erythrosine. In addition, the compound represented by General Formula (i) described in JP2010-24276A or the compound represented by General Formula (I) described in JP1994-107718A (JP-H6-107718A) can be also suitably used.

Among these, as the sensitizer, at least one type selected from thioxanthone, isopropyl thioxanthone, and benzophenone is preferable, more preferably at least one type selected from thioxanthone and isopropyl thioxanthone, and still more preferably isopropyl thioxanthone from the viewpoint of the compatibility to LED light and the reactivity with a photopolymerization initiator.

In a case where the ink composition contains a sensitizer, the sensitizer may be contained alone or may be contained in combination of two or more types thereof.

In a case where the ink composition contains a sensitizer, the sensitizer is preferably enclosed in the gel particles from the viewpoint of the reactivity with a photopolymerization initiator.

In a case where the ink composition contains a sensitizer, the content of the sensitizer is preferably 0.1% by mass to 25% by mass, more preferably 0.5% by mass to 20% by mass, and still more preferably 1% by mass to 15% by mass, with respect to the total solid content of the gel particles.

(Polymerization Inhibitor)

A polymerization inhibitor may be added from the viewpoint of enhancing preservability. Examples of the polymerization inhibitor include p-methoxyphenol, quinones such as hydroquinone and methoxy benzoquinone, phenothiazine, catechols, alkyl phenols, alkyl bisphenols, zinc dimethyl dithiocarbamate, copper dimethyl dithiocarbamate, copper dibutyl dithiocarbamate, copper salicylate, thiodipropionic acid esters, mercaptobenzimidazole, and phosphites, and p-methoxyphenol, catechols, or quinones are preferable, and, in particular, hydroquinone, benzoquinone, p-methoxyphenol, TEMPO, TEMPOL, cupferron Al, or a tris(N-nitroso-N-phenylhydroxylamine)aluminum salt is more preferable.

(Ultraviolet Absorber)

In the ink composition, an ultraviolet absorber may be used from the viewpoint of improving weather resistance and preventing discoloration of the obtained image.

Examples of the ultraviolet absorber include known ultraviolet absorbers such as a benzotriazole-based compound, a benzophenone-based compound, a triazine-based compound, and a benzoxazole compound.

(Organic Solvent)

In the ink composition, an organic solvent described below may be added to improve the adhesion to a recording medium.

Alcohols (for example, methanol, ethanol, propanol, isopropanol, butanol, isobutanol, secondary butanol, tertiary butanol, pentanol, hexanol, cyclohexanol, and benzyl alcohol), Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methyl propanediol), Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amines (for example, ethanolamine, diethanolamine, triethanolamine, N-methyl diethanolamine, N-ethyl diethanolamine, morpholine, N-ethylmorpholine, ethylenediamine, diethylenediamine, tri ethylenetetramine, tetraethylenepentamine, polyethyleneimine, pentamethyldiethylenetriamine, and tetramethylpropylenediamine), Amides (for example, formamide, N,N-dimethylformamide, and N,N-dimethylacetamide), Heterocycles (for example, 2-pyrrolidone, N-methyl-2-pyrrolidone, cyclohexyl pyrrolidone, 2-oxazolidone, 1,3-dimethyl-2-imidazolidinone, and γ-butyrolactone), Sulfoxides (for example, dimethyl sulfoxide), Sulfones (for example, sulfolane), Others (urea, acetonitrile, acetone, and the like)

An organic solvent is preferably added in a proportion of 0.1% by mass to 5% by mass with respect to the ink composition.

(Surfactant)

In the ink composition, a surfactant may be added. Moreover, the surfactants used in the ink composition are distinguished from surfactants used at the time of producing the gel particles.

Examples of the surfactants include surfactants which are described in each publication of JP1987-173463A (JP-S62-173463A) and JP1987-183457A (JP-S62-183457A). Examples thereof include non-ionic surfactants such as polyoxyethylene alkyl ethers, polyoxyethylene alkyl allyl ethers, acetylene glycols, polyoxyethylene-polyoxypropylene block copolymers, and siloxane.

Moreover, an organic fluoro compound may be used instead of a surfactant.

The organic fluoro compound is preferably hydrophobic. Examples of the organic fluoro compound include fluorine-based surfactants, oily fluorine-based compounds (for example, fluorine-based oil), and solid fluorine-based compound resins (for example, a tetrafluoroethylene resin), and the surfactants described in each publication of JP1982-9053B (JP-S57-9053B) (columns 8 to 17) and JP1987-135826A (JP-S62-135826A) are exemplified.

In addition, the ink composition may contain a photopolymerization initiator, a polymerizable compound, a water-soluble resin, a water-dispersible resin, or the like in the outer portion of the gel particles, as necessary, from the viewpoint of controlling film physical properties, adhesion, and discharging properties.

"The ink composition contains a photopolymerization initiator in the outer portion of the gel particles" means that the ink composition contains a photopolymerization initiator which is not enclosed in the gel particles. A case where a polymerizable compound, a water-soluble resin, a water-dispersible resin, or the like is contained in the outer portion of the gel particles is also the same as described above.

(Photopolymerization Initiator which can be Contained in Outer Portion of Gel Particles)

The ink composition preferably contains a polymerizable compound in the outer portion of the gel particles.

In a case where the ink composition contains a photopolymerization initiator in the outer portion of the gel particles, it is possible to improve the crosslinking efficiency among the gel particles, and it is possible to form a film having a higher film strength. Furthermore, crosslinking proceeds with high efficiency even with respect to active energy rays (light) having low exposure illuminance (for example, 40 mJ/cm$^2$ to 70 mJ/cm$^2$).

As the above photopolymerization initiator, the same ones as the photopolymerization initiator (photopolymerization initiator enclosed in the gel particles) described above are exemplified, as the photopolymerization initiator which can be contained in the outer portion of the gel particles, a water-soluble or water-dispersible photopolymerization initiator is preferable, and from this point of view, examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, IRGACURE (registered trademark) 500 (hereinbefore, manufactured by BASF Corp.), a compound represented by the following General Formula (X), and the acyl phosphine oxide compound described in WO 2014/095724A.

Moreover, the "water-soluble" means properties that, in the case of being dried at 105° C. for 2 hours, the amount of dissolution with respect to 100 g of distilled water at 25° C. is greater than 1 g.

In addition, the "water-dispersible" indicates properties of being water-insoluble and of being dispersed in water. Here, the "water-insoluble" means properties that, in the case of being dried at 105° C. for 2 hours, the amount of dissolution with respect to 100 g of distilled water at 25° C. is 1 g or less.

General Formula (X)

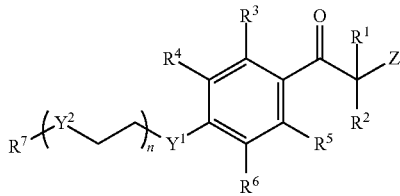

In General Formula (X), each of $R^1$ and $R^2$ independently represents an alkyl group. $R^1$ and $R^2$ may be linear or branched. Each of $R^1$ and $R^2$ is preferably an alkyl group having 1 to 10 carbon atoms, more preferably an alkyl group having 1 to 5 carbon atoms, still more preferably an alkyl group having 1 to 3 carbon atoms, and still more preferably a methyl group or an ethyl group. $R^1$ and $R^2$ may be bonded to each other to form a ring. In addition, a group having the ring structure formed by bonding of $R^1$ and $R^2$ is preferably a cycloalkyl group, more preferably a cycloalkyl group having 3 to 10 carbon atoms, and still more preferably a cycloalkyl group having 4 to 8 carbon atoms, and more specifically, preferably a cycloheptyl group or a cyclohexyl group.

In General Formula (X), each of $R^3$, $R^4$, $R^5$, and $R^6$ independently represents a hydrogen atom or a substituent.

At least one of $R^3$, $R^4$, $R^5$, and $R^6$ is preferably a hydrogen atom. Two or more of $R^3$, $R^4$, $R^5$, and $R^6$ are preferably hydrogen atoms, and at least two of $R^3$, $R^4$, and $R^5$ are more preferably hydrogen atoms. In addition, three or more of $R^3$, $R^4$, $R^5$, and $R^6$ are more preferably hydrogen atoms, and all of $R^3$, $R^4$, and $R^5$ are more preferably hydrogen atoms. All of $R^3$, $R^4$, $R^5$, and $R^6$ are still more preferably hydrogen atoms. In a case where $R^3$, $R^4$, $R^5$, and $R^6$ are substituents, examples of the substituents include groups selected from an alkyl group (preferably an alkyl group having 1 to 5 carbon atoms, more preferably an alkyl group having 1 to 3 carbon atoms, and still more preferably an alkyl group having 1 or 2 carbon atoms), a halogen atom (for example, a fluorine atom, a chlorine atom, a bromine atom, or an iodine atom), an amino group, a hydroxy group, a cyano group, a nitro group, a carboxy group, a sulfo group, a sulfonyl group, a phosphonyl group, a boric acid, an alkoxy group, and an amide group. Among these, a methyl group, an ethyl group, or a halogen atom is preferable.

In General Formula (X), $R^7$ represents a hydrogen atom, an alkyl group (preferably an alkyl group having 1 to 10 carbon atoms, more preferably an alkyl group having 1 to 5 carbon atoms, and still more preferably an alkyl group having 1 to 3 carbon atoms), an acyl group (preferably an acyl group having 2 to 10 carbon atoms, more preferably an acyl group having 2 to 6 carbon atoms, and still more preferably an acyl group having 2 to 4 carbon atoms), or a trialkylsilyl group (preferably a trialkylsilyl group in which the carbon number per alkyl group is 1 to 10, more preferably a trialkylsilyl group in which the carbon number per alkyl group is 1 to 5, and still more preferably a trialkylsilyl group in which the carbon number per alkyl group is 1 or 2).

In General Formula (X), Z represents a hydroxy group, an alkoxy group (preferably an alkoxy group having 1 to 10 carbon atoms, more preferably an alkoxy group having 1 to 5 carbon atoms, and still more preferably an alkoxy group having 1 to 3 carbon atoms), or an alkylamino group (which includes a dialkylamino group, is preferably an alkylamino group in which the carbon number per alkyl group is 1 to 10, more preferably an alkylamino group in which the carbon number per alkyl group is 1 to 5, and still more preferably an alkylamino in which the carbon number per alkyl group is 1 or 3)

In General Formula (X), each of $Y^1$ and $Y^2$ independently represents an oxygen atom or a sulfur atom, and more preferably an oxygen atom.

In General Formula (X), n is an integer of 1 to 3.

Specific examples of the compound represented by General Formula (X) include compounds represented by the following PI-1 to PI-3.

PI-1

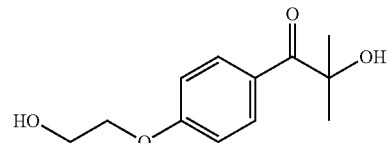

PI-2

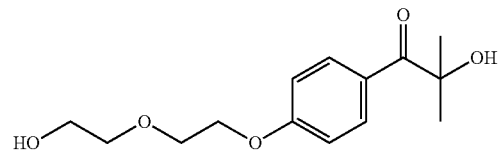

-continued

PI-3

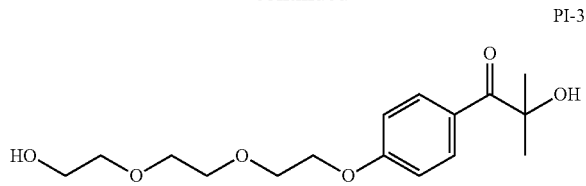

In addition, specific examples of the acyl phosphine oxide compound described in WO2014/095724A include a compound represented by the following PI-4.

PI-4

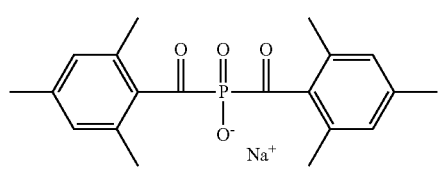

PI-1 to PI-3 can be synthesized by the method described in WO86/05778A. In addition, PI-4 can be synthesized by the method described in WO2014/095724A.

(Polymerizable Compound which can be Contained in Outer Portion of Gel Particles)

The ink composition preferably contains a polymerizable compound in the outer portion of the gel particles.

In a case where the ink composition contains a polymerizable compound in the outer portion of the gel particles, it is possible to improve the crosslinking efficiency among the gel particles, and it is possible to form a film having a high film strength. Furthermore, crosslinking proceeds with high efficiency even with respect to active energy rays (light) having low exposure illuminance (for example, 40 mJ/cm$^2$ to 70 mJ/cm$^2$).

In a case where the ink composition contains a polymerizable compound in the outer portion of the gel particles, the ink composition further includes the above-described photopolymerization initiator in the outer portion of the gel particles, and it is possible to form a film having a higher film strength.

Examples of the polymerizable compound include radical polymerizable compounds such as a compound having an ethylenically unsaturated group, acrylonitrile, styrene, an unsaturated polyester, an unsaturated polyether, an unsaturated polyamide, and an unsaturated urethane.

Among these, as the polymerizable compound, a compound having an ethylenically unsaturated group is preferable, and a compound having a (meth)acryloyl group is particularly preferable. Furthermore, as the polymerizable compound, a water-soluble or water-dispersible polymerizable compound is preferable.

"Water-soluble" in the water-soluble polymerizable compound has the same meaning as "water-soluble" in the "water-soluble photopolymerization initiator" described above, and "water-dispersible" in the water-dispersible polymerizable compound has the same meaning as "water-dispersible" in the "water-dispersible photopolymerization initiator" described above.

From the viewpoint of water-solubility or water-dispersibility, as the polymerizable compound, a compound having at least one type selected from the group consisting of an amide structure, a polyethylene glycol structure, a polypropylene glycol structure, a carboxyl group, and a salt of a carboxy group is preferable.

From the viewpoint of water-solubility or water-dispersibility, as the polymerizable compound which can be contained in the outer portion of the gel particles, for example, at least one type selected from (meth)acrylic acid, sodium (meth)acrylate, potassium (meth)acrylate, N,N-dimethyl acrylamide, N,N-diethyl acrylamide, morpholine acrylamide, N-2-hydroxyethyl (meth)acrylamide, N-vinylpyrrolidone, N-vinylcaprolactam, 2-hydroxyethyl (meth)acrylate, 3-hydroxypropyl (meth)acrylate, 2-hydroxypropyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth)acrylate, polypropylene glycol di(meth)acrylate, compounds represented by the following General Formulas (a) to (d), and ethoxylated trimethylolpropane triacrylate (for example, SR9035 manufactured by Sartomer Co., Ltd.) is preferable, and at least one type selected from (meth)acrylic acid, N,N-dimethyl acrylamide, N-2-hydroxyethyl (meth)acrylamide, 2-hydroxyethyl (meth)acrylate, glycerol monomethacrylate, N-[tris(3-acryloylaminopropyloxymethylene)methyl]acrylamide, diethylene glycol bis(3-acryloylaminopropyl) ether, polyethylene glycol di(meth) acrylate, polypropylene glycol di(meth) acrylate, compounds represented by the following General Formulas (a) to (d), and ethoxylated trimethylolpropane triacrylate (for example, SR9035 manufactured by Sartomer Co., Ltd.) is more preferable.

General Formula (a)

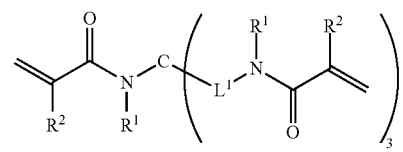

General Formula (b)

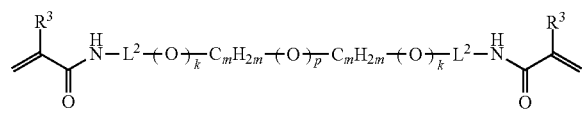

General Formula (c)

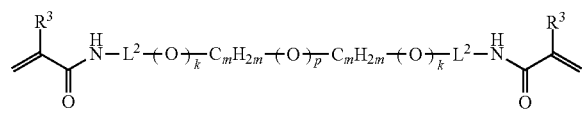

General Formula (d)

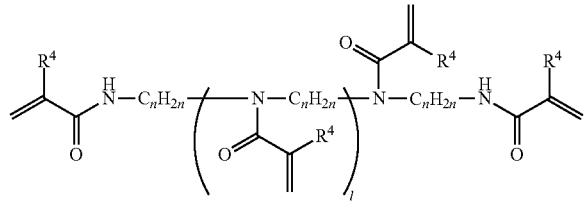

In General Formula (a), each of the plurality of $R^1$'s independently represents a hydrogen atom, an alkyl group, an aryl group, or a heterocyclic group, each of the plurality of $R^2$'s independently represents a hydrogen atom or a methyl group, and each of the plurality of $L^1$'s independently represents a single bond or a divalent linking group.

In General Formula (b), each of the plurality of $R^3$'s independently represents a hydrogen atom or a methyl group, each of the plurality of $L^2$'s independently represents an alkylene group having 1 to 8 carbon atoms, each of the plurality of k's and p independently represents 0 or 1, and each of the plurality of m's independently represents an integer of 0 to 8, and, here, at least one of k's and p is 1.

In General Formula (c), each of the plurality of $R^4$'s independently represents a hydrogen atom or a methyl group, each of the plurality of n's independently represents an integer of 1 to 8, and l represents an integer of 0 or 1.

In General Formula (d), $Z^1$ represents a residue obtained by removing q hydrogen atoms from a hydroxy group in a polyol, q represents an integer of 3 to 6, each of the plurality of $R^5$'s independently represents a hydrogen atom or a methyl group, and each of the plurality of $L^3$'s independently represents an alkylene group having 1 to 8 carbon atoms.

Specific examples of the compounds represented by each of General Formulas (a) to (d) include compounds represented by the following AM-1 to AM-4.

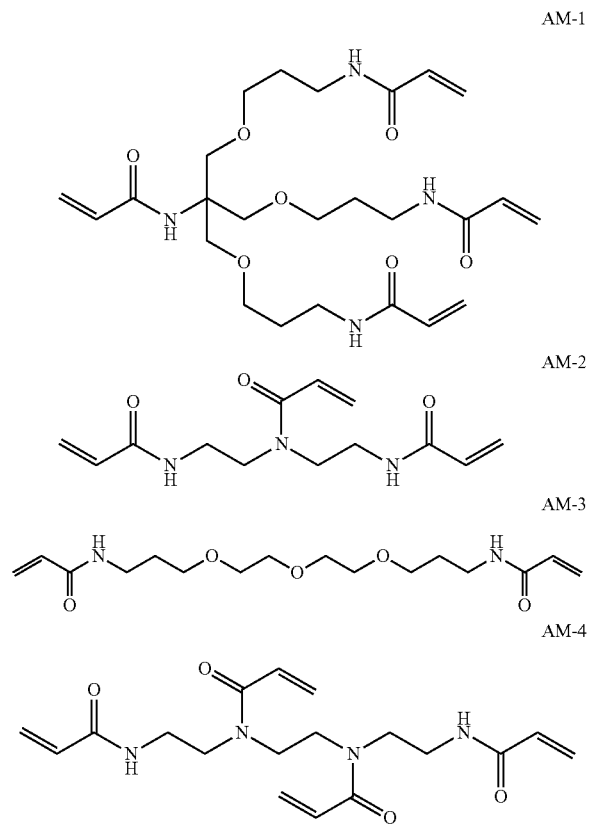

AM-1 to AM-4 can be synthesized by the method described in JP05591858B.

(Water-Soluble Resin or Water-Dispersible Resin which can be Contained in Outer Portion of Gel Particles)

The structure of the water-soluble resin or the water-dispersible resin described above is not particularly limited, and may be an arbitrary structure. Examples of the structure of the water-soluble resin or the water-dispersible resin include structures such as a chain structure, a branched structure, a star-shaped structure, a crosslinked structure, and a network structure.

"Water-soluble" in the water-soluble resin has the same meaning as "water-soluble" in the "water-soluble polymerizable compound" described above, and "water-dispersible" in the water-dispersible resin has the same meaning as "water-dispersible" in the "water-dispersible polymerizable compound" described above.

As the water-soluble resin or the water-dispersible resin, a resin having a functional group selected from a carboxy group, a salt of a carboxy group, a sulfo group, a salt of a sulfo group, a sulfate group, a salt of a sulfate group, a phosphonic acid group, a salt of a phosphonic acid group, a phosphate group, a salt of a phosphate group, an ammonium salt group, a hydroxyl group, a carboxylic acid amide group, and an alkyleneoxy group is preferable.

As the counter cations of the salts described above, an alkali metal cation such as sodium or potassium, calcium, an alkali earth metal cation such as magnesium, an ammonium cation, or a phosphonium cation is preferable, and an alkali metal cation is particularly preferable.

As the alkyl group included in an ammonium group in an ammonium salt group, a methyl group or an ethyl group is preferable.

In addition, as the counter anion of an ammonium salt group, a halogen anion such as chlorine or bromine, a sulfate anion, a nitrate anion, a phosphate anion, a sulfonate anion, a carboxylate anion, or a carbonate anion is preferable, and a halogen anion, a sulfonate anion, or a carboxylate anion is particularly preferable.

As the substituent on the nitrogen atom in a carboxylic acid amide group, an alkyl group having 8 or less carbon atoms is preferable, and an alkyl group having 6 or less carbon atoms is particularly preferable.

A resin having an alkyleneoxy group preferably has an alkyleneoxy chain formed by repetition of alkyleneoxy groups. The number of alkyleneoxy groups included in an alkyleneoxy chain is preferably 2 or greater, and particularly preferably 4 or greater.

~Preferable Physical Properties of Ink Composition~

In a case where an ink composition is at 25° C. to 50° C., the viscosity of the ink composition is preferably 3 mPa·s to 15 mPa·s, and more preferably 3 mPa·s to 13 mPa·s. In particular, as an ink composition, the viscosity of the ink composition at 25° C. is preferably 50 mPa·s or less. When the viscosity of the ink composition is within the above range, it is possible to achieve a high discharge stability in a case where the ink composition is applied to ink jet recording. The changes in the viscosity of the ink composition in a case where the ink composition is applied to ink jet recording are greatly influenced by changes in the droplet size and changes in the droplet discharging speed, and can lead to deterioration of the image quality. Therefore, there is a need to keep the temperature of the ink composition at the time of discharging constant as much as possible. Thus, it is suitable that the control band of the temperature of the ink composition is preferably ±5° C. from a set temperature, more preferably ±2° C., and still more preferably ±1° C.

Moreover, as the viscosity of the ink composition, a value measured by using a viscometer VISCOMETER TV-22 (manufactured by Toki Sangyo Co., Ltd.) is used.

<Production Method of Ink Composition>

The production method of the ink composition is not particularly limited as long as an ink composition including gel particles having the above-described configuration and water can be produced.

As the method of producing the ink composition, the production method of the ink composition of the present embodiment described below is preferable from the viewpoint of easily obtaining a dispersion of gel particles.

The production method of the ink composition of the present embodiment (hereinafter, also referred to as "the production method of the present embodiment") has an emulsifying step of obtaining an emulsion by mixing any one oil phase component selected from an oil phase component (hereinafter, also referred to as an "oil phase component A") including a photopolymerization initiator, a tri- or higher functional isocyanate compound, a polymerizable monomer, and an organic solvent, an oil phase component (hereinafter, also referred to as an "oil phase component B") including a photopolymerization initiator, a tri- or higher functional isocyanate compound having a polymerizable group, and an organic solvent, and an oil phase component (hereinafter, also referred to as an "oil phase component C") including a photopolymerization initiator, a tri- or higher functional isocyanate compound having a polymerizable group, a polymerizable monomer, and an organic solvent, and an aqueous phase component including water, and by emulsifying the resultant product, and a gelling step of gelling by heating the above emulsion.

The production method of the present embodiment may include other steps, as necessary.

According to the production method of the present embodiment, it is possible to easily produce an ink composition of an embodiment of the present invention described above.

Hereinafter, each step in the production method of the embodiment will be described in detail.

Moreover, since specific examples of the components used in each step and preferable aspects are as described in the section of the ink composition described above, the description thereof will not be repeated.

(Emulsifying Step)

The emulsifying step is a step of obtaining an emulsion by mixing any one oil phase component selected from the oil phase component A, the oil phase component B, and the oil phase component C, and an aqueous phase component including water, and by emulsifying the resultant product.

In the emulsifying step, by using any one oil phase component selected from the oil phase component A including a photopolymerization initiator, a tri- or higher functional isocyanate compound, a polymerizable monomer, and an organic solvent, the oil phase component B including a photopolymerization initiator, a tri- or higher functional isocyanate compound having a polymerizable group, and an organic solvent, and the oil phase component C including a photopolymerization initiator, a tri- or higher functional isocyanate compound having a polymerizable group, a polymerizable monomer, and an organic solvent, as an oil phase component, finally, it is possible to obtain gel particles which enclose at least photopolymerization initiators, and have polymerizable groups on the surface, or on the surface and in the vicinity of the surface.

It is thought that the polymerizable group which has a polymerizable monomer included in the oil phase component A, a tri- or higher functional isocyanate compound having a polymerizable group included in the oil phase component B, or a polymerizable monomer and a tri- or higher functional isocyanate compound having a polymerizable group included in the oil phase component C becomes a polymerizable group present on the surface of the gel particles, or on the surface and in the vicinity of the surface.

Examples of the organic solvent included in the oil phase component include ethyl acetate and methyl ethyl ketone.

The oil phase component may include other components, as necessary, in addition to the components described above.

Examples of other components include a compound having a hydrophilic group described above.

In a case where the oil phase component includes a compound having a hydrophilic group described above, it is possible to obtain gel particles having a hydrophilic group on the surface.

As the tri- or higher functional isocyanate compound, an isocyanate compound derived from at least one type selected from isophorone diisocyanate, hexamethylene diisocyanate, trimethyl hexamethylene diisocyanate, 1,3-bis(isocyanatomethyl)cyclohexane, m-xylylene diisocyanate, or dicyclohexylmethane-4,4'-diisocyanate is preferable.

The aqueous phase component may include other components, as necessary, in addition to water.

In a case where the oil phase component includes a compound having at least one type of hydrophilic group selected from a carboxy group, a sulfo group, a sulfate group, a phosphonic acid group, and a phosphate group as a compound having a hydrophilic group, the aqueous phase component may include a neutralizer.

In a case where the oil phase component includes a compound having a hydrophilic group and the aqueous phase component includes a neutralizer, by mixing the oil phase component and the aqueous phase component, a hydrophilic group such as a carboxy group is neutralized, and salts of a carboxy group and the like are formed. The salts formed in this manner also function as a hydrophilic group of the gel particles. These salts are particularly excellent in the effects of dispersing the gel particles in water.

Examples of the neutralizer include sodium hydroxide.

In the production method of the present embodiment, as a raw material for forming gel particles having a three-dimensional crosslinked structure including at least one bond selected from a urethane bond and a urea bond by a reaction with an isocyanate group, in addition to water, a multifunctional alcohol, a multifunctional phenol, a multifunctional amine having a hydrogen atom on the nitrogen atom, or a multifunctional thiol described above may be used.

Specific examples thereof include compounds such as multifunctional alcohols (for example, propylene glycol, glycerin, and trimethylol propane), multifunctional amines (for example, bis(hexamethylene) triamine, ethylene diamine, and diethylene triamine), and multifunctional thiols (for example, pentaerythritol tetra(3-mercaptopropionate)), and multifunctional alcohols are particularly preferable.

These compounds may be used alone or in combination of two or more types thereof. These compounds are added to an oil phase component and/or an aqueous phase component according to the solubility.

In the production method of the present embodiment, in addition to the above-described raw materials, a surfactant is preferably used. Examples of the surfactant include the surfactants described above.

In general, as the surfactant used in emulsion dispersion, it is known that a surfactant having a relatively long chain hydrophobic group is excellent. For example, as the surfactant, the surfactants described in "Surfactant Handbook" (Nishi Ichiro et al., published by Sangyo Tosho Publishing Co., Ltd., (1980)), specifically, alkali metal salts such as an alkyl sulfate, an alkyl sulfonic acid, an alkyl benzene sulfonic acid are preferable, and an alkylsulfuric acid ester salt is more preferable.

The alkyl chain length of the alkylsulfuric acid ester salt is preferably 12 or greater, and more preferably 16 or greater, from the viewpoint of dispersion stability.

Although the surfactant may be added to either an oil phase component or an aqueous phase component, typically, the surfactant is added to an aqueous phase component due to the low solubility in an organic solvent.

The amount of surfactant is preferably 0.1% by mass to 5% by mass, and more preferably 0.5% by mass to 3% by mass, with respect to the total solid content amount of oil phase component.

The total amount excluding the organic solvent and the water from the oil phase component and the aqueous phase component in the emulsifying step (hereinafter, also referred to as a "total solid content amount") corresponds to the total solid content amount of gel particles produced.

Although the amount of photopolymerization initiator in the oil phase component is not particularly limited, for example, the amount is preferably 0.1% by mass to 25% by mass with respect to the total solid content amount.

Although the amount of tri- or higher functional isocyanate compound (or a tri- or higher functional isocyanate compound having a polymerizable group) in the oil phase component is not particularly limited, for example, the amount is preferably 10% by mass to 70% by mass with respect to the total solid content amount.

Although, in a case where the oil phase component includes a polymerizable group, the amount of polymerizable monomer in the oil phase component is not particularly limited, for example, the amount is preferably 0.1% by mass to 75% by mass with respect to the total solid content amount.

Although the amount of organic solvent is not particularly limited, the amount is suitably selected according to the type and the amount of component included in the oil phase component.

Although the amount of water is not particularly limited, the amount is suitably selected according to the type and the amount of component included in the oil phase component.

Although, in a case where the oil phase component includes a compound having a hydrophilic group, the amount of compound having a hydrophilic group in the oil phase component is not particularly limited, for example, the amount is preferably 0.1% by mass to 40% by mass with respect to the total solid content amount.

Each component contained in the oil phase component may be simply mixed, all components may be mixed at once, or each component may be mixed by being divided into several portions.

Although the method of mixing the oil phase component and aqueous phase component is not particularly limited, mixing by stirring is exemplified.

Although the method of emulsifying the mixture obtained by mixing is not particularly limited, emulsification using an emulsifying apparatus (for example, a disperser) such as a homogenizer is exemplified.

The number of rotations of a disperser in emulsification is, for example, 5000 rpm to 20000 rpm, and preferably 10000 rpm to 15000 rpm.

The rotation time in emulsification is, for example, 1 minute to 120 minutes, preferably 3 minutes to 60 minutes, more preferably 3 minutes to 30 minutes, and still more preferably 5 minutes to 15 minutes.

(Gelling Step)

The gelling step is a step of gelling by heating the emulsion described above.

In the gelling step, a tri- or higher functional isocyanate compound and water are reacted by heating of the emulsion and isocyanate groups are crosslinked with each other, and as a result, a dispersion containing the gel particles which have a three-dimensional crosslinked structure including at least one selected from a urethane bond and a urea bond and a polymerizable group, and enclose at least a photopolymerization initiator can be obtained.

The heating temperature (reaction temperature) of the emulsion in the gelling step is preferably 35° C. to 70° C., and more preferably 40° C. to 60° C.

The heating time (reaction time) in the gelling step is preferably 6 hours to 50 hours, more preferably 12 hours to 40 hours, and still more preferably 15 hours to 35 hours.

The gelling step preferably includes a step of distilling off the organic solvent from the emulsion.

(Mixing Step)

The mixing step may have a step of mixing the gel particles obtained in the gelling step, water, and a colorant. The method of mixing the gel particles, water, and a colorant is not particularly limited. In addition, the gel particles may be used in a state of a dispersion.

Examples of the colorant include the same as those described as colorants which can be contained in the above-described ink composition.

The production method of the present embodiment may include other steps, as necessary, in addition to the emulsifying step, the gelling step, and the mixing step.

Examples of other steps include a step of adding other components.

Examples of other components added include the same as those described as other components which can be contained in the ink composition.

<Gel Particles>

The gel particles have a polymerizable group, a three-dimensional crosslinked structure including at least one bond selected from a urethane bond and a urea bond, and enclose a photopolymerization initiator.

The gel particles have the same meaning as the gel particles in the ink composition described above.

The gel particles may be used in applications other than the ink composition, and for example, the gel particles can be used in a coating agent, an adhesive, and a paint.

<Photosensitive Composition>

The photosensitive composition contains gel particles which have a polymerizable group, a three-dimensional crosslinked structure including at least one bond selected from a urethane bond and a urea bond, and enclose photopolymerization initiator, and water.

As the gel particles and water in the photosensitive composition, the same as those used in the ink composition described above can be used.

Since the photosensitive composition contains the gel particles in an embodiment of the present invention, the photosensitive composition has excellent dispersibility and redispersibility after solidification, is cured with high sensitivity, and has an excellent film strength.

Since the photosensitive composition is cured with high sensitivity by irradiation with active energy rays, and the formed film has an excellent film strength, the photosensitive composition can be suitably used in various applications such as a coating agent, an adhesive, and a paint.

<Image Forming Method>

The image forming method includes an ink applying step of applying the above-described ink composition to a recording medium and an irradiation step of irradiating the ink composition applied to the recording medium with active energy rays. By performing these steps, an image by the ink composition fixed on the recording medium is formed.

(Ink Applying Step)

The ink applying step in the image forming method will be described below.

The ink applying step is not particularly limited as long as it is a step of applying the ink composition to a recording medium.

As an aspect of applying the ink composition to a recording medium, an aspect of applying the ink composition to a recording medium by an ink jet method is particularly preferable.

In the image forming method, the ink jet recording apparatus used in a case where the ink jet method is applied in the ink applying step is not particularly limited and a known ink jet recording apparatus capable of achieving the desired resolution can be arbitrarily selected and used. That is, any known ink jet recording apparatus including commercially available products can discharge the ink composition to a recording medium in the image forming method.

Examples of the ink jet recording apparatus include apparatuses including an ink supply system, a temperature sensor, and heating means.

The ink supply system is formed of, for example, a source tank including an ink composition, a supply pipe, an ink supply tank immediately before an ink jet head, a filter, and a piezo type ink jet head. The piezo type ink jet head can be driven so as to be able to discharge multi-size dots preferably in an amount of 1 pl to 100 pl, and more preferably in an amount of 8 pl to 30 pl, preferably at a resolution of 320 dpi (dot per inch)×320 dpi to 4000 dpi×4000 dpi (dot per inch), more preferably at a resolution of 400 dpi×400 dpi to 1600 dpi×1600 dpi, and still more preferably at a resolution of 720 dpi×720 dpi. Moreover, dpi refers to the number of dots per 2.54 cm (1 inch).

In the ink applying step, the temperature of the ink composition discharged is desirably constant, and thus, the ink jet recording apparatus preferably includes means for stabilizing the temperature of the ink composition. The piping system from the ink tank (the intermediary tank in a case where there is an intermediary tank) to the nozzle ejection surface and all of the members are sites to be set to a constant temperature. That is, the portion from the ink supply tank to the ink jet head portion can be insulated and heated.

The method of temperature control is not particularly limited, but, for example, it is preferable to provide a plurality of temperature sensors in sites at each pipe, and perform heating control according to the flow amount of the ink composition and the temperature of the environment. The temperature sensors can be provided in the ink supply tank and near the nozzle of the ink jet head. In addition, it is preferable that a head unit to be heated is thermally blocked off or insulated such that the apparatus main body is not influenced by the temperature from the outside air. To shorten the start-up time of a printer required for heating or to reduce the loss of thermal energy, it is preferable to insulate the heat unit from other sites and to reduce the heat capacity of the entire heating unit.

The recording medium is not particularly limited, and it is possible to use known recording media as a support or a recording material. Examples of the recording medium include paper, paper on which plastic (for example, polyethylene, polypropylene, and polystyrene) has been laminated, a metal plate (for example, aluminum, zinc, and copper), a plastic film (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), and paper or a plastic film on which the above-described metals have been laminated or deposited.

Among these, since the ink composition of an embodiment of the present invention has excellent adhesion, the ink composition can be suitably used for a non-absorbing recording medium as a recording medium, and a plastic substrate such as polyvinyl chloride, polyethylene terephthalate, or polyethylene is preferable, a polyvinyl chloride resin substrate is more preferable, and a polyvinyl chloride resin sheet or film is still more preferable.

(Irradiation Step)

The irradiation step in the image forming method will be described below.

The irradiation step is not particularly limited as long as it is a step of irradiating the ink composition applied to a recording medium with active energy rays.

By irradiating the ink composition with active energy rays, a crosslinking reaction of the gel particles in the ink composition proceeds, an image is fixed, and thus, the film strength of the image can be improved.

Examples of the active energy rays which can be used in the irradiation step include ultraviolet rays (UV light), visible rays, and an electron beam, and among these, ultraviolet rays (UV light) is preferable.

The peak wavelength of the active energy rays (light) is, for example, preferably 200 nm to 405 nm, more preferably 220 nm to 390 nm, and still more preferably 220 nm to 385 nm, though the peak wavelength also depends on the absorption characteristics of a sensitizer that is used as necessary.

Moreover, in a case where a sensitizer and a photopolymerization initiator are not used concurrently, the peak wavelength is, for example, preferably 200 nm to 310 nm, and more preferably 200 nm to 280 nm.

Irradiation with active energy rays (light) is suitably performed such that the exposed surface illuminance becomes, for example, 10 mW/cm$^2$ to 2000 mW/cm$^2$, and preferably 20 mW/cm$^2$ to 1000 mW/cm$^2$.

As the source for generating active energy rays (light), a mercury lamp, a metal halide lamp, a UV fluorescent lamp, a gas laser, and a solid laser are widely known.

In addition, replacement of the light source exemplified above with semiconductor ultraviolet light-emitting devices is extremely effective, industrially and environmentally.

Among the semiconductor ultraviolet light-emitting devices, Light Emitting Diode (LED) (preferably UV-LED), Laser Diode (LD) (preferably UV-LD) are expected as a light source since these are compact, have a long life, high efficiency, and low cost.

As the light source, a metal halide lamp, an ultra high pressure mercury lamp, a high pressure mercury lamp, a medium pressure mercury lamp, a low pressure mercury lamp, LED, or a blue-violet laser is preferable.

Among these, in a case where a sensitizer and a photopolymerization initiator are used in combination, an ultra high pressure mercury lamp which is capable of irradiating with light having a wavelength of 365 nm, 405 nm, or 436 nm, a high pressure mercury lamp which is capable of irradiating with light having a wavelength of 365 nm, 405 nm, or 436 nm, or LED which is capable of irradiating with light having a wavelength of 355 nm, 365 nm, 385 nm, 395 nm, or 405 nm is more preferable, and LED which is capable of irradiating with light having a wavelength of 355 nm, 365 nm, 385 nm, 395 nm, or 405 nm is most preferable.

In the ink (that is, an aqueous dispersion of an embodiment of the present invention) used in the image forming method, a photopolymerization initiator is enclosed in the gel particles having a three-dimensional crosslinked structure, and thus, it is possible to select a photopolymerization initiator which could not be used in a water-based ink in the related art, for example, a photopolymerization initiator such as an acyl phosphine oxide compound which has excellent sensitivity with respect to light, but has low solubility in water.

For example, in a case where a photopolymerization initiator such as an acyl phosphine oxide compound which has an absorption wavelength at 350 nm to 450 nm and a sensitizer such as a thioxanthone compound are used in combination, as a light source, in particular, LED is preferable.

In addition, in a case where a photopolymerization initiator such as an acyl phosphine oxide compound and a sensitizer such as a thioxanthone compound are used in combination, active energy rays (light) having a peak wavelength at 380 nm to 450 nm longer than the wavelength of ultraviolet rays are also preferably used.

In a case where a photopolymerization initiator and a sensitizer are not used concurrently, a metal halide lamp, a medium pressure mercury lamp, or a low pressure mercury lamp is preferable.

In the irradiation step, the ink composition applied to a recording medium is suitably irradiated with such UV light, for example, for 0.01 seconds to 120 seconds, and preferably for 0.1 seconds to 90 seconds.

As irradiation conditions and a basic irradiation method, the irradiation conditions and the irradiation method disclosed in JP1985-132767A (JP-S60-132767A) can be similarly applied. Specifically, a system in which light sources are provided on both sides of a head unit including a discharge apparatus of an ink and the head unit and the light sources are scanned using a so-called shuttle system or a system in which irradiation is performed by another light source that is not driven and performed by another light source that is not driven is preferable. The irradiation with the active energy rays is performed for a predetermined period of time (for example, 0.01 seconds to 120 seconds and preferably 0.01 seconds to 60 seconds) after the ink is landed and dried by heating.

(Heating and Drying Step)

The image forming method may further have a heating and drying step before the irradiation step after the ink applying step, as necessary.

In the heating and drying step, by evaporation of water and a water-soluble organic solvent used in combination as necessary in the ink composition discharged onto a recording medium by heating means, an image is preferably fixed.

A step of drying the ink composition discharged by applying heat and fixing (heating and drying step) will be described.

Although the heating means is not limited as long as it can dry water and a water-soluble organic solvent used in combination as necessary, a heat drum, hot air, an infrared lamp, a heat oven, or a heating plate heating can be used.

The heating temperature is preferably 40° C. or higher, more preferably about 40° C. to 150° C., and still more preferably about 40° C. to 80° C. Moreover, the drying or heating time can be suitably set in consideration of the composition of the ink composition used and the printing speed.

The ink composition fixed by heating is further photofixed by irradiation with active energy rays in the irradiation step, as necessary. As described above, in the irradiation step, fixing by UV light is preferably performed.

EXAMPLES

Hereinafter, the embodiments of the present invention will be further specifically described with reference to Examples; however, the embodiments of the present invention are not limited to the following Examples as long as those do not depart from the scope thereof. Moreover, unless otherwise specifically indicated, "part(s)" is based on mass.

<Synthesis of Isocyanate Compound 1 (NCO 104)>

After 10 g of trimethylol propane (TMP), 57.91 g of 1,3-bis(isocyanatomethyl)cyclohexane (HXDI), and 126.11 g of ethyl acetate (AcOEt) were put into a three-neck flask, the resultant product was heated to 50° C., then, 0.194 g of NEOSTANN U-600 (manufactured by NITTO KASEI CO., LTD., an inorganic bismuth catalyst) was added thereto, and the resultant product was allowed to react for 3 hours, whereby an isocyanate compound 1 was obtained.

<Synthesis of Isocyanate Compound 2 (NCO 202)>

After 10 g of trimethylol propane (TMP), 57.91 g of 1,3-bis(isocyanatomethyl)cyclohexane (HXDI), and 169.62 g of ethyl acetate (AcOEt) were put into a three-neck flask, the resultant product was heated to 50° C., then, 0.261 g of NEOSTANN U-600 was added thereto, and the resultant product was allowed to react for 3 hours. After the reaction, 23.43 g of BLEMMER AP-400 (manufactured by NOF Corporation) and 0.04 g of dihydroxy toluene (BHT) were added thereto, and the resultant product was allowed to react at 50° C. for 3 hours, whereby an isocyanate compound 2 was obtained.

<Synthesis of Isocyanate Compound 3 (NCO 210)>

After 50 g of DURANATE (registered trademark) TKA-100 (manufactured by Asahi Kasei Corporation, isocyanurate type trifunctional isocyanate compound, 21.7% by mass of an isocyanate group is contained), 122.88 g of ethyl acetate (AcOEt), 16.16 g of BLEMMER AP-400 (manufactured by NOF Corporation, hydroxyl group-containing acrylate, n=6), and 0.033 g of dibutyl hydroxytoluene (BHT) were put into a three-neck flask, the resultant product was heated to 50° C., then, 0.189 g of NEOSTANN U-600 was added thereto, and the resultant product was allowed to react for 3 hours, whereby an isocyanate compound 3 was obtained.

<Synthesis of Isocyanate Compound 4 (NCO 109)>

After 10 g of pentaerythritol ethylene oxide, 35.58 g of isophorone diisocyanate (IPDI), and 84.65 g of ethyl acetate (AcOEt) were put into a three-neck flask, the resultant product was heated to 50° C., then, 0.13 g of NEOSTANN U-600 was added thereto, and the resultant product was allowed to react for 3 hours, whereby an isocyanate compound 4 was obtained.

[Synthesis of Isocyanate Compound 2 into which Hydrophilic Group has been Introduced]

After 45 g of 2,2-bis(hydroxymethyl)propionic acid (DMPA), 223.72 g of isophorone diisocyanate (IPDI), and 499.05 g of ethyl acetate (AcOEt) were put into a three-neck flask, the resultant product was heated to 50° C., then, 0.7677 g of NEOSTANN U-600 was added thereto, and the resultant product was allowed to react for 3 hours, whereby an isocyanate compound 2 into which a hydrophilic group had been introduced (isocyanate compound having a carboxylic acid group) was obtained.

In the same manner as in synthesis of the isocyanate compounds 1 to 4, in combination shown in the following Tables 3 and 4, NCO 101 to NCO 113 and NCO 201 to NCO 211 were prepared. Each of NCO 106 to NCO 113 was prepared by changing trimethylolpropane of the isocyanate compound 1 (NCO 104) to a compound having two or more active hydrogen groups described in Table 3 and making have the composition described in Table 3. Moreover, the "polymerizable group-introduced monomer" in Table 4 represents a compound having at least one active hydrogen group and at least one ethylenically unsaturated bond at a terminal thereof, and the "polyisocyanate" represents a tri- or higher functional isocyanate compound.

TABLE 3

| Compound No. | Polyisocyanate structure | | Composition | |
| --- | --- | --- | --- | --- |
| | Compound having two or more active hydrogen groups | Difunctional isocyanate compound | Compound having two or more active hydrogen groups (molar equivalent) | Difunctional isocyanate compound (molar equivalent) |
| NCO 101 | trimethylolpropane | 2,4-Tolylene diisocyanate (TDI) | 1 | 4 |
| NCO 102 | trimethylolpropane | m-Xylylene diisocyanate (XDI) | 1 | 4 |
| NCO 103 | trimethylolpropane | Hexamethylene diisocyanate (HDI) | 1 | 4 |
| NCO 104 | trimethylolpropane | 1,3-Bis(isocyanatomethyl) cyclohexane (HXDI) | 1 | 4 |
| NCO 105 | trimethylolpropane | Isophorone diisocyanate (IPDI) | 1 | 4 |
| NCO 106 | 1,3,5-trihydroxybenzene | Hexamethylene diisocyanate (HDI) | 1 | 4 |
| NCO 107 | 1,3,5-trihydroxybenzene | Isophorone diisocyanate (IPDI) | 1 | 4 |
| NCO 108 | pentaerythritol ethylene oxide | 1,3-Bis(isocyanatomethyl) cyclohexane (HXDI) | 1 | 5 |
| NCO 109 | pentaerythritol ethylene oxide | Isophorone diisocyanate (IPDI) | 1 | 5 |

TABLE 3-continued

| Com-pound No. | Polyisocyanate structure | | Composition | |
|---|---|---|---|---|
| | Compound having two or more active hydrogen groups | Difunctional isocyanate compound | Compound having two or more active hydrogen groups (molar equivalent) | Difunctional isocyanate compound (molar equivalent) |
| NCO 110 | 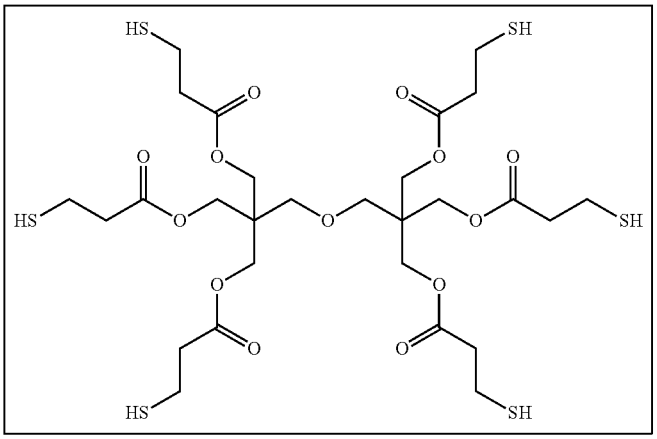 [SMILES: O=C(CCS)OCC(COCC(COC(=O)CCS)(COC(=O)CCS)COC(=O)CCS)(COC(=O)CCS)COC(=O)CCS] dipentaerythritol hexakis(3-mercaptopropionate) | Hexamethylene diisocyanate (HDI) | 1 | 7 |
| NCO 111 | | Isophorone diisocyanate (IPDI) | 1 | 7 |
| NCO 112 | 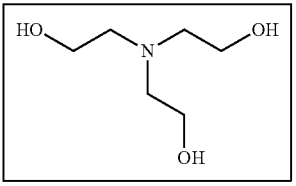 triethanolamine | Hexamethylene diisocyanate (HDI) | 1 | 4 |
| NCO 113 | | Isophorone diisocyanate (IPDI) | 1 | 4 |

TABLE 4

| | Polyisocyanate structure | | Composition |
|---|---|---|---|
| Compound No. | Polyisocyanate | Polymerizable group introduced monomer | Amount of active hydrogen group of polymerizable group introduced monomer with respect to NCO group of polyisocyanate (mol %) |
| NCO 201 | NCO 104 | Hydroxybutyl acrylate | 15 |
| NCO 202 | NCO 104 | BLEMMER AP-400 | 15 |
| NCO 203 | NCO 104 | BLEMMER AE-400 | 15 |
| NCO 204 | NCO 104 | BLEMMER PP-500 | 15 |
| NCO 205 | NCO 104 | DA212 | 15 |
| NCO 206 | NCO 104 | DA920 | 15 |
| NCO 207 | DURANATE 24A-100 | BLEMMER AP-400 | 15 |
| NCO 208 | D-127 | BLEMMER AP-400 | 15 |
| NCO 209 | SUMIDUR N3300 | BLEMMER AP-400 | 15 |
| NCO 210 | DURANATE TKA-100 | BLEMMER AP-400 | 15 |
| NCO 211 | DURANATE TSE-100 | BLEMMER AP-400 | 15 |

[Production of Dispersion of Gel Particles]

Example 1

<Emulsifying Step>
—Production of Oil Phase Component—
39 g of the isocyanate compound NCO 202 (solid content of 35% by mass) (tri- or higher functional isocyanate compound into which a polymerizable group had been introduced), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), and 1 g of Irgacure (registered trademark) 819 (manufactured by BASF Corp.) (an enclosed photopolymerization initiator) were dissolved in 5 g of ethyl acetate, whereby an oil phase component was obtained.

—Production of Aqueous Phase Component—

0.4 g of sodium dodecyl sulfate was dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 1 was obtained. The volume average particle diameter of the gel particles measured by a light scattering method was 0.15 μm. Moreover, in the measurement of the volume average particle diameter, a wet type particle size distribution measuring apparatus LA-910 (manufactured by Horiba, Ltd.) was used.

Examples 2 to 6

Dispersions of gel particles 2 to 6 were produced in the same manner as in Example 1 except that the isocyanate compounds shown in the following Table 5 were used instead of the isocyanate compound NCO 202 used in Example 1.

Examples 7 to 11

Dispersions of gel particles 7 to 11 were produced in the same manner as in Example 1 except that the enclosed photopolymerization initiators shown in the following Table 5 were used instead of the enclosed photopolymerization initiator (Irgacure (registered trademark) 819) used in Example 1.

Example 12

<Emulsifying Step>

—Production of Oil Phase Component—

39 g of the isocyanate compound NCO 202 (solid content of 35% by mass) (tri- or higher functional isocyanate compound into which a polymerizable group had been introduced), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 1 g of Irgacure (registered trademark) 819 (manufactured by BASF Corp.) (an enclosed photopolymerization initiator), and 0.5 g of 2-isopropyl thioxanthone (ITX) (an enclosed sensitizer) were dissolved in 5 g of ethyl acetate, whereby an oil phase component was obtained.

—Production of Aqueous Phase Component—

0.4 g of sodium dodecyl sulfate was dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 12 was obtained. The volume average particle diameter of the gel particles measured by a light scattering method was 0.15 μm.

Example 13

<Emulsifying Step>

—Production of Oil Phase Component—

19 g of the isocyanate compound NCO 202 (solid content of 35% by mass) (tri- or higher functional isocyanate compound into which a polymerizable group had been introduced), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 6.5 g of dipentaerythritol pentaacrylate (manufactured by Sartomer Co., Ltd., SR399E) (an enclosed polymerizable monomer), and 1 g of Irgacure (registered trademark) 819 (manufactured by BASF Corp.) (an enclosed photopolymerization initiator) were dissolved in 18 g of ethyl acetate, whereby an oil phase component was obtained.

—Production of Aqueous Phase Component—

0.4 g of sodium dodecyl sulfate was dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 13 was obtained. The volume average particle diameter of the gel particles measured by a light scattering method was 0.15 μm.

Examples 14 to 18

Dispersions of gel particles 14 to 18 were produced in the same manner as in Example 13 except that the isocyanate compounds shown in the following Table 5 were used instead of the isocyanate compound NCO 202 used in Example 13.

Examples 19 to 23

Dispersions of gel particles 19 to 23 were produced in the same manner as in Example 13 except that the enclosed photopolymerization initiators shown in the following Table 5 were used instead of the enclosed photopolymerization initiator (Irgacure (registered trademark) 819) used in Example 13.

Example 24

<Emulsifying Step>
—Production of Oil Phase Component—

19 g of the isocyanate compound NCO 202 (solid content of 35% by mass) (tri- or higher functional isocyanate compound into which a polymerizable group had been introduced), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 6.5 g of dipentaerythritol pentaacrylate (manufactured by Sartomer Co., Ltd., SR399E) (an enclosed polymerizable monomer), 1 g of Irgacure (registered trademark) 819 (manufactured by BASF Corp.) (an enclosed photopolymerization initiator), and 0.5 g 2-isopropyl thioxanthone (ITX) (an enclosed sensitizer) were dissolved in 18 g of ethyl acetate, whereby an oil phase component was obtained.

—Production of Aqueous Phase Component—

0.4 g of sodium dodecyl sulfate was dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 24 was obtained. The volume average particle diameter of the gel particles measured by a light scattering method was 0.15 μm.

Examples 25 to 37

Dispersions of gel particles 25 to 37 were produced in the same manner as in Example 13 except that the isocyanate compounds shown in the following Table 5 were used instead of the isocyanate compound NCO 202 used in Example 13.

Example 38

A dispersion of gel particles 38 was produced in the same manner as in Example 37 except that benzophenone was used instead of the enclosed photopolymerization initiator (Irgacure (registered trademark) 819) used in Example 37.

Example 39

<Emulsifying Step>
—Production of Oil Phase Component—

39 g of the isocyanate compound NCO 202 (solid content of 35% by mass) (tri- or higher functional isocyanate compound into which a polymerizable group had been introduced), 2.51 g of an isocyanate compound 2 into which a hydrophilic group had been introduced, and 1 g of Irgacure (registered trademark) 819 (manufactured by BASF Corp.) (an enclosed photopolymerization initiator) were dissolved in 5 g of ethyl acetate, whereby an oil phase component was obtained.

—Production of Aqueous Phase Component—

0.4 g of sodium dodecyl sulfate and 0.033 g of sodium hydroxide were dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 39 was obtained. The volume average particle diameter of the gel particles measured by a light scattering method was 0.15 μm.

Examples 40 to 44

Dispersions of gel particles 40 to 44 were produced in the same manner as in Example 39 except that the isocyanate compounds shown in the following Table 5 were used instead of the isocyanate compound NCO 202 used in Example 39.

Example 45

<Emulsifying Step>
—Production of Oil Phase Component—

19 g of the isocyanate compound NCO 202 (solid content of 35% by mass) (tri- or higher functional isocyanate compound into which a polymerizable group had been introduced), 2.51 g of the isocyanate compound 2 into which a hydrophilic group had been introduced, 6.5 g of dipentaerythritol pentaacrylate (manufactured by Sartomer Co., Ltd., SR399E) (an enclosed polymerizable monomer), and 1 g of Irgacure (registered trademark) 819 (manufactured by BASF Corp.) (an enclosed photopolymerization initiator) were dissolved in 18 g of ethyl acetate, whereby an oil phase component was obtained.

—Production of Aqueous Phase Component—

0.4 g of sodium dodecyl sulfate and 0.033 g of sodium hydroxide were dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 45 was obtained. The volume average particle diameter of the gel particles measured by a light scattering method was 0.15 µm.

Examples 46 to 50

Dispersions of gel particles 46 to 50 were produced in the same manner as in Example 45 except that the isocyanate compounds shown in the following Table 5 were used instead of the isocyanate compound NCO 202 used in Example 45.

Example 51

<Emulsifying Step>
—Production of Oil Phase Component—
39 g of the isocyanate compound NCO 202 (solid content of 35% by mass) (tri- or higher functional isocyanate compound into which a polymerizable group had been introduced), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 2.51 g of the isocyanate compound 2 into which a hydrophilic group had been introduced, and 1 g of Irgacure (registered trademark) 819 (manufactured by BASF Corp.) (an enclosed photopolymerization initiator) were dissolved in 5 g of ethyl acetate, whereby an oil phase component was obtained.
—Production of Aqueous Phase Component—
0.4 g of sodium dodecyl sulfate and 0.033 g of sodium hydroxide were dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.
<Gelling Step>
The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 51 was obtained. The volume average particle diameter of the gel particles measured by a light scattering method was 0.15 µm.

Examples 52 to 56

Dispersions of gel particles 52 to 56 were produced in the same manner as in Example 51 except that the isocyanate compounds shown in the following Table 5 were used instead of the isocyanate compound NCO 202 used in Example 51.

Example 57

<Emulsifying Step>
—Production of Oil Phase Component—
19 g of the isocyanate compound NCO 202 (solid content of 35% by mass) (tri- or higher functional isocyanate compound into which a polymerizable group had been introduced), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 2.51 g of the isocyanate compound 2 into which a hydrophilic group had been introduced, 6.5 g of dipentaerythritol pentaacrylate (manufactured by Sartomer Co., Ltd., SR399E) (an enclosed polymerizable monomer), and 1 g of Irgacure (registered trademark) 819 (manufactured by BASF Corp.) (an enclosed photopolymerization initiator) were dissolved in 18 g of ethyl acetate, whereby an oil phase component was obtained.
—Production of Aqueous Phase Component—
0.4 g of sodium dodecyl sulfate and 0.033 g of sodium hydroxide were dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.
<Gelling Step>
The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 57 was obtained. The volume average particle diameter of the gel particles measured by a light scattering method was 0.15 µm.

Examples 58 to 62

Dispersions of gel particles 58 to 62 were produced in the same manner as in Example 57 except that the isocyanate compounds shown in the following Table 5 were used instead of the isocyanate compound NCO 202 used in Example 57.

Example 63

<Emulsifying Step>
—Production of Oil Phase Component—
19 g of the isocyanate compound NCO 101 (solid content of 35% by mass) (tri- or higher functional isocyanate compound), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 6.5 g of neopentyl glycol propylene oxide adduct diacrylate (manufactured by Sartomer Co., Ltd., NPGPODA) (an enclosed polymerizable monomer), and 1 g of Irgacure (registered trademark) 819 (manufactured by BASF Corp.) (an enclosed photopolymerization initiator) were dissolved in 18 g of ethyl acetate, whereby an oil phase component was obtained.
—Production of Aqueous Phase Component—
0.4 g of sodium dodecyl sulfate was dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 63 was obtained. The volume average particle diameter of the gel particles measured by a light scattering method was 0.15 μm.

Examples 64 to 68

Dispersions of gel particles 64 to 68 were produced in the same manner as in Example 63 except that each of the compounds shown in the following Table 5 was used instead of the isocyanate compound NCO 101 and the enclosed polymerizable monomer (NPGPOPA) used in Example 63.

Example 69

A dispersion of gel particles 69 was produced in the same manner as in Example 57 except that the isocyanate compound NCO 104 was used instead of the isocyanate compound NCO 202 used in Example 57.

Example 70

<Emulsifying Step>

—Production of Oil Phase Component—

19 g of the isocyanate compound NCO 104 (solid content of 35% by mass), 3.5 g of an adduct of trimethylol propane, xylene diisocyanate, and polyethylene glycol monomethyl ether (manufactured by Mitsui Chemicals, Inc., a Takenate D-116N ethyl acetate 50% by mass solution, an isocyanate compound 1 into which a hydrophilic group had been introduced), 2.51 g of the isocyanate compound 2 into which a hydrophilic group had been introduced, 1.30 g of isobornyl acrylate (IBOA) (a monofunctional enclosed polymerizable monomer), 1.95 g of 2-phenoxyethyl acrylate (PEA) (a monofunctional enclosed polymerizable monomer), 3.25 g of cyclic trimethylolpropane formal acrylate (CTFA) (a monofunctional enclosed polymerizable monomer), and 1 g of Irgacure (registered trademark) 819 (manufactured by BASF Corp.) (an enclosed photopolymerization initiator) were dissolved in 18 g of ethyl acetate, whereby an oil phase component was obtained.

—Production of Aqueous Phase Component—

0.4 g of sodium dodecyl sulfate was dissolved in 50 g of distilled water, whereby an aqueous phase component was obtained.

After the aqueous phase component was added to the oil phase component, the resultant product was mixed, and emulsified for 10 minutes at 12000 rpm using a homogenizer, whereby an emulsion was obtained.

<Gelling Step>

The obtained emulsion was added to 25 g of distilled water, and the resultant product was stirred at room temperature for 30 minutes and stirred at 50° C. for 3 hours to distill off the ethyl acetate.

Thereafter, the resultant product was further stirred at 50° C. for 24 hours, and was diluted with distilled water such that the solid content concentration of the dispersion of the obtained gel particles became 20% by mass, whereby a dispersion of gel particles 70 was obtained. The volume average particle diameter of the gel particles measured by a light scattering method was 0.15 μm.

Examples 71 to 74

Dispersions of gel particles 71 to 74 were produced in the same manner as in Example 70 except that the monofunctional enclosed polymerizable monomers shown in the following Table 6 were used instead of the monofunctional enclosed polymerizable monomer used in Example 70.

Examples 75 to 79

Dispersions of gel particles 75 to 79 were produced in the same manner as in Example 70 except that the monofunctional enclosed polymerizable monomers and the di- or higher functional enclosed polymerizable monomers shown in the following Table 6 were used instead of the monofunctional enclosed polymerizable compound used in Example 70.

Examples 80 to 84

Dispersions of gel particles 80 to 84 were produced in the same manner as in Examples 75 to 79 except that the isocyanate compound NCO 202 was used instead of the tri- or higher functional isocyanate compound NCO 104 used in Examples 75 and 79.

Examples 85 to 89

Dispersions of gel particles 85 to 89 were produced in the same manner as in Examples 75 to 79 except that 0.5 g of 2-isopropyl thioxanthone (ITX) was further added in the emulsifying step of gel particle production in Examples 75 to 79.

TABLE 5

| | | Gel particles | | | | | | |
|---|---|---|---|---|---|---|---|---|
| | Gel particles No. | Isocyanate compound 1 into which hydrophilic group has been introduced | Isocyanate compound 2 into which hydrophilic group has been introduced | Tri- or higher functional isocyanate | Enclosed polymerization monomer | Enclosed photopolymerization initiator | Enclosed sensitizer | Surfactant |
| Example 1 | Gel particles 1 | D-116N | — | NCO 202 | — | Irgacure819 | — | Sodium dodecyl sulfate |
| Example 2 | Gel particles 2 | D-116N | — | NCO 204 | — | Irgacure819 | — | Sodium dodecyl sulfate |
| Example 3 | Gel particles 3 | D-116N | — | NCO 206 | — | Irgacure819 | — | Sodium dodecyl sulfate |

TABLE 5-continued

| | Gel particles No. | Isocyanate compound 1 into which hydrophilic group has been introduced | Isocyanate compound 2 into which hydrophilic group has been introduced | Tri- or higher functional isocyanate | Enclosed polymerization monomer | Enclosed photopolymerization initiator | Enclosed sensitizer | Surfactant |
|---|---|---|---|---|---|---|---|---|
| Example 4 | Gel particles 4 | D-116N | — | NCO 207 | — | Irgacure819 | — | Sodium dodecyl sulfate |
| Example 5 | Gel particles 5 | D-116N | — | NCO 208 | — | Irgacure819 | — | Sodium dodecyl sulfate |
| Example 6 | Gel particles 6 | D-116N | — | NCO 210 | — | Irgacure819 | — | Sodium dodecyl sulfate |
| Example 7 | Gel particles 7 | D-116N | — | NCO 202 | — | Irgacure369 | — | Sodium dodecyl sulfate |
| Example 8 | Gel particles 8 | D-116N | — | NCO 202 | — | Irgacure907 | — | Sodium dodecyl sulfate |
| Example 9 | Gel particles 9 | D-116N | — | NCO 202 | — | Irgacure184 | — | Sodium dodecyl sulfate |
| Example 10 | Gel particles 10 | D-116N | — | NCO 202 | — | TPO | — | Sodium dodecyl sulfate |
| Example 11 | Gel particles 11 | D-116N | — | NCO 202 | — | Sulfonium | — | Sodium dodecyl sulfate |
| Example 12 | Gel particles 12 | D-116N | — | NCO 202 | — | Irgacure819 | ITX | Sodium dodecyl sulfate |
| Example 13 | Gel particles 13 | D-116N | — | NCO 202 | SR-399E | Irgacure819 | — | Sodium dodecyl sulfate |
| Example 14 | Gel particles 14 | D-116N | — | NCO 204 | SR-399E | Irgacure819 | — | Sodium dodecyl sulfate |
| Example 15 | Gel particles 15 | D-116N | — | NCO 206 | SR-399E | Irgacure819 | — | Sodium dodecyl sulfate |
| Example 16 | Gel particles 16 | D-116N | — | NCO 207 | SR-399E | Irgacure819 | — | Sodium dodecyl sulfate |
| Example 17 | Gel particles 17 | D-116N | — | NCO 208 | SR-399E | Irgacure819 | — | Sodium dodecyl sulfate |
| Example 18 | Gel particles 18 | D-116N | — | NCO 210 | SR-399E | Irgacure819 | — | Sodium dodecyl sulfate |
| Example 19 | Gel particles 19 | D-116N | — | NCO 202 | SR-399E | Irgacure369 | — | Sodium dodecyl sulfate |
| Example 20 | Gel particles 20 | D-116N | — | NCO 202 | SR-399E | Irgacure907 | — | Sodium dodecyl sulfate |
| Example 21 | Gel particles 21 | D-116N | — | NCO 202 | SR-399E | Irgacure184 | — | Sodium dodecyl sulfate |
| Example 22 | Gel particles 22 | D-116N | — | NCO 202 | SR-399E | TPO | — | Sodium dodecyl sulfate |
| Example 23 | Gel particles 23 | D-116N | — | NCO 202 | SR-399E | Sulfonium | — | Sodium dodecyl sulfate |
| Example 24 | Gel particles 24 | D-116N | — | NCO 202 | SR-399E | Irgacure819 | ITX | Sodium dodecyl sulfate |
| Example 25 | Gel particles 25 | D-116N | — | NCO 101 | SR-399E | Irgacure819 | — | Sodium dodecyl sulfate |
| Example 26 | Gel particles 26 | D-116N | — | NCO 102 | SR-399E | Irgacure819 | — | Sodium dodecyl sulfate |
| Example 27 | Gel particles 27 | D-116N | — | NCO 103 | SR-399E | Irgacure819 | — | Sodium dodecyl sulfate |
| Example 28 | Gel particles 28 | D-116N | — | NCO 104 | SR-399E | Irgacure819 | — | Sodium dodecyl sulfate |
| Example 29 | Gel particles 29 | D-116N | — | NCO 105 | SR-399E | Irgacure819 | — | Sodium dodecyl sulfate |
| Example 30 | Gel particles 30 | D-116N | — | NCO 106 | SR-399E | Irgacure819 | — | Sodium dodecyl sulfate |
| Example 31 | Gel particles 31 | D-116N | — | NCO 107 | SR-399E | Irgacure819 | — | Sodium dodecyl sulfate |
| Example 32 | Gel particles 32 | D-116N | — | NCO 108 | SR-399E | Irgacure819 | — | Sodium dodecyl sulfate |
| Example 33 | Gel particles 33 | D-116N | — | NCO 109 | SR-399E | Irgacure819 | — | Sodium dodecyl sulfate |
| Example 34 | Gel particles 34 | D-116N | — | NCO 110 | SR-399E | Irgacure819 | — | Sodium dodecyl sulfate |
| Example 35 | Gel particles 35 | D-116N | — | NCO 111 | SR-399E | Irgacure819 | — | Sodium dodecyl sulfate |
| Example 36 | Gel particles 36 | D-116N | — | NCO 112 | SR-399E | Irgacure819 | — | Sodium dodecyl sulfate |
| Example 37 | Gel particles 37 | D-116N | — | NCO 113 | SR-399E | Irgacure819 | — | Sodium dodecyl sulfate |
| Example 38 | Gel particles 38 | D-116N | — | NCO 113 | SR-399E | benzophenone | — | Sodium dodecyl sulfate |
| Example 39 | Gel particles 39 | — | Isocyanate compound including a carboxylic acid group | NCO 202 | — | Irgacure819 | — | Sodium dodecyl sulfate |

TABLE 5-continued

| | | Gel particles | | | | | | |
|---|---|---|---|---|---|---|---|---|
| | Gel particles No. | Isocyanate compound 1 into which hydrophilic group has been introduced | Isocyanate compound 2 into which hydrophilic group has been introduced | Tri- or higher functional isocyanate | Enclosed polymerization monomer | Enclosed photopolymerization initiator | Enclosed sensitizer | Surfactant |
| Example 40 | Gel particles 40 | — | Isocyanate compound including a carboxylic acid group | NCO 204 | — | Irgacure819 | — | Sodium dodecyl sulfate |
| Example 41 | Gel particles 41 | — | Isocyanate compound including a carboxylic acid group | NCO 206 | — | Irgacure819 | — | Sodium dodecyl sulfate |
| Example 42 | Gel particles 42 | — | Isocyanate compound including a carboxylic acid group | NCO 207 | — | Irgacure819 | — | Sodium dodecyl sulfate |
| Example 43 | Gel particles 43 | — | Isocyanate compound including a carboxylic acid group | NCO 208 | — | Irgacure819 | — | Sodium dodecyl sulfate |
| Example 44 | Gel particles 44 | — | Isocyanate compound including a carboxylic acid group | NCO 210 | — | Irgacure819 | — | Sodium dodecyl sulfate |
| Example 45 | Gel particles 45 | — | Isocyanate compound including a carboxylic acid group | NCO 202 | SR-399E | Irgacure819 | — | Sodium dodecyl sulfate |
| Example 46 | Gel particles 46 | — | Isocyanate compound including a carboxylic acid group | NCO 204 | SR-399E | Irgacure819 | — | Sodium dodecyl sulfate |
| Example 47 | Gel particles 47 | — | Isocyanate compound including a carboxylic acid group | NCO 206 | SR-399E | Irgacure819 | — | Sodium dodecyl sulfate |
| Example 48 | Gel particles 48 | — | Isocyanate compound including a carboxylic acid group | NCO 207 | SR-399E | Irgacure819 | — | Sodium dodecyl sulfate |
| Example 49 | Gel particles 49 | — | Isocyanate compound including a carboxylic acid group | NCO 208 | SR-399E | Irgacure819 | — | Sodium dodecyl sulfate |
| Example 50 | Gel particles 50 | — | Isocyanate compound including a carboxylic acid group | NCO 210 | SR-399E | Irgacure819 | — | Sodium dodecyl sulfate |
| Example 51 | Gel particles 51 | D-116N | Isocyanate compound including a carboxylic acid group | NCO 202 | — | Irgacure819 | — | Sodium dodecyl sulfate |
| Example 52 | Gel particles 52 | D-116N | Isocyanate compound including a carboxylic acid group | NCO 204 | — | Irgacure819 | — | Sodium dodecyl sulfate |
| Example 53 | Gel particles 53 | D-116N | Isocyanate compound including a carboxylic acid group | NCO 206 | — | Irgacure819 | — | Sodium dodecyl sulfate |
| Example 54 | Gel particles 54 | D-116N | Isocyanate compound including a carboxylic acid group | NCO 207 | — | Irgacure819 | — | Sodium dodecyl sulfate |
| Example 55 | Gel particles 55 | D-116N | Isocyanate compound including a carboxylic acid group | NCO 208 | — | Irgacure819 | — | Sodium dodecyl sulfate |
| Example 56 | Gel particles 56 | D-116N | Isocyanate compound including a carboxylic acid group | NCO 210 | — | Irgacure819 | — | Sodium dodecyl sulfate |
| Example 57 | Gel particles 57 | D-116N | Isocyanate compound including a carboxylic acid group | NCO 202 | SR-399E | Irgacure819 | — | Sodium dodecyl sulfate |
| Example 58 | Gel particles 58 | D-116N | Isocyanate compound including a carboxylic acid group | NCO 204 | SR-399E | Irgacure819 | — | Sodium dodecyl sulfate |
| Example 59 | Gel particles 59 | D-116N | Isocyanate compound including a carboxylic acid group | NCO 206 | SR-399E | Irgacure819 | — | Sodium dodecyl sulfate |
| Example 60 | Gel particles 60 | D-116N | Isocyanate compound including a carboxylic acid group | NCO 207 | SR-399E | Irgacure819 | — | Sodium dodecyl sulfate |
| Example 61 | Gel particles 61 | D-116N | Isocyanate compound including a carboxylic acid group | NCO 208 | SR-399E | Irgacure819 | — | Sodium dodecyl sulfate |
| Example 62 | Gel particles 62 | D-116N | Isocyanate compound including a carboxylic acid group | NCO 210 | SR-399E | Irgacure819 | — | Sodium dodecyl sulfate |
| Example 63 | Gel particles 63 | D-116N | — | NCO 101 | NPGPODA | Irgacure819 | — | Sodium dodecyl sulfate |
| Example 64 | Gel particles 64 | D-116N | — | NCO 102 | A-TMPT | Irgacure819 | — | Sodium dodecyl sulfate |

TABLE 5-continued

| | Gel particles No. | Isocyanate compound 1 into which hydrophilic group has been introduced | Isocyanate compound 2 into which hydrophilic group has been introduced | Tri- or higher functional isocyanate | Enclosed polymerization monomer | Enclosed photopolymerization initiator | Enclosed sensitizer | Surfactant |
|---|---|---|---|---|---|---|---|---|
| Example 65 | Gel particles 65 | D-116N | — | NCO 103 | ATMM-3L | Irgacure819 | — | Sodium dodecyl sulfate |
| Example 66 | Gel particles 66 | D-116N | — | NCO 104 | AD-TMP | Irgacure819 | — | Sodium dodecyl sulfate |
| Example 67 | Gel particles 67 | D-116N | — | NCO 105 | A-DPH | Irgacure819 | — | Sodium dodecyl sulfate |
| Example 68 | Gel particles 68 | D-116N | — | NCO 106 | UA-306T | Irgacure819 | — | Sodium dodecyl sulfate |
| Example 69 | Gel particles 69 | D-116N | Isocyanate compound including a carboxylic acid group | NCO 104 | SR-399E | Irgacure819 | — | Sodium dodecyl sulfate |

Each of D-116N, an isocyanate compound including a carboxylic acid group, and sulfonium in Table 5 is a compound having a structure shown below. In addition, TPO represents Lucirin (registered trademark) TPO (2,4,6-trimethylbenzoyldiphenylphosphineoxide, manufactured by BASF Corp.). Irgacure (registered trademark) 369, Irgacure (registered trademark) 907, and Irgacure (registered trademark) 184 are those manufactured by BASF Corp., respectively. A-TMPT, ATMM-3L, AD-TMP, and A-DHP are those manufactured by Shin-Nakamura Chemical Co., Ltd. UA-306T is that manufactured by Kyoeisha Chemical Co., Ltd.

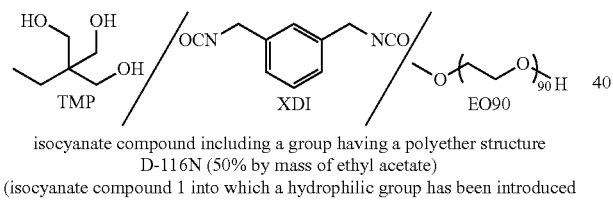

isocyanate compound including a group having a polyether structure
D-116N (50% by mass of ethyl acetate)
(isocyanate compound 1 into which a hydrophilic group has been introduced

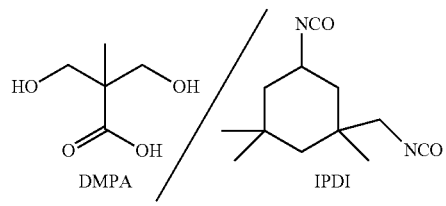

isocyanate compound including a carboxylic acid group
(isocyanate compound 2 into which a hydrophilic group has been introduced)
DMPA/IPDA = 1/3 reaction mixture
35% by mass of ethyl acetate

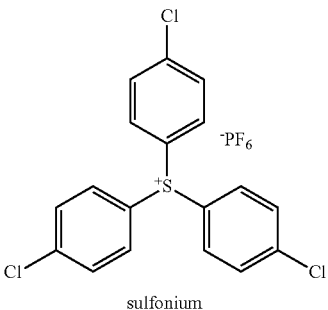

sulfonium

TABLE 6

| | Gel particles No. | Isocyanate compound 1 into which hydrophilic group has been introduced | Isocyanate compound 2 into which hydrophilic group has been introduced | Tri- or higher functional isocyanate compound | Surfactant | Enclosed photopolymerization initiator |
|---|---|---|---|---|---|---|
| Example 70 | Gel particles 70 | D-116N | Isocyanate compound including a carboxylic acid group | NCO 104 | Sodium dodecyl sulfate | Irgacure 819 |
| Example 71 | Gel particles 71 | D-116N | Isocyanate compound including a carboxylic acid group | NCO 104 | Sodium dodecyl sulfate | Irgacure 819 |
| Example 72 | Gel particles 72 | D-116N | Isocyanate compound including a carboxylic acid group | NCO 104 | Sodium dodecyl sulfate | Irgacure 819 |
| Example 73 | Gel particles 73 | D-116N | Isocyanate compound including a carboxylic acid group | NCO 104 | Sodium dodecyl sulfate | Irgacure 819 |
| Example 74 | Gel particles 74 | D-116N | Isocyanate compound including a carboxylic acid group | NCO 104 | Sodium dodecyl sulfate | Irgacure 819 |

TABLE 6-continued

| | | | | | | | |
|---|---|---|---|---|---|---|---|
| Example 75 | Gel particles 75 | D-116N | | Isocyanate compound including a carboxylic acid group | NCO 104 | Sodium dodecyl sulfate | Irgacure 819 |
| Example 76 | Gel particles 76 | D-116N | | Isocyanate compound including a carboxylic acid group | NCO 104 | Sodium dodecyl sulfate | Irgacure 819 |
| Example 77 | Gel particles 77 | D-116N | | Isocyanate compound including a carboxylic acid group | NCO 104 | Sodium dodecyl sulfate | Irgacure 819 |
| Example 78 | Gel particles 78 | D-116N | | Isocyanate compound including a carboxylic acid group | NCO 104 | Sodium dodecyl sulfate | Irgacure 819 |
| Example 79 | Gel particles 79 | D-116N | | Isocyanate compound including a carboxylic acid group | NCO 104 | Sodium dodecyl sulfate | Irgacure 819 |
| Example 80 | Gel particles 80 | D-116N | | Isocyanate compound including a carboxylic acid group | NCO 202 | Sodium dodecyl sulfate | Irgacure 819 |
| Example 81 | Gel particles 81 | D-116N | | Isocyanate compound including a carboxylic acid group | NCO 202 | Sodium dodecyl sulfate | Irgacure 819 |
| Example 82 | Gel particles 82 | D-116N | | Isocyanate compound including a carboxylic acid group | NCO 202 | Sodium dodecyl sulfate | Irgacure 819 |
| Example 83 | Gel particles 83 | D-116N | | Isocyanate compound including a carboxylic acid group | NCO 202 | Sodium dodecyl sulfate | Irgacure 819 |
| Example 84 | Gel particles 84 | D-116N | | Isocyanate compound including a carboxylic acid group | NCO 202 | Sodium dodecyl sulfate | Irgacure 819 |
| Example 85 | Gel particles 85 | D-116N | | Isocyanate compound including a carboxylic acid group | NCO 104 | Sodium dodecyl sulfate | Irgacure 819 |
| Example 86 | Gel particles 86 | D-116N | | Isocyanate compound including a carboxylic acid group | NCO 104 | Sodium dodecyl sulfate | Irgacure 819 |
| Example 87 | Gel particles 87 | D-116N | | Isocyanate compound including a carboxylic acid group | NCO 104 | Sodium dodecyl sulfate | Irgacure 819 |
| Example 88 | Gel particles 88 | D-116N | | Isocyanate compound including a carboxylic acid group | NCO 104 | Sodium dodecyl sulfate | Irgacure 819 |
| Example 89 | Gel particles 89 | D-116N | | Isocyanate compound including a carboxylic acid group | NCO 104 | Sodium dodecyl sulfate | Irgacure 819 |

| | Enclosed sensitizer | Amount of monofunctional enclosed polymerizable monomer added (g) | | | | | | Amount of di- or higher functional enclosed polymerizable monomer added (g) |
|---|---|---|---|---|---|---|---|---|
| | | IBOA | PEA | CTFA | THFA | EOEOEA | NVC | SR-399E |
| Example 70 | — | 1.30 | 1.95 | 3.25 | — | — | — | — |
| Example 71 | — | 1.30 | 1.95 | — | 3.25 | — | — | — |
| Example 72 | — | 1.30 | 1.95 | — | — | 3.25 | — | — |
| Example 73 | — | 1.30 | 1.95 | — | — | — | 3.25 | — |
| Example 74 | — | 1.11 | 0.52 | 2.73 | — | — | 2.15 | — |
| Example 75 | — | 1.30 | 1.95 | 2.73 | — | — | — | 2.15 |
| Example 76 | — | 1.30 | 1.95 | — | 2.73 | — | — | 2.15 |
| Example 77 | — | 1.30 | 1.95 | — | — | 2.73 | — | 2.15 |
| Example 78 | — | 1.30 | 1.95 | — | — | — | 2.73 | 2.15 |
| Example 79 | — | 0.80 | 1.10 | 1.30 | — | — | 1.80 | 1.50 |
| Example 80 | — | 1.30 | 1.95 | 2.73 | — | — | — | 2.15 |
| Example 81 | — | 1.30 | 1.95 | — | 2.73 | — | — | 2.15 |
| Example 82 | — | 1.30 | 1.95 | — | — | 2.73 | — | 2.15 |

TABLE 6-continued

| | | | | | | | | |
|---|---|---|---|---|---|---|---|---|
| Example 83 | — | 1.30 | 1.95 | — | — | — | 2.73 | 2.15 |
| Example 84 | — | 0.80 | 1.10 | 1.30 | — | — | 1.80 | 1.50 |
| Example 85 | ITX | 1.30 | 1.95 | 2.73 | — | — | — | 2.15 |
| Example 86 | ITX | 1.30 | 1.95 | — | 2.73 | — | — | 2.15 |
| Example 87 | ITX | 1.30 | 1.95 | — | — | 2.73 | — | 2.15 |
| Example 88 | ITX | 1.30 | 1.95 | — | — | — | 2.73 | 2.15 |
| Example 89 | ITX | 0.80 | 1.10 | 1.30 | — | — | 1.80 | 1.50 |

In Table 6, SR-399E represents dipentaerythritol pentaacrylate manufactured by Sartomer Co., Ltd., THFA represents tetrahydrofurfuryl acrylate, EOEOEA represents 2-(2-ethoxyethoxy)ethyl acrylate, and NVC represents N-vinyl caprolactam.

Comparative Synthesis Example 1: Synthesis of Urethane Acrylate (a)

After 444.6 parts of IPDI and 202.3 parts of 1,12-dodecanediol were put into a reaction vessel equipped with a stirrer, a cooling tube, a dropping funnel, and an air introducing tube, 0.26 parts of tin(II) octylate was added thereto while performing stirring, then, the temperature in the reaction vessel was raised to 90° C., and the mixture was allowed to react for 1.5 hours. Thereafter, 700.0 parts of methoxy PEG1000 (methoxypolyethylene glycol, manufactured by TOHO Chemical Industry Co., Ltd.) and 0.54 parts of tin(II) octylate were added thereto, and the mixture was further allowed to react for 1.5 hours. Next, after 1300.0 parts of dipentaerythritol pentaacrylate, 1.32 parts of methoquinone, and 1.06 parts of tin(II) octylate were put into the reaction vessel and mixed, the temperature in the reaction vessel was raise to 85° C. while bubbling air thereinto, and the mixture was allowed to react for 3 hours and cooled, whereby a urethane acrylate (a) was obtained.

Comparative Synthesis Example 2: Synthesis of Urethane Acrylate (b)

After 578.0 parts of a trimer of hexamethylene diisocyanate (HDI) (CORONATE (registered trademark) HXR, manufactured by Nippon Polyurethane Industry Co., Ltd.), 200.0 parts of methoxy PEG400 (methoxypolyethylene glycol, manufactured by TOHO Chemical Industry Co., Ltd.), and 200.0 parts of methoxy PEG1000 were put into a same type of reaction vessel as in Comparative Synthesis Example 1, 0.39 parts of tin(II) octylate was added thereto while performing stirring, then, the temperature in the reaction vessel was raised to 75° C., and the mixture was allowed to react for 1.5 hours. Next, after 1051.6 parts of pentaerythritol triacrylate, 1.01 parts of methoquinone, and 0.81 parts of tin(II) octylate were put into the reaction vessel and mixed, the temperature in the reaction vessel was raised to 80° C. while bubbling air thereinto, and the mixture was allowed to react for 2 hours and cooled, whereby a urethane acrylate (b) was obtained. Moreover, the urethane acrylate (b) is a urethane acrylate which has an acryloyl group at one terminal and is obtained by using a trifunctional isocyanate.

Comparative Synthesis Example 3: Synthesis of Urethane Acrylate (c)

After 444.6 parts of IPDI (2 moles) and 400.0 parts of polypropylene glycol having a weight average molecular weight of 400 were put into a same type of reaction vessel as in Comparative Synthesis Example 1, 0.34 parts of tin(II) octylate was added thereto while performing stirring, then, the temperature in the reaction vessel was raised to 90° C., and the mixture was allowed to react for 1.5 hours. Thereafter, 1400.0 parts of methoxy PEG2000 (methoxypolyethylene glycol, manufactured by TOHO Chemical Industry Co., Ltd.) and 0.90 parts of tin(II) octylate were added thereto, and the mixture was further allowed to react for 1.5 hours. Next, after 1300 parts of dipentaerythritol pentaacrylate, 1.77 parts of methoquinone, and 2.13 parts of tin(II) octylate were put into the reaction vessel and mixed, the temperature in the reaction vessel was raise to 85° C. while bubbling air thereinto, and the mixture was allowed to react for 3 hours and cooled, whereby an amphiphilic urethane acrylate (c) was obtained.

Comparative Example 1

After 27.5 parts of the amphiphilic urethane acrylate (a) obtained above, 9.2 parts of polypentaerythritol polyacrylate, and 3.3 parts of photoradical polymerization initiator (TPO) were put into a same type of reaction vessel as in Comparative Synthesis Example 1, the temperature in the reaction vessel was raised to 80° C. while performing stirring, and the mixture was kept at the temperature for 2 hours. Next, the temperature in the reaction vessel was cooled to 50° C., then, 60 parts deionized water was added thereto while stirring, and the mixture was kept at 40° C. for 1 hour, whereby a dispersion having a non-volatile content (amphiphilic urethane acrylate (a), polypentaerythritol polyacrylate, and a photoradical polymerization initiator (TPO)) of 40% by mass was obtained. Furthermore, distilled water was added to the obtained dispersion such that the solid content concentration became 20% by mass, whereby an emulsion 1 was obtained.

Moreover, in the emulsion 1, there was no gel particles formed.

Comparative Example 2

After 27.5 parts of the urethane acrylate (b) obtained above, 9.2 parts of polypentaerythritol polyacrylate, and 3.3 parts of photoradical polymerization initiator (TPO) were put into a same type of reaction vessel as in Comparative Synthesis Example 1, the temperature in the reaction vessel was raised to 80° C. while performing stirring, and the mixture was kept at the temperature for 2 hours. Next, the temperature in the reaction vessel was cooled to 50° C., then, 60 parts deionized water was added thereto while stirring, and the mixture was kept at 40° C. for 1 hour, whereby a dispersion having a non-volatile content (amphiphilic urethane acrylate (b), polypentaerythritol polyacrylate, and a photoradical polymerization initiator (TPO)) of 40% by mass was obtained. Furthermore, distilled water was added to the obtained dispersion such that the solid content concentration became 20% by mass, whereby an emulsion 2 was obtained.

Moreover, in the emulsion 2, there were no gel particles formed.

Comparative Example 3

After 23.3 parts of the amphiphilic urethane acrylate (c) obtained above, 8.3 parts of polypentaerythritol polyacrylate, 1.7 parts of urethane acrylate for fixing, 5.0 parts of photoradical polymerization initiator (TPO), 1.7 parts of 2,4-diethyl thioxanthen-9-one (DETX, manufactured by Sigma-Aldrich Co. LLC.) as a photoradical polymerization initiator, and 0.07 parts of 1,4-bis(2-benzoxazolyl)naphthalene (KCB, manufactured by Tokyo Chemical Industry Co., Ltd.) as a fluorescent brightening agent were put into a same type of reaction vessel as in Comparative Synthesis Example 1, the temperature in the reaction vessel was raised to 80° C. while performing stirring, and the mixture was kept at the temperature for 2 hours. Next, the temperature in the reaction vessel was cooled to 50° C., then, 60 parts deionized water was added thereto while stirring, and the mixture was kept at 50° C. for 1 hour, whereby a dispersion having a non-volatile content (amphiphilic urethane acrylate (c), polypentaerythritol polyacrylate, urethane acrylate for fixing, photoradical polymerization initiators (TPO, DETX), and a fluorescent brightening agent (KCB)) of 40% by mass was obtained. Furthermore, distilled water was added to the obtained dispersion such that the solid content concentration became 20% by mass, whereby an emulsion 3 was obtained.

Moreover, in the emulsion 3, there were no gel particles formed.

Comparative Example 4

After 21.6 parts of the amphiphilic urethane acrylate (c) obtained above, 7.7 parts of polypentaerythritol polyacrylate, 1.5 parts of urethane acrylate for fixing, 5.0 parts of a photoradical polymerization initiator (TPO), and 1.7 parts of a photoradical polymerization initiator (DETX) were put into a same type of reaction vessel as in Comparative Synthesis Example 1, the temperature in the reaction vessel was raised to 80° C. while performing stirring, and the mixture was kept at the temperature for 2 hours. Next, the temperature in the reaction vessel was cooled to 50° C., then, 2.5 parts of pentaerythritol tetrakis(3-mercaptopropionate) (PEMP, manufactured by SC Organic Chemical Co., Ltd.) as a crosslinking agent was added thereto while stirring, and the mixture was continuously stirred for 15 minutes. Thereafter, after 60 parts deionized water was added thereto, the mixture was kept at 50° C. for 1 hour, then, the temperature in the reaction vessel was heated to 80° C., and the resultant product was kept at the temperature for 6 hours, whereby a dispersion having a non-volatile content (amphiphilic urethane acrylate (c), polypentaerythritol polyacrylate, urethane acrylate for fixing, photoradical polymerization initiators (TPO, DETX), and a crosslinking agent (PEMP)) of 40% by mass was obtained. Furthermore, distilled water was added to the obtained dispersion such that the solid content concentration became 20% by mass, whereby an emulsion 4 was obtained.

Moreover, in the emulsion 4, there were no gel particles formed.

Comparative Example 5

65 g of a 50% by mass ethyl acetate solution (manufactured by Mitsui Chemicals, Inc., Takenate D-110N, macro capsule wall material) of an adduct of trimethylolpropane (TMP) and xylylene diisocyanate (XDI) as an oil phase component, 3 g of an infrared absorbing pigment, 2.5 g of a thermal radical generating agent (the following structure), and 0.1 g of PIONIN A41C were dissolved in a mixed solution of 30 g of methyl ethyl ketone and 60 g of ethyl acetate.

120 g of a 4% by mass aqueous solution of PVA205 was prepared as an aqueous phase component. The oil phase component and the aqueous phase component were emulsified for 10 minutes at 10000 rpm using a homogenizer.

Thereafter, 130 g of water was added thereto, and the mixture was stirred at room temperature for 30 minutes, and further stirred at 40° C. for 3 hours. In this manner, a dispersion of micro capsules was obtained. Furthermore, distilled water was added to the obtained dispersion such that the solid content concentration became 20% by mass. The volume average particle diameter of the micro capsule in the dispersion was 0.35 µm.

In the dispersion of micro capsules, the micro capsules do not have a polymerizable group.

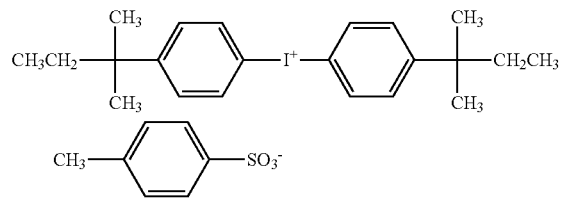

thermal radical generating agent

<Confirmation that Dispersion of Gel Particles Includes Gel Particles having Polymerizable Group>

It was confirmed by the following method whether or not each of the dispersions of gel particles of Examples 1 to 89 obtained above substantially included gel particles. Moreover, the following operation was performed under the conditions of a liquid temperature of 25° C.

A sample was collected from the dispersion of gel particles obtained above. 100 times by mass tetrahydrofuran (THF) of the total solid content (particles, in the example) in the sample was added to the collected sample, and the resultant product was mixed, whereby a diluted solution of the dispersion of gel particles was prepared. Centrifugal separation was performed (80000 rpm, 40 minutes) on the obtained diluted solution. After centrifugation, the presence or absence of residue was visually checked, and in a case where residue was observed, water was added to the residue, then, the resultant product was stirred for 1 hour using a stirrer, and the residue was redispersed in water, whereby a redispersion was obtained. The particle size distribution of the obtained redispersion was measured by a light scattering method using a wet type particle size distribution measuring apparatus (LA-910, manufactured by Horiba, Ltd.). In a case where the particle size distribution was confirmed by the above operation, it was determined that the dispersion includes the gel particles.

In addition, from the above-described result and the result of Fourier transform infrared spectroscopy (FT-IR) analysis, it was confirmed that all of the dispersions of gel particles included gel particles having a polymerizable group (that is, the gel particles are gel particles substantially having a polymerizable group).

<Confirmation that Photopolymerization Initiator is Enclosed>

By measuring the enclosing ratio (%) of the photopolymerization initiator in each of the dispersions of gel particles of Examples 1 to 89 obtained above, it was confirmed whether or not the photopolymerization initiator was enclosed in the gel particles. Details will be described below. Moreover, the following operation was performed under the conditions of a liquid temperature of 25° C.

Two samples (hereinafter, referred to as a "sample 1A" and a "sample 2A") having the same mass were collected from the dispersion of gel particles.

100 times by mass tetrahydrofuran (THF) of the total solid content in the sample 1A was added to the sample 1A, and the resultant product was mixed, whereby a diluted solution was prepared. Centrifugal separation was performed (80,000 rpm, 40 minutes) on the obtained diluted solution. The supernatant generated by centrifugal separation (hereinafter, referred to as a "supernatant 1A") was collected. The mass of the photopolymerization initiator included in the collected supernatant 1A was measured by using a liquid chromatography apparatus "Waters2695" manufactured by Waters. The obtained mass of the photopolymerization initiator was used as the "total amount of photopolymerization initiator".

In addition, centrifugal separation was performed on the sample 2A under the same conditions as in the centrifugal separation performed on the diluted solution described above. The supernatant generated by centrifugal separation (hereinafter, referred to as a "supernatant 2A") was collected. The mass of the photopolymerization initiator included in the collected supernatant 2A was measured by using the above-described liquid chromatography apparatus. The obtained mass of the photopolymerization initiator was used as the "free amount of photopolymerization initiator".

On the basis of the "total amount of photopolymerization initiator" and the "free amount of the photopolymerization initiator", the enclosing ratio (% by mass) of the photopolymerization initiator was determined according to the following equation.

Enclosing ratio (% by mass) of the photopolymerization initiator=((total amount of photopolymerization initiator−free amount of photopolymerization initiator)/total amount of photopolymerization initiator)×100

As a result, the enclosing ratio in all of the gel particles was 99% or greater, and it was confirmed that the photopolymerization initiator was enclosed.

<Confirmation that Polymerizable Monomer is Enclosed>

By measuring the enclosing ratio (%) of the polymerizable monomer in the dispersion of gel particles using the polymerizable monomer, among the dispersions of gel particles of Examples 1 to 89 obtained above, it was confirmed whether or not the polymerizable monomer was enclosed in the gel particles.

Confirmation of whether or not the polymerizable monomer was enclosed was performed by the same method for confirming that the photopolymerization initiator was enclosed.

As a result, the enclosing ratio of the gel particles in all of the dispersions of gel particles using the polymerizable monomer was 99% or greater, and it was confirmed that the photopolymerizable monomer was enclosed.

<Confirmation that Sensitizer is Enclosed>

By measuring the enclosing ratio (%) of the sensitizer in the dispersion of gel particles using the sensitizer, among the dispersions of gel particles of Examples 1 to 89 obtained above, it was confirmed whether or not the sensitizer was enclosed in the gel particles.

Confirmation of whether or not the sensitizer was included was performed by the same method for confirming that the photopolymerization initiator was enclosed.

As a result, the enclosing ratio of the gel particles in all of the dispersions of gel particles using the sensitizer was 99% or greater, and it was confirmed that the sensitizer was enclosed.

<Measurement of Volume Average Particle Diameter of Gel Particles>

The volume average particle diameters of the gel particles 1 to 89 in the dispersions of gel particles obtained above were measured by a light scattering method using a wet type particle size distribution measuring apparatus (LA-910, manufactured by Horiba, Ltd.). As a result, the volume average particle diameters of the gel particles 1 to 89 were 0.15 μm.

[Preparation of Ink Composition]

Respective components were mixed so as to become the ink composition described below using any one of the dispersions of gel particles of Examples 1 to 89, the emulsions of Comparative Examples 1 to 4, and the dispersion of micro capsules of Comparative Example 5, whereby the ink composition of each Example was prepared.

—Composition of Ink Composition—

Each dispersion of gel particles of Examples 1 to 89, each emulsion of Comparative Examples 1 to 4, or the dispersion of micro capsules of Comparative Example 5 . . . 82 parts Ink (Pro-jet Cyan APD1000 (manufactured by FUJIFILM Imaging Colorants) colorant concentration of 14% by mass) . . . 13 parts Fluorine-based surfactant (manufactured by DuPont Ltd., Capstone FS-31, a solid content of 25% by mass) . . . 0.3 parts 2-Methylproopanediol . . . 4.7 parts

[Evaluation Method of Ink Composition]

The ink composition of each Example was applied to a substrate (vinyl chloride (PVC) sheet (manufactured by Avery Dennison Corporation, AVERY 400 GLOSS WHITE PERMANENT)) in a thickness of 12 μm using a No. 2 bar of K hand coater K hand coater manufactured by RK Print Coat Instruments Ltd. After application, the coating film was dried at 60° C. for 3 minutes to remove the water content, whereby a sample for ink composition evaluation was obtained.

The following evaluations were performed on the obtained sample. The evaluation results are shown in the following Tables 7 and 8.

—Adhesion Evaluation A (Cross-Hatch Test)—

The sample for ink composition evaluation obtained above was irradiated with active energy rays using a UV miniconveyor apparatus CSOT (manufactured by GS Yuasa Power Supply Ltd.) for experiment provided with an ozoneless metal halide lamp MAN250L as an exposure light source, which was set to 9.0 m/min as a conveyor speed and 2.0 W/cm² as an exposure intensity, whereby the sample was cured. The adhesion to a recording medium was evaluated according to the following criteria by ISO2409 (cross-cut method) using a cured coating film.

Moreover, "%" which shows peeling of lattices in the following criteria 0 to 5 indicates a proportion of the number of lattices in which peeling was observed to the number of lattices of 25 formed by cutting at a right angle at 1 mm intervals, as a percentage.

Proportion (%) of lattices in which peeling occurs=
[(the number of lattices in which peeling occurs)/(total number of lattices)]×100

Evaluation Criteria

0: Cut edge was smooth, and peeling was not observed in all lattices.

1: Small peeling was observed in a coating film at the intersection of cut. The place where peeling was observed was 5% or less of the total number of lattices.

2: Peeling was observed in at least one of the portion along the edge of the cut portion of the coating film and the cut intersection. The place where peeling was observed was greater than 5% and 15% or less of the total number of lattices.

3: Partial or total peeing was observed along the edge of the cut portion of the coating film or partial or total peeling was observed in various portions of the lattices. The place where peeling was observed was greater than 15% and 35% or less of the total number of lattices.

4: Partial or total peeing was observed along the edge of the cut portion of the coating film or partial or total peeling was observed in various portions of the lattices. The place where peeling was observed was greater than 35% and 65% or less of the total number of lattices.

5: The place where peeling was observed was greater than 65% of the total number of lattices.

In the above evaluation, 0 and 1 were evaluated to be a practically acceptable level.

—Fixability Evaluation—

The sample for ink composition evaluation obtained above was exposed to light under the condition that energy became 1000 mJ/cm$^2$ using a Deep UV lamp (manufactured by Ushio Inc., SP-7). The fixing degree of the sample surface after exposure was evaluated by touch. In a case where stickiness remained, exposure was repeated until the stickiness was lost, and by the exposure amount until the stickiness was lost, fixability was evaluated.

Evaluation Criteria

A: Stickiness was lost by a single exposure.

B: Stickiness was lost by two or three times exposure.

C: Stickiness was lost by four or five times exposure.

D: Stickiness was not lost even by six or more times exposure.

—Solvent Resistance Evaluation—

The sample for ink composition evaluation obtained above was exposed to light under the condition that energy became 8000mJ/cm$^2$ using a Deep UV lamp (manufactured by Ushio Inc., SP-7). The surface of a printed matter exposed to light under the energy condition of 8000 mJ/cm$^2$ was rubbed using an isopropyl alcohol-impregnated cotton swab, and evaluation was visually performed according to the following criteria.

Evaluation Criteria

A: By rubbing ten or more times, a change in an image was not observed.

B: By rubbing five to nine times, the image density was decreased.

C: By rubbing two to four times, the image density was decreased.

D: By rubbing once, the image density was significantly decreased.

—Water Resistance Evaluation—

The sample for ink composition evaluation obtained above was exposed to light under the condition that energy became 8000mJ/cm$^2$ using a Deep UV lamp (manufactured by Ushio Inc., SP-7). The surface of a printed matter exposed to light under the energy condition of 8000 mJ/cm$^2$ was rubbed using a water-impregnated cotton swab, and evaluation was visually performed according to the following criteria.

Evaluation Criteria

A: By rubbing ten or more times, a change in an image was not observed.

B: By rubbing five to nine times, the image density was decreased.

C: By rubbing two to four times, the image density was decreased.

D: By rubbing once, the image density was significantly decreased.

—Redispersibility Evaluation—

The ink composition was applied to an aluminum plate in a thickness of 12 μm using a No. 2 bar of K hand coater K hand coater manufactured by RK Print Coat Instruments Ltd. After application, the coating film was dried at 60° C. for 3 minutes to remove the water content. Rubbing operation was performed once on this coating film using a water-impregnated sponge.

Fourier transform infrared spectroscopy (FT-IR) was performed on each of the coating film before being rubbed with a sponge and the coating film after being rubbed, and from the obtained results, the residual ratio of the gel particles was calculated based on the following equation.

Residual ratio of particles=(Intensity of the peak derived from the gel particles in the coating film remaining after being rubbed with a sponge/Intensity of the peak derived from the gel particles in the coating film before being rubbed with a sponge)×100

Here, the peak derived from the gel particles was a peak of 1700 cm$^{-1}$.

Based on the obtained residual ratio of the gel particles, the redispersibility of the ink composition was evaluated according to the following evaluation criteria.

Evaluation Criteria

A: Residual ratio of gel particles was 1% or less.

B: Residual ratio of gel particles was greater than 1% and 5% or less.

C: Residual ratio of gel particles was greater than 5% and 10% or less.

D: Residual ratio of gel particles was greater than 10%.

—Discharging Property Evaluation—

A solid image and fine lines were recorded on a recording medium (manufactured by Avery Dennison Corporation, AVERY 400 GLOSS WHITE PERMANENT) by discharging the ink composition of each of Examples 1 to 89 from the head for 30 minutes using an ink jet printer (manufactured by Roland DG Corporation, SP-300V), by stopping, and by discharging again after 5 minutes. The obtained image (5 cm×5 cm) was observed, and evaluation was visually performed according to the following evaluation criteria.

Evaluation Criteria

A: Occurrence of dot omission was not observed, and an image having good image quality was obtained.

B: Occurrence of dot omission was slightly observed, but it was the degree at which the image quality was not impaired practically.

C: Occurrence of dot omission was observed, and the image quality was impaired practically.

D: Discharging was not possible.

—Storage Stability Evaluation of Ink Composition—

The obtained ink composition was sealed in a container, and after two weeks at 60° C., the same evaluation as the discharging property evaluation described above was performed, and evaluated according to the same criteria.

[Preparation of Photosensitive Composition]

Respective components were mixed so as to become the photosensitive composition described below using any one of the dispersions of gel particles of Examples 1 to 89, the emulsions of Comparative Examples 1 to 4, and the dispersion of micro capsules of Comparative Example 5, whereby the photosensitive composition of each Example was prepared.

—Composition of Photosensitive Composition—

Each dispersion of gel particles of Examples 1 to 89, each emulsion of Comparative Examples 1 to 4, or the dispersion of micro capsules of Comparative Example 5 . . . 82 parts Fluorine-based surfactant (manufactured by DuPont Ltd., Capstone FS-31, a solid content of 25% by mass) . . . 0.3 parts Water remainder when the total is set to 100 parts

[Evaluation Method of Photosensitive Composition]

The ink composition was applied to a substrate (a triacetyl cellulose (TAC) film, manufactured by Fujifilm Corporation) in a thickness of 12 μm using a No. 2 bar of K hand coater K hand coater manufactured by RK Print Coat Instruments Ltd. After application, the coating film was dried at 60° C. for 3 minutes to remove the water content, whereby a sample for photosensitive composition evaluation was obtained.

The following evaluations were performed on the obtained sample for photosensitive composition evaluation. The evaluation results are shown in the following Tables 7 and 8.

—Adhesion Evaluation B (Cross-Hatch Test)—

The sample for photosensitive composition evaluation was irradiated with active energy rays using a UV miniconveyor apparatus CSOT (manufactured by GS Yuasa Power Supply Ltd.) for experiment provided with an ozoneless metal halide lamp MAN250L as an exposure light source, which was set to 9.0 m/min as a conveyor speed and 2.0 W/cm$^2$ as an exposure intensity, whereby the sample was cured. The adhesion to a recording medium was evaluated according to the following criteria by ISO2409 (cross-cut method) using a cured coating film.

Moreover, "%" which shows peeling of lattices in the following criteria 0 to 5 indicates a proportion of the number of lattices in which peeling was observed to the number of lattices of 25 formed by cutting at a right angle at 1 mm intervals, as a percentage.

Proportion (%) of lattices in which peeling occurs=
[(the number of lattices in which peeling occurs)/(total number of lattices)]×100

Evaluation Criteria

0: Cut edge was smooth, and peeling was not observed in all lattices.

1: Small peeling was observed in a coating film at the intersection of cut. The place where peeling was observed was 5% or less of the total number of lattices.

2: Peeling was observed in at least one of the portion along the edge of the cut portion of the coating film and the cut intersection. The place where peeling was observed was greater than 5% and 15% or less of the total number of lattices.

3: Partial or total peeling was observed along the edge of the cut portion of the coating film or partial or total peeling was observed in various portions of the lattices. The place where peeling was observed was greater than 15% and 35% or less of the total number of lattices.

4: Partial or total peeing was observed along the edge of the cut portion of the coating film or partial or total peeling was observed in various portions of the lattices. The place where peeling was observed was greater than 35% and 65% or less of the total number of lattices.

5: The place where peeling was observed was greater than 65% of the total number of lattices.

In the above evaluation, 0 and 1 were evaluated to be a practically acceptable level.

—Pencil Hardness—

The pencil hardness test was performed on the ink cured film produced in the same manner as that used in the adhesion evaluation based on JIS K5600-5-4 (1999). In the photosensitive composition, the acceptable range of hardness was HB or higher, and preferably H or higher. There was a possibility that a printed matter of which the evaluation result was B or softer was damaged at the time of handling the printed matter, and thus, it was not preferable.

Moreover, as the pencil, UNI (registered trademark) manufactured by Mitsubishi Pencil Co., Ltd. was used.

TABLE 7

| | Adhesion | | Pencil hardness | Water resistance | Solvent resistance | Fixability | Discharging properties | Redispersibility | Storage stability |
|---|---|---|---|---|---|---|---|---|---|
| | A | B | | | | | | | |
| Example 1 | 0 | 0 | 2H | A | A | A | A | A | A |
| Example 2 | 0 | 0 | H | A | A | B | A | A | A |
| Example 3 | 0 | 0 | 2H | A | A | A | A | A | A |
| Example 4 | 0 | 0 | 2H | A | A | A | A | A | A |
| Example 5 | 0 | 0 | 2H | A | A | A | A | A | A |
| Example 6 | 0 | 0 | 2H | A | A | A | A | A | A |
| Example 7 | 0 | 0 | 2H | A | A | A | A | A | A |
| Example 8 | 0 | 0 | 2H | A | A | A | A | A | A |
| Example 9 | 0 | 0 | 2H | A | A | A | A | A | A |
| Example 10 | 0 | 0 | 2H | A | A | A | A | A | A |
| Example 11 | 1 | 1 | F | A | A | B | A | A | A |
| Example 12 | 0 | 0 | 2H | A | A | A | A | A | A |
| Example 13 | 0 | 0 | 3H | A | A | A | A | A | A |

TABLE 7-continued

|  | Evaluation results | | | | | | | | |
|---|---|---|---|---|---|---|---|---|---|
|  | Adhesion | | Pencil hardness | Water resistance | Solvent resistance | Fixability | Discharging properties | Redispersibility | Storage stability |
|  | A | B | | | | | | | |
| Example 14 | 0 | 0 | 2H | A | A | B | A | A | A |
| Example 15 | 0 | 0 | 3H | A | A | A | A | A | A |
| Example 16 | 0 | 0 | 3H | A | A | A | A | A | A |
| Example 17 | 0 | 0 | 3H | A | A | A | A | A | A |
| Example 18 | 0 | 0 | 3H | A | A | A | A | A | A |
| Example 19 | 0 | 0 | 3H | A | A | A | A | A | A |
| Example 20 | 0 | 0 | 3H | A | A | A | A | A | A |
| Example 21 | 0 | 0 | 3H | A | A | A | A | A | A |
| Example 22 | 0 | 0 | 3H | A | A | A | A | A | A |
| Example 23 | 1 | 1 | H | A | A | B | A | A | A |
| Example 24 | 0 | 0 | 3H | A | A | A | A | A | A |
| Example 25 | 0 | 0 | 3H | A | A | A | A | A | A |
| Example 26 | 0 | 0 | 3H | A | A | A | A | A | A |
| Example 27 | 0 | 0 | H | A | A | A | A | A | A |
| Example 28 | 0 | 0 | 3H | A | A | A | A | A | A |
| Example 29 | 0 | 0 | 3H | A | A | A | A | A | A |
| Example 30 | 0 | 0 | H | A | A | A | A | A | A |
| Example 31 | 0 | 0 | 3H | A | A | A | A | A | A |
| Example 32 | 0 | 0 | H | A | A | B | A | A | A |
| Example 33 | 0 | 0 | 2H | A | A | A | A | A | A |
| Example 34 | 0 | 0 | F | A | A | A | A | A | A |
| Example 35 | 0 | 0 | H | A | A | A | A | A | A |
| Example 36 | 0 | 0 | H | A | A | A | A | A | A |
| Example 37 | 0 | 0 | 2H | A | A | A | A | A | A |
| Example 38 | 0 | 0 | 2H | A | A | A | A | A | A |
| Example 39 | 0 | 0 | 2H | A | A | A | A | A | A |
| Example 40 | 0 | 0 | H | A | A | B | A | A | A |
| Example 41 | 0 | 0 | 2H | A | A | A | A | A | A |
| Example 42 | 0 | 0 | 2H | A | A | A | A | A | A |
| Example 43 | 0 | 0 | 2H | A | A | A | A | A | A |
| Example 44 | 0 | 0 | 2H | A | A | A | A | A | A |
| Example 45 | 0 | 0 | 3H | A | A | A | A | A | A |
| Example 46 | 0 | 0 | 2H | A | A | B | A | A | A |
| Example 47 | 0 | 0 | 3H | A | A | A | A | A | A |
| Example 48 | 0 | 0 | 3H | A | A | A | A | A | A |
| Example 49 | 0 | 0 | 3H | A | A | A | A | A | A |
| Example 50 | 0 | 0 | 3H | A | A | A | A | A | A |
| Example 51 | 0 | 0 | 2H | A | A | A | A | A | A |
| Example 52 | 0 | 0 | H | A | A | B | A | A | A |
| Example 53 | 0 | 0 | 2H | A | A | A | A | A | A |
| Example 54 | 0 | 0 | 2H | A | A | A | A | A | A |
| Example 55 | 0 | 0 | 2H | A | A | A | A | A | A |
| Example 56 | 0 | 0 | 2H | A | A | A | A | A | A |
| Example 57 | 0 | 0 | 3H | A | A | A | A | A | A |
| Example 58 | 0 | 0 | 2H | A | A | B | A | A | A |
| Example 59 | 0 | 0 | 3H | A | A | A | A | A | A |
| Example 60 | 0 | 0 | 3H | A | A | A | A | A | A |
| Example 61 | 0 | 0 | 3H | A | A | A | A | A | A |
| Example 62 | 0 | 0 | 3H | A | A | A | A | A | A |
| Example 63 | 0 | 0 | H | A | A | A | A | A | A |
| Example 64 | 0 | 0 | 3H | A | A | A | A | A | A |
| Example 65 | 0 | 0 | 2H | A | A | A | A | A | A |
| Example 66 | 0 | 0 | 3H | A | A | A | A | A | A |
| Example 67 | 0 | 0 | 3H | A | A | A | A | A | A |
| Example 68 | 0 | 0 | 2H | A | A | A | A | A | A |
| Example 69 | 0 | 0 | 3H | A | A | A | A | A | A |
| Comparative Example 1 | 0 | 0 | 2B | C | C | B | C | C | C |
| Comparative Example 2 | 0 | 0 | 2B | C | C | B | C | C | C |
| Comparative Example 3 | 0 | 0 | 2B | C | C | B | C | C | C |
| Comparative Example 4 | 0 | 0 | B | B | C | B | C | B | C |
| Comparative Example 5 | 0 | 0 | 2B | C | C | C | A | B | B |

TABLE 8

| | Evaluation results | | | | | | | | |
|---|---|---|---|---|---|---|---|---|---|
| | Adhesion | | Pencil | Water | Solvent | | Discharging | | Storage |
| | A | B | hardness | resistance | resistance | Fixability | properties | Redispersibility | stability |
| Example 70 | 0 | 0 | H | A | A | A | A | A | A |
| Example 71 | 0 | 0 | H | A | A | A | A | A | A |
| Example 72 | 0 | 0 | H | A | A | A | A | A | A |
| Example 73 | 0 | 0 | H | A | A | A | A | A | A |
| Example 74 | 0 | 0 | H | A | A | A | A | A | A |
| Example 75 | 0 | 0 | 2H | A | A | A | A | A | A |
| Example 76 | 0 | 0 | 2H | A | A | A | A | A | A |
| Example 77 | 0 | 0 | 2H | A | A | A | A | A | A |
| Example 78 | 0 | 0 | 2H | A | A | A | A | A | A |
| Example 79 | 0 | 0 | 2H | A | A | A | A | A | A |
| Example 80 | 0 | 0 | 3H | A | A | A | A | A | A |
| Example 81 | 0 | 0 | 3H | A | A | A | A | A | A |
| Example 82 | 0 | 0 | 3H | A | A | A | A | A | A |
| Example 83 | 0 | 0 | 3H | A | A | A | A | A | A |
| Example 84 | 0 | 0 | 3H | A | A | A | A | A | A |
| Example 85 | 0 | 0 | 3H | A | A | A | A | A | A |
| Example 86 | 0 | 0 | 3H | A | A | A | A | A | A |
| Example 87 | 0 | 0 | 3H | A | A | A | A | A | A |
| Example 88 | 0 | 0 | 3H | A | A | A | A | A | A |
| Example 89 | 0 | 0 | 3H | A | A | A | A | A | A |

From Tables 7 and 8, it was found that, in the ink compositions of Examples, all of adhesion, water resistance, solvent resistance, fixability, discharging properties, redispersibility, and storage stability are excellent. In addition, it was found that, in the photosensitive compositions of Examples, adhesion and pencil hardness are excellent.

Based on the above description, it was found that, in Examples, an image which has excellent dispersibility and redispersibility, is cured with high sensitivity, and has an excellent film strength is obtained.

Examples 90 to 93

[Evaluation of Ink Composition Using LED]

Evaluation was performed on the ink compositions of Examples 1, 12, 13, and 24 using LED.

In detail, the same operation as in the adhesion evaluation A, the adhesion evaluation B, and the evaluation of pencil hardness described above was performed except that the exposure light source was changed to a 385 nm UV-LED irradiator (manufactured by CCS Inc.) for experiment and the exposure energy was changed to 300 mJ/cm$^2$.

The results are shown in Table 9.

TABLE 9

| | | Evaluation results | | |
|---|---|---|---|---|
| | | | Adhesion | |
| | Gel particles No. | Pencil hardness | PVC | TAC |
| Example 90 | Gel particles 1 | H | 0 | 0 |
| Example 91 | Gel particles 12 | 2H | 0 | 0 |
| Example 92 | Gel particles 13 | 2H | 0 | 0 |
| Example 93 | Gel particles 24 | 3H | 0 | 0 |

As shown in Table 9, the ink compositions of Examples 1, 12, 13, and 24 using an LED light when curing exhibit excellent results in the evaluation of adhesion and pencil hardness, as in the case of using an ozoneless metal halide lamp MAN250L (refer to Table 6 described above).

Example 94

[Preparation of Ink Composition]

Using a dispersion of the gel particles of Example 69, respective components were mixed so as to be the cyan ink composition shown below, whereby a cyan ink composition was prepared.

—Composition of Cyan Ink Composition—

Dispersion of gel particles 69 . . . 75 parts

SR9035 (manufactured by Sartomer Co., Ltd., ethoxylated trimethylolpropane triacrylate, a polymerizable compound) . . . 10 parts Ink (Pro-jet Cyan APD1000 (manufactured by FUJIFILM Imaging Colorants) colorant concentration of 14% by mass) . . . 10 parts Fluorine-based surfactant (manufactured by DuPont Ltd., Capstone FS-31, a solid content of 25% by mass) . . . 0.3 parts 2-Methylpropanediol . . . 4.7 parts Examples 95 to 98

A cyan ink composition of each Example was produced in the same manner as in Example 94 except that the polymerizable compound shown in the following Table 10 was used instead of the polymerizable compound used in the cyan ink composition of the Example 94.

Examples 99 to 107

A cyan ink composition of each Example was produced in the same manner as in Examples 94, 95, and 97 except that 2 parts of the photopolymerization initiator shown in the following Table 10 was further added to the cyan ink composition of each of Examples 94, 95, and 97.

Examples 108 to 110

A cyan ink composition of each Example was produced in the same manner as in Example 95 except that the amount shown in the following Table 10 was used instead of the amount added of the polymerizable compound used in the cyan ink composition of the Example 95.

Examples 111 to 113

A cyan ink composition of each Example was produced in the same manner as in Example 103 except that the amount shown in the following Table 10 was used instead of the amount added of the photopolymerization initiator used in the cyan ink composition of the Example 103.

[Evaluation Method of Ink Composition]

Each of the cyan ink compositions of Examples 94 to 113 obtained above was applied to a substrate (vinyl chloride sheet (manufactured by Avery Dennison Corporation, AVERY 400 GLOSS WHITE PERMANENT)) in a thickness of 12 μm using a No. 2 bar of K hand coater K hand coater manufactured by RK Print Coat Instruments Ltd. After application, the coating film was dried at 60° C. for 3 minutes to remove the water content, whereby a sample for ink composition evaluation was obtained.

Adhesion evaluation A, fixability evaluation, solvent resistance evaluation, water resistance evaluation, and evaluation of pencil hardness were performed on the obtained sample in the same manner as above. The evaluation results are shown in the following Table 11.

In addition, redispersibility evaluation and storage stability evaluation were performed on the cyan ink compositions of Examples 94 to 113 obtained above in the same manner as above, and evaluation of discharging properties was performed by the following method. The evaluation results are shown in the following Table 11.

—Discharging Property Evaluation—

A solid image and fine lines were recorded on a recording medium (manufactured by Avery Dennison Corporation, AVERY 400 GLOSS WHITE PERMANENT) by discharging the cyan ink composition of each of Examples 94 to 113 obtained above from the head for 30 minutes using an ink jet printer (manufactured by Roland DG Corporation, SP-300V), by stopping, and by discharging again after 5 minutes. The obtained image (5 cm×5 cm) was observed, and evaluation was visually performed according to the following evaluation criteria.

Evaluation Criteria

A: Occurrence of dot omission was not observed, and an image having good image quality was obtained.

B: Occurrence of dot omission was slightly observed, but it was the degree at which the image quality was not impaired practically.

C: Occurrence of dot omission was observed, and the image quality was impaired practically.

D: Discharging was not possible.

TABLE 10

| | Ink composition No. | Gel particles No. | Polymerizable compound | | Photopolymerization initiator | |
|---|---|---|---|---|---|---|
| | | | Type | Amount added in ink composition (parts) | Type | Amount added in ink composition (parts) |
| Example 94 | Ink composition 94 | Gel particles 69 | SR9035 | 10 | — | — |
| Example 95 | Ink composition 95 | Gel particles 69 | AM-1 | 10 | — | — |
| Example 96 | Ink composition 96 | Gel particles 69 | AM-2 | 10 | — | — |
| Example 97 | Ink composition 97 | Gel particles 69 | AM-3 | 10 | — | — |
| Example 98 | Ink composition 98 | Gel particles 69 | AM-4 | 10 | — | — |
| Example 99 | Ink composition 99 | Gel particles 69 | SR9035 | 10 | Irgacure 2959 | 2 |
| Example 100 | Ink composition 100 | Gel particles 69 | AM-1 | 10 | Irgacure 2959 | 2 |
| Example 101 | Ink composition 101 | Gel particles 69 | AM-3 | 10 | Irgacure 2959 | 2 |
| Example 102 | Ink composition 102 | Gel particles 69 | SR9035 | 10 | PI-1 | 2 |
| Example 103 | Ink composition 103 | Gel particles 69 | AM-1 | 10 | PI-1 | 2 |

TABLE 10-continued

| | Ink composition No. | Gel particles No. | Polymerizable compound | | Photopolymerization initiator | |
|---|---|---|---|---|---|---|
| | | | Type | Amount added in ink composition (parts) | Type | Amount added in ink composition (parts) |
| Example 104 | Ink composition 104 | Gel particles 69 | AM-3 | 10 | PI-1 | 2 |
| Example 105 | Ink composition 105 | Gel particles 69 | SR9035 | 10 | PI-4 | 2 |
| Example 106 | Ink composition 106 | Gel particles 69 | AM-1 | 10 | PI-4 | 2 |
| Example 107 | Ink composition 107 | Gel particles 69 | AM-3 | 10 | PI-4 | 2 |
| Example 108 | Ink composition 108 | Gel particles 69 | AM-1 | 2 | — | — |
| Example 109 | Ink composition 109 | Gel particles 69 | AM-1 | 5 | — | — |
| Example 110 | Ink composition 110 | Gel particles 69 | AM-1 | 15 | — | — |
| Example 111 | Ink composition 111 | Gel particles 69 | AM-1 | 10 | PI-1 | 1 |
| Example 112 | Ink composition 112 | Gel particles 69 | AM-1 | 10 | PI-1 | 4 |
| Example 113 | Ink composition 113 | Gel particles 69 | AM-1 | 10 | PI-1 | 6 |

SR9035 in Table 10 is ethoxylated trimethylolpropane triacrylate (manufactured by Sartomer Co., Ltd.), and AM-1 to AM-4 are compounds having a structure shown below.

Irgacure 2959 in Table 10 is a photopolymerization initiator manufactured by BASF Corp. and PI-1 and PI-4 are compounds having a structure shown below.

AM-1
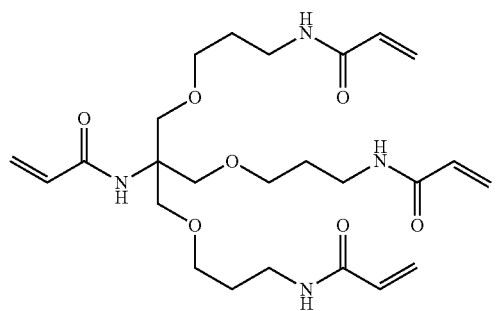

AM-2
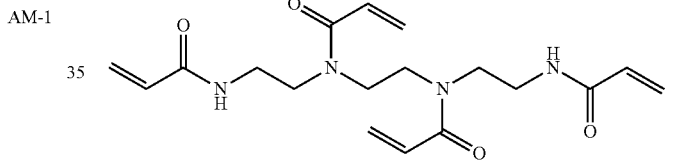

AM-3
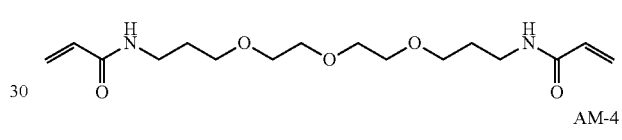

AM-4
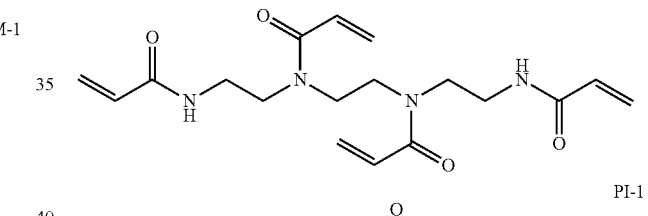

PI-1
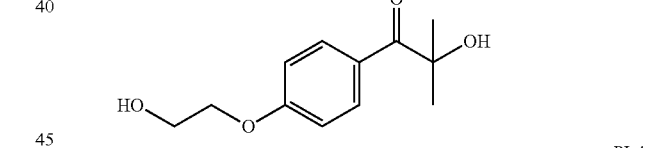

PI-4
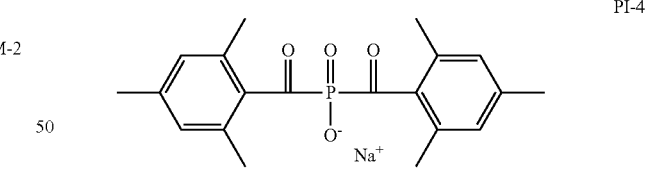

TABLE 11

| | Ink composition NO. | Evaluation results | | | | | | | |
|---|---|---|---|---|---|---|---|---|---|
| | | Adhesion A | Pencil hardness | Water resistance | Solvent resistance | Fixability | Discharging properties | Redispersibility | Storage stability |
| Example 94 | Ink composition 94 | 0 | 2H | A | A | A | A | A | A |
| Example 95 | Ink composition 95 | 0 | 2H | A | A | A | A | A | A |
| Example 96 | Ink composition 96 | 0 | 2H | A | A | A | A | A | A |

TABLE 11-continued

| | Ink composition NO. | Adhesion A | Pencil hardness | Water resistance | Solvent resistance | Fixability | Discharging properties | Redispersibility | Storage stability |
|---|---|---|---|---|---|---|---|---|---|
| Example 97 | Ink composition 97 | 0 | 2H | A | A | A | A | A | A |
| Example 98 | Ink composition 98 | 0 | 2H | A | A | A | A | A | A |
| Example 99 | Ink composition 99 | 0 | 3H | A | A | A | A | A | A |
| Example 100 | Ink composition 100 | 0 | 3H | A | A | A | A | A | A |
| Example 101 | Ink composition 101 | 0 | 3H | A | A | A | A | A | A |
| Example 102 | Ink composition 102 | 0 | 3H | A | A | A | A | A | A |
| Example 103 | Ink composition 103 | 0 | 3H | A | A | A | A | A | A |
| Example 104 | Ink composition 104 | 0 | 3H | A | A | A | A | A | A |
| Example 105 | Ink composition 105 | 0 | 3H | A | A | A | A | A | A |
| Example 106 | Ink composition 106 | 0 | 3H | A | A | A | A | A | A |
| Example 107 | Ink composition 107 | 0 | 3H | A | A | A | A | A | A |
| Example 108 | Ink composition 108 | 0 | H | A | A | A | A | A | A |
| Example 109 | Ink composition 109 | 0 | 2H | A | A | A | A | A | A |
| Example 110 | Ink composition 110 | 0 | H | A | A | A | A | A | A |
| Example 111 | Ink composition 111 | 0 | 2H | A | A | A | A | A | A |
| Example 112 | Ink composition 112 | 0 | 3H | A | A | A | A | A | A |
| Example 113 | Ink composition 113 | 0 | 3H | A | A | A | A | A | A |

It was found that, as shown in Table 11, the ink compositions of Examples 94 to 113 are excellent in all of adhesion, water resistance, solvent resistance, fixability, discharging properties, redispersibility, and storage stability. Based on the above description, it was found that, in Examples, an image which has excellent dispersibility and redispersibility, is cured with high sensitivity, and has an excellent film strength is obtained.

All the contents of JP2014-199145 filed on Sep. 29, 2014, JP2015-035774 filed on Feb. 25, 2015, and JP2015-061719 filed on Mar. 24, 2015 disclosed herein are incorporated into the specification for reference.

All the documents, patent applications and technical standards described in the specification are incorporated into the specification for reference to the same extent as cases in which it is specifically and respectively described that the respective documents, patent applications and technical standards are incorporated for reference.

What is claimed is:

1. An ink composition for ink jet comprising:
   gel particles which have a polymerizable group, and a three-dimensional crosslinked structure including at least one bond selected from a urethane bond and a urea bond, and enclose a photopolymerization initiator; and water.

2. The ink composition for ink jet according to claim 1, wherein the photopolymerization initiator includes at least one of a carbonyl compound or an acylphosphine oxide compound.

3. The ink composition for ink jet according to claim 1, wherein the gel particles have a hydrophilic group on the surfaces.

4. The ink composition for ink jet according to claim 3, wherein the hydrophilic group is at least one type selected from a group having a polyether structure, a carboxylic acid group, and a salt of a carboxylic acid group.

5. The ink composition for ink jet according to claim 1, wherein the gel particles further enclose a polymerizable monomer.

6. The ink composition for ink jet according to claim 1, wherein the gel particles further enclose a sensitizer.

7. The ink composition for ink jet according to claim 1, further comprising a polymerizable compound in the outer portion of the gel particles.

8. The ink composition for ink jet according to claim 1, further comprising a photopolymerization initiator in the outer portion of the gel particles.

9. The ink composition for ink jet according to claim 1, wherein the total solid content amount of the gel particles is 50% by mass or greater with respect to the total solid content of the ink composition for ink jet.

10. The ink composition for ink jet according to claim 1, wherein the volume average particle diameter of the gel particles is from 0.01 μm to 10.0 μm.

11. A production method of the ink composition for ink jet according claim 1, comprising:
    obtaining an emulsion by mixing and emulsifying any one oil phase component selected from an oil phase component including a photopolymerization initiator, a tri- or higher functional isocyanate compound, a polymerizable monomer, and an organic solvent, an oil phase component including a photopolymerization initiator, a tri- or higher functional isocyanate compound having a polymerizable group, and an organic solvent, and an oil phase component including a photopolymerization initiator, a tri- or higher functional isocyanate compound having a polymerizable group, a polymerizable monomer, and an organic solvent, with an aqueous phase component including water; and gelling the above emulsion by heating.

12. The production method of the ink composition for ink jet according to claim 11, wherein the tri- or higher functional isocyanate compound is an isocyanate compound derived from at least one type selected from isophorone diisocyanate, hexamethylene diisocyanate, trimethyl hexamethylene diisocyanate, 1,3-bis(isocyanatomethyl)cyclohexane, m-xylylene diisocyanate, and dicyclohexylmethane-4,4'-diisocyanate.

13. The production method of the ink composition for ink jet according to claim 11, wherein the oil phase component or the aqueous phase component further comprises a surfactant.

14. An image forming method, comprising:
applying the ink composition for ink jet according to claim 1 to a recording medium by ink jet method; and
irradiating the ink composition for ink jet applied to the recording medium with active energy rays.

15. The ink composition for ink jet according to claim 1, wherein the three-dimensional crosslinked structure has a structure of a reaction product of water and a tri- or higher functional isocyanate compound represented by General Formula (2) below:

General Formula (2)

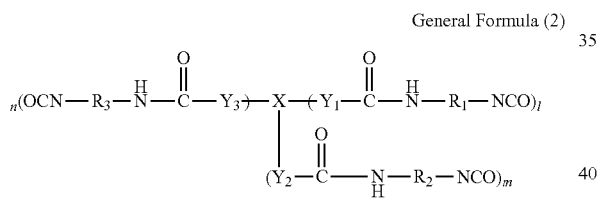

wherein, in General Formula (2); X represents a (l+m+n) valent organic group; l, m, and n are each independently 0 or greater; l+m+n is 3 or greater; $Y_1$, $Y_2$, and $Y_3$ each independently represent O, S, or NH; $R_1$, $R_2$, and $R_3$ each independently represent an alkylene group which may have a substituent having 1 to 20 carbon atoms, a cycloalkylene group which may have a substituent having 1 to 20 carbon atoms, or an arylene group which may have a substituent having 1 to 20 carbon atoms.

16. The ink composition for ink jet according to claim 1, wherein the three-dimensional crosslinked structure has a structure of a reaction product of water, a monoether of polyethylene oxide, and a tri- or higher functional isocyanate compound represented by General Formula (2) below:

General Formula (2)

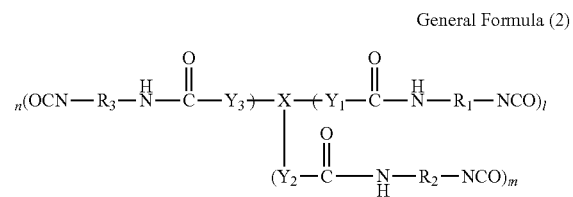

wherein, in General Formula (2); X represents a (l+m+n) valent organic group; l, m, and n are each independently 0 or greater; l+m+n is 3 or greater; $Y_1$, $Y_2$, and $Y_3$ each independently represent O, S, or NH; $R_1$, $R_2$, and $R_3$ each independently represent an alkylene group which may have a substituent having 1 to 20 carbon atoms, a cycloalkylene group which may have a substituent having 1 to 20 carbon atoms, or an arylene group which may have a substituent having 1 to 20 carbon atoms.

17. The production method of the ink composition for ink jet according to claim 11, wherein the tri- or higher functional isocyanate compound is a tri- or higher functional isocyanate compound represented by General Formula (2) below:

General Formula (2)

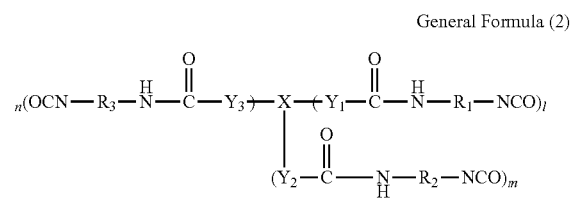

wherein, in General Formula (2); X represents a (l+m+n) valent organic group; l, m, and n are each independently 0 or greater; l+m+n is 3 or greater; $Y_1$, $Y_2$, and $Y_3$ each independently represent O, S, or NH; $R_1$, $R_2$, and $R_3$ each independently represent an alkylene group which may have a substituent having 1 to 20 carbon atoms, a cycloalkylene group which may have a substituent having 1 to 20 carbon atoms, or an arylene group which may have a substituent having 1 to 20 carbon atoms.

* * * * *